United States Patent [19]
Ohkuma et al.

[11] Patent Number: 5,384,665
[45] Date of Patent: Jan. 24, 1995

[54] DATA DIVIDING APPARATUS

[75] Inventors: Ikuo Ohkuma; Makoto Kumano; Sadayuki Inoue; Ken Onishi; Junko Ishimoto, all of Nagaokakyo, Japan

[73] Assignee: Mitsubushi Denki Kabushiki Kaisha, Tokyo, Japan

[21] Appl. No.: 20,325

[22] Filed: Feb. 19, 1993

[30] Foreign Application Priority Data

Feb. 21, 1992 [JP] Japan .................................. 4-035003
Feb. 25, 1992 [JP] Japan .................................. 4-037600
May 12, 1992 [JP] Japan .................................. 4-118738

[51] Int. Cl.[6] .......................... G11B 5/02; G11B 5/00; G11B 5/09
[52] U.S. Cl. ........................................ 360/22; 360/32; 360/48; 348/388
[58] Field of Search ........................... 360/32, 48, 22; 348/388

[56] References Cited

U.S. PATENT DOCUMENTS 4,868,681  9/1989  Opelt ............................... 360/48

FOREIGN PATENT DOCUMENTS 3238670 10/1991 Japan .
 414973  1/1992 Japan .

Primary Examiner—Donald Hajec
Assistant Examiner—T. N. Forbus, Jr.

[57] ABSTRACT

Specified modular arithmetic is applied to input digital data to divide the input data into two main codes and a subcode. Otherwise, input digital data is divided into two pieces of digital data according to a specified rule. The digital data is divided so that the original input digital data can be completely restored if the two main codes and the subcode or both of the divided data are used, and the original input digital data can be nearly correctly restored even when one of the main codes or one of the divided data is used.

68 Claims, 62 Drawing Sheets

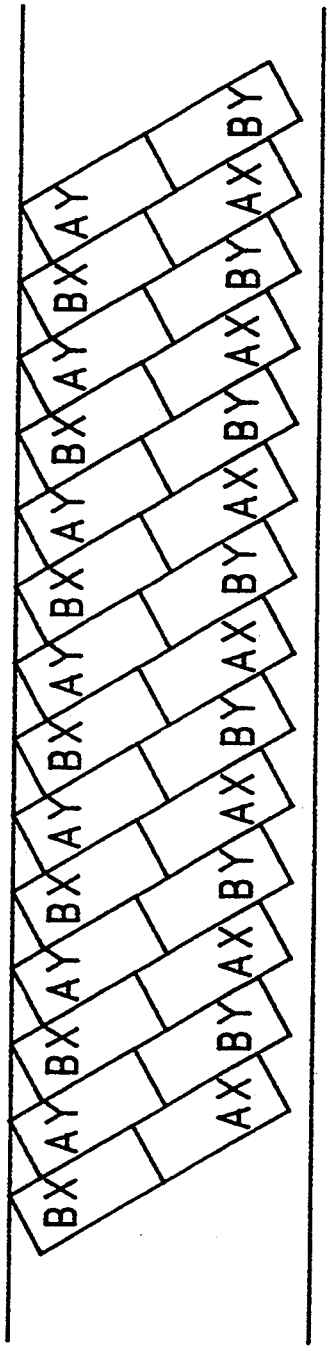
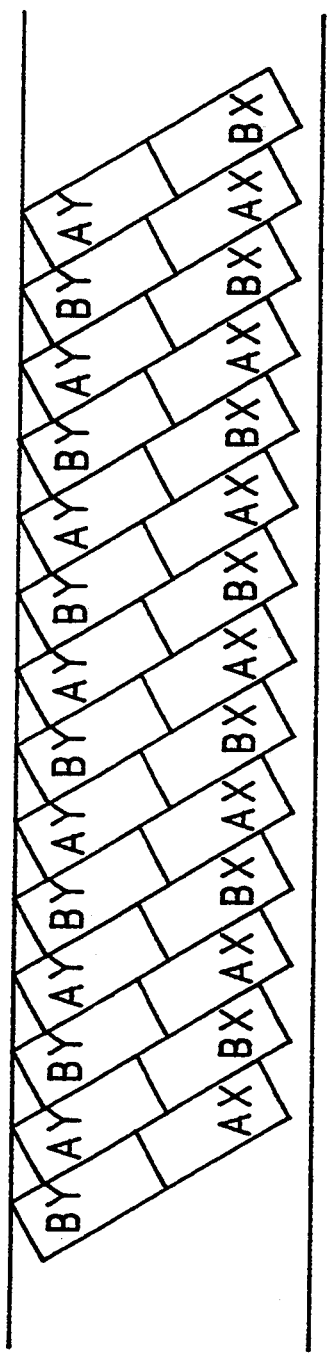
Fig. 17(a)
Fig. 17(b)

Fig. 21

| D | X | Y |
|---|---|---|
| ⋮ | ⋮ | ⋮ |
| -10 | -4 | -2 |
| -9 | -3 | -3 |
| -8 | -3 | -2 |
| -7 | -3 | -1 |
| -6 | -2 | -2 |
| -5 | -2 | -1 |
| -4 | -2 | 0 |
| -3 | -1 | -1 |
| -2 | -1 | 0 |
| -1 | 0 | -1 |
| 0 | 0 | 0 |
| 1 | 1 | 1 |
| 2 | 1 | 0 |
| 3 | 2 | 1 |
| 4 | 2 | 0 |
| 5 | 2 | 1 |
| 6 | 3 | 2 |
| 7 | 3 | 1 |
| 8 | 3 | 2 |
| 9 | 4 | 3 |
| 10 | 4 | 2 |
| ⋮ | ⋮ | ⋮ |

Fig. 22(a)

| 91 | -17 | -6 | 1 | -2 | 0 | 3 | -2 |
|---|---|---|---|---|---|---|---|
| -28 | 8 | 3 | -2 | 1 | 1 | -4 | 2 |
| 14 | -3 | -1 | 1 | 0 | -3 | 3 | -1 |
| -14 | 4 | 1 | -1 | 0 | 1 | -1 | 2 |
| 9 | 1 | 0 | 1 | 2 | -3 | -2 | 0 |
| -6 | 0 | -1 | 1 | 0 | 1 | 0 | 0 |
| 0 | 2 | 1 | -1 | 1 | 0 | -1 | 0 |
| -1 | 0 | 0 | 0 | 0 | 0 | 0 | 0 |

Fig. 22(b)

| 31 | -6 | -2 | 0 | -1 | 0 | 1 | -1 |
|---|---|---|---|---|---|---|---|
| -10 | 3 | 1 | -1 | 0 | 0 | -2 | 1 |
| 5 | -1 | 0 | 0 | 0 | -1 | 1 | 0 |
| 5 | 2 | 0 | 0 | 0 | 0 | 0 | 1 |
| 3 | 0 | 0 | 0 | 1 | -1 | -1 | 0 |
| -2 | 0 | 0 | 0 | 0 | 0 | 0 | 0 |
| 0 | 1 | 0 | 0 | 0 | 0 | 0 | 0 |
| 0 | 0 | 0 | 0 | 0 | 0 | 0 | 0 |

Fig. 22(c)

| 29 | -5 | -2 | 1 | 0 | 0 | 1 | 0 |
|---|---|---|---|---|---|---|---|
| -8 | 2 | 1 | 0 | 1 | 1 | 0 | 0 |
| 4 | -1 | -1 | 1 | 0 | -1 | 1 | -1 |
| -4 | 0 | 1 | -1 | 0 | 1 | -1 | 0 |
| 3 | 1 | 0 | 1 | 0 | -1 | 0 | 0 |
| -2 | 0 | -1 | 1 | 0 | 1 | 0 | 0 |
| 0 | 0 | 1 | -1 | 1 | 0 | -1 | 0 |
| -1 | 0 | 0 | 0 | 0 | 0 | 0 | 0 |

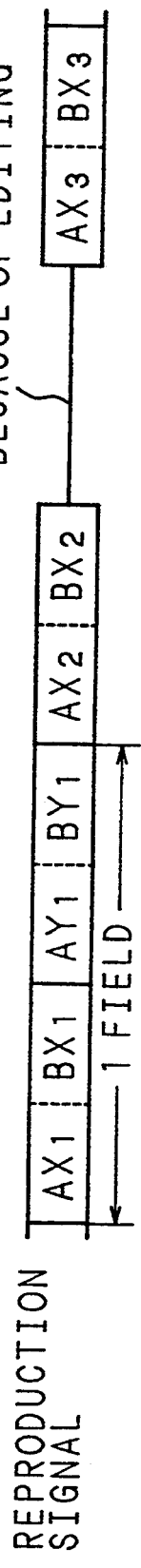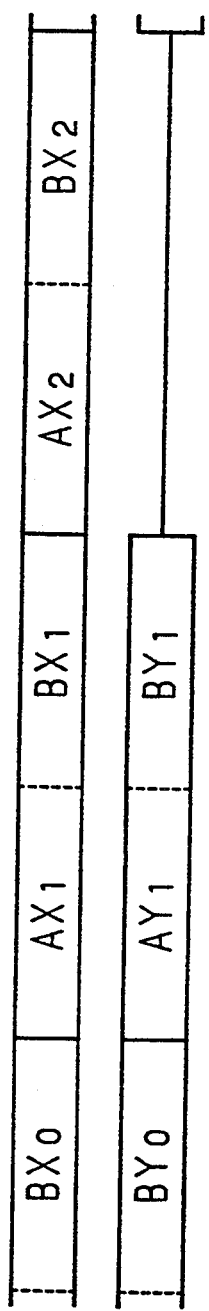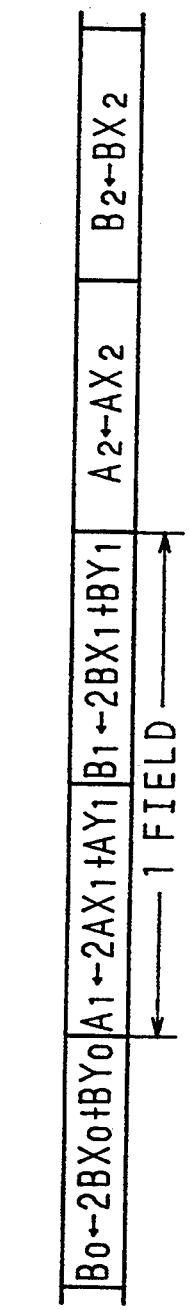
Fig. 24(a) REPRODUCTION SIGNAL
Fig. 24(b) CHANNEL CONVERSION
Fig. 24(c) DETECTION SIGNAL
Fig. 24(d) REPRODUCTION SIGNAL AFTER DIVIDING/SYNTHESIZING

Fig. 25

| X OR Y | D(ONLY X) | D(ONLY Y) |
|---|---|---|
| ⋮ | ⋮ | ⋮ |
| −10 | −29 | −41 |
| −9 | −26 | −36 |
| −8 | −23 | −33 |
| −7 | −20 | −28 |
| −6 | −17 | −25 |
| −5 | −14 | −20 |
| −4 | −11 | −17 |
| −3 | −8 | −12 |
| −2 | −5 | −9 |
| −1 | −2 | −4 |
| 0 | 0 | 0 |
| 1 | 2 | 4 |
| 2 | 5 | 9 |
| 3 | 8 | 12 |
| 4 | 11 | 17 |
| 5 | 14 | 20 |
| 6 | 17 | 25 |
| 7 | 20 | 28 |
| 8 | 23 | 33 |
| 9 | 26 | 36 |
| 10 | 29 | 41 |
| ⋮ | ⋮ | ⋮ |

Fig. 26

| D | X | Y |
|---|---|---|
| ⋮ | ⋮ | ⋮ |
| −10 | −3 | −1 |
| −9 | −2 | −3 |
| −8 | −2 | −2 |
| −7 | −2 | −1 |
| −6 | −2 | 0 |
| −5 | −1 | −2 |
| −4 | −1 | −1 |
| −3 | −1 | 0 |
| −2 | 0 | −2 |
| −1 | 0 | −1 |
| 0 | 0 | 0 |
| 1 | 0 | 1 |
| 2 | 0 | 2 |
| 3 | 1 | 0 |
| 4 | 1 | 1 |
| 5 | 1 | 2 |
| 6 | 2 | 0 |
| 7 | 2 | 1 |
| 8 | 2 | 2 |
| 9 | 2 | 3 |
| 10 | 3 | 1 |
| ⋮ | ⋮ | ⋮ |

Fig. 30

| D | $X_0$ | $X_1$ | $X_2$ | $X_3$ |
|---|---|---|---|---|
| 0 | 0 | 0 | 0 | 0 |
| 1 | 0 | 0 | 0 | 1 |
| 2 | 0 | 0 | 1 | 0 |
| 3 | 0 | 1 | 0 | 1 |
| 4 | 1 | 0 | 0 | 0 |
| 5 | 1 | 0 | 0 | 1 |
| 6 | 1 | 0 | 1 | 0 |
| 7 | 1 | 0 | 1 | 1 |
| 8 | 1 | 1 | 1 | 0 |
| 9 | 1 | 1 | 1 | 1 |
| 10 | 2 | 0 | 1 | 0 |
| 11 | 2 | 0 | 1 | 1 |
| 12 | 2 | 0 | 2 | 0 |
| 13 | 2 | 1 | 1 | 1 |
| 14 | 2 | 1 | 2 | 0 |
| 15 | 2 | 1 | 2 | 1 |
| 16 | 2 | 2 | 2 | 0 |
| 17 | 2 | 2 | 2 | 1 |
| 18 | 2 | 2 | 2 | 2 |
| 19 | 3 | 1 | 2 | 1 |
| 20 | 3 | 1 | 2 | 2 |
| 21 | 3 | 1 | 3 | 1 |
| 22 | 3 | 2 | 2 | 2 |
| 23 | 3 | 2 | 3 | 1 |
| 24 | 3 | 2 | 3 | 2 |
| 25 | 3 | 3 | 3 | 1 |

| D | $X_0$ | $X_1$ | $X_2$ | $X_3$ |
|---|---|---|---|---|
| 26 | 3 | 3 | 3 | 2 |
| 27 | 3 | 3 | 3 | 3 |
| 28 | 4 | 2 | 3 | 2 |
| 29 | 4 | 2 | 3 | 3 |
| 30 | 4 | 2 | 4 | 2 |
| 31 | 4 | 3 | 3 | 3 |
| 32 | 4 | 3 | 4 | 2 |
| 33 | 4 | 3 | 4 | 3 |
| 34 | 4 | 4 | 4 | 2 |
| 35 | 4 | 4 | 4 | 3 |
| 36 | 4 | 4 | 4 | 4 |
| 37 | 5 | 3 | 4 | 3 |
| 38 | 5 | 3 | 4 | 4 |
| 39 | 5 | 3 | 5 | 3 |
| 40 | 5 | 4 | 4 | 4 |
| 41 | 5 | 4 | 5 | 3 |
| 42 | 5 | 4 | 5 | 4 |
| 43 | 5 | 5 | 5 | 3 |
| 44 | 5 | 5 | 5 | 4 |
| 45 | 5 | 5 | 5 | 5 |
| 46 | 6 | 4 | 5 | 4 |
| 47 | 6 | 4 | 5 | 5 |
| 48 | 6 | 4 | 6 | 4 |
| 49 | 6 | 5 | 5 | 5 |

Fig. 31

| D | X | Y |
|---|---|---|
| ⋮ | ⋮ | ⋮ |
| −10 | −5 | −4 |
| −9 | −4 | −5 |
| −8 | −4 | −4 |
| −7 | −3 | −3 |
| −6 | −3 | −2 |
| −5 | −2 | −3 |
| −4 | −2 | −2 |
| −3 | −1 | −1 |
| −2 | −1 | 0 |
| −1 | 0 | −1 |
| 0 | 0 | 0 |
| 1 | 0 | 1 |
| 2 | 1 | 0 |
| 3 | 1 | 1 |
| 4 | 2 | 2 |
| 5 | 2 | 3 |
| 6 | 3 | 2 |
| 7 | 3 | 3 |
| 8 | 4 | 4 |
| 9 | 4 | 5 |
| 10 | 5 | 4 |
| ⋮ | ⋮ | ⋮ |

Fig. 32(a)

| 91 | -17 | -6 | 1 | -2 | 0 | 3 | -2 |
|---|---|---|---|---|---|---|---|
| -28 | 8 | 3 | -2 | 1 | 1 | -4 | 2 |
| 14 | -3 | -1 | 1 | 0 | -3 | 3 | -1 |
| -14 | 4 | 1 | -1 | 0 | 1 | -1 | 2 |
| 9 | 1 | 0 | 1 | 2 | -3 | -2 | 0 |
| -6 | 0 | -1 | 1 | 0 | 1 | 0 | 0 |
| 0 | 2 | 1 | -1 | 1 | 0 | -1 | 0 |
| -1 | 0 | 0 | 0 | 0 | 0 | 0 | 0 |

Fig. 32(b)

| 45 | -8 | -3 | 0 | -1 | 0 | 1 | -1 |
|---|---|---|---|---|---|---|---|
| -14 | 4 | 1 | -1 | 0 | 0 | -2 | 1 |
| 7 | -1 | 0 | 0 | 0 | -1 | 1 | 0 |
| -7 | 2 | 0 | 0 | 0 | 0 | 0 | 1 |
| 4 | 0 | 0 | 0 | 1 | -1 | -1 | 0 |
| -3 | 0 | 0 | 0 | 0 | 0 | 0 | 0 |
| 0 | 1 | 0 | 0 | 0 | 0 | 0 | 0 |
| 0 | 0 | 0 | 0 | 0 | 0 | 0 | 0 |

Fig. 32(c)

| 46 | -9 | -2 | 1 | 0 | 0 | 1 | 0 |
|---|---|---|---|---|---|---|---|
| -14 | 4 | 1 | 0 | 1 | 1 | -2 | 0 |
| 6 | -1 | -1 | 1 | 0 | -1 | 1 | -1 |
| -6 | 2 | 1 | -1 | 0 | 1 | -1 | 0 |
| 5 | 1 | 0 | 1 | 0 | -1 | 0 | 0 |
| -2 | 0 | -1 | 1 | 0 | 1 | 0 | 0 |
| 0 | 2 | 1 | -1 | 1 | 0 | -1 | 0 |
| -1 | 0 | 0 | 0 | 0 | 0 | 0 | 0 |

Fig. 33

| X OR Y | D(ONLY X) | D(ONLY Y) |
|---|---|---|
| ⋮ | ⋮ | ⋮ |
| -10 | -20 | -21 |
| -9 | -18 | -18 |
| -8 | -16 | -17 |
| -7 | -14 | -14 |
| -6 | -12 | -13 |
| -5 | -10 | -10 |
| -4 | -8 | -9 |
| -3 | -6 | -6 |
| -2 | -4 | -5 |
| -1 | -2 | -2 |
| 0 | 0 | 0 |
| 1 | 2 | 2 |
| 2 | 4 | 5 |
| 3 | 6 | 6 |
| 4 | 8 | 9 |
| 5 | 10 | 10 |
| 6 | 12 | 13 |
| 7 | 14 | 14 |
| 8 | 16 | 17 |
| 9 | 18 | 18 |
| 10 | 20 | 21 |
| ⋮ | ⋮ | ⋮ |

Fig. 34

| D | X | Y |
|---|---|---|
| ⋮ | ⋮ | ⋮ |
| −10 | −5 | −2 |
| −9 | −4 | −3 |
| −8 | −4 | −2 |
| −7 | −3 | −3 |
| −6 | −3 | −2 |
| −5 | −2 | −1 |
| −4 | −2 | 0 |
| −3 | −1 | −1 |
| −2 | −1 | 0 |
| −1 | 0 | −1 |
| 0 | 0 | 0 |
| 1 | 0 | 1 |
| 2 | 1 | 0 |
| 3 | 1 | 1 |
| 4 | 2 | 0 |
| 5 | 2 | 1 |
| 6 | 3 | 2 |
| 7 | 3 | 3 |
| 8 | 4 | 2 |
| 9 | 4 | 3 |
| 10 | 5 | 2 |
| ⋮ | ⋮ | ⋮ |

Fig. 35

| D | X0 | X1 | X2 | X3 |
|---|----|----|----|----|
| 0 | 0 | 0 | 0 | 0 |
| 1 | 0 | 0 | 0 | 1 |
| 2 | 0 | 1 | 0 | 0 |
| 3 | 0 | 1 | 0 | 1 |
| 4 | 1 | 0 | 1 | 0 |
| 5 | 1 | 0 | 1 | 1 |
| 6 | 1 | 1 | 1 | 0 |
| 7 | 1 | 1 | 1 | 1 |
| 8 | 2 | 2 | 2 | 2 |
| 9 | 2 | 2 | 2 | 3 |
| 10 | 2 | 3 | 2 | 2 |
| 11 | 2 | 3 | 2 | 3 |
| 12 | 3 | 2 | 3 | 2 |
| 13 | 3 | 2 | 3 | 3 |
| 14 | 3 | 3 | 3 | 2 |
| 15 | 3 | 3 | 3 | 3 |
| 16 | 4 | 4 | 4 | 4 |
| 17 | 4 | 4 | 4 | 5 |
| 18 | 4 | 5 | 4 | 4 |
| 19 | 4 | 5 | 4 | 5 |
| 20 | 5 | 4 | 5 | 4 |
| 21 | 5 | 4 | 5 | 5 |
| 22 | 5 | 5 | 5 | 4 |
| 23 | 5 | 5 | 5 | 5 |
| 24 | 6 | 6 | 6 | 6 |
| 25 | 6 | 6 | 6 | 7 |

| D | X0 | X1 | X2 | X3 |
|---|----|----|----|----|
| 26 | 6 | 7 | 6 | 6 |
| 27 | 6 | 7 | 6 | 7 |
| 28 | 7 | 6 | 7 | 6 |
| 29 | 7 | 6 | 7 | 7 |
| 30 | 7 | 7 | 7 | 6 |
| 31 | 7 | 7 | 7 | 7 |
| 32 | 8 | 8 | 8 | 8 |
| 33 | 8 | 8 | 8 | 9 |
| 34 | 8 | 9 | 8 | 8 |
| 35 | 8 | 9 | 8 | 9 |
| 36 | 9 | 8 | 9 | 8 |
| 37 | 9 | 8 | 9 | 9 |
| 38 | 9 | 9 | 9 | 8 |
| 39 | 9 | 9 | 9 | 9 |
| 40 | 10 | 10 | 10 | 10 |
| 41 | 10 | 10 | 10 | 11 |
| 42 | 10 | 11 | 10 | 10 |
| 43 | 10 | 11 | 10 | 11 |
| 44 | 11 | 10 | 11 | 10 |
| 45 | 11 | 10 | 11 | 11 |
| 46 | 11 | 11 | 11 | 10 |
| 47 | 11 | 11 | 11 | 11 |
| 48 | 12 | 12 | 12 | 12 |

Fig. 36

|  | Y | CB | CR | TOTAL |
|---|---|---|---|---|
| TWICE WRITING | 42,466 | 10,698 | 10,770 | 63,934 |
| 11th EMBODIMENT | 27,234 | 6,814 | 6,420 | 40,470 |
| 12th EMBODIMENT | 26,113 | 6,526 | 6,148 | 38,789 |
| 14th EMBODIMENT | 33,458 | 8,292 | 7,328 | 49,083 |
| 15th EMBODIMENT | 29,447 | 7,415 | 6,877 | 43,741 |
| 17th EMBODIMENT | 39,371 | 9,875 | 8,635 | 57,884 |

Fig. 37(a)

| D | x | y | z | 2Xy+z |
|---|---|---|---|-------|
| 0 | 0 | 0 | 0 | 0 |
| 1 | 0 | 0 | 1 | 1 |
| 2 | 1 | 0 | 1 | 1 |
| 3 | 2 | 0 | 0 | 0 |
| 4 | 2 | 0 | 1 | 1 |
| 5 | 2 | 1 | 0 | 2 |
| 6 | 3 | 0 | 0 | 0 |
| 7 | 3 | 0 | 1 | 1 |
| 8 | 3 | 1 | 0 | 2 |
| 9 | 4 | 0 | 0 | 0 |
| 10 | 4 | 0 | 1 | 1 |
| 11 | 4 | 1 | 0 | 2 |
| 12 | 4 | 1 | 1 | 3 |
| 13 | 5 | 0 | 0 | 0 |
| 14 | 5 | 0 | 1 | 1 |
| 15 | 5 | 1 | 0 | 2 |
| 16 | 5 | 1 | 1 | 3 |
| 17 | 6 | 0 | 0 | 0 |
| 18 | 6 | 0 | 1 | 1 |
| 19 | 6 | 1 | 0 | 2 |
| 20 | 6 | 1 | 1 | 3 |
| 21 | 7 | 0 | 0 | 0 |
| 22 | 7 | 0 | 1 | 1 |
| 23 | 7 | 1 | 0 | 2 |
| 24 | 7 | 1 | 1 | 3 |
| 25 | 7 | 2 | 0 | 4 |
| 26 | 8 | 0 | 0 | 0 |
| 27 | 8 | 0 | 1 | 1 |
| 28 | 8 | 1 | 0 | 2 |
| 29 | 8 | 1 | 1 | 3 |
| 30 | 8 | 2 | 0 | 4 |
| 31 | 9 | 0 | 0 | 0 |
| 32 | 9 | 0 | 1 | 1 |
| 33 | 9 | 1 | 0 | 2 |
| 34 | 9 | 1 | 1 | 3 |
| 35 | 9 | 2 | 0 | 4 |
| 36 | 9 | 2 | 1 | 5 |
| 37 | 10 | 0 | 0 | 0 |
| 38 | 10 | 0 | 1 | 1 |
| 39 | 10 | 1 | 0 | 2 |
| ... | ... | ... | ... | ... |
| ... | ... | ... | ... | ... |

Fig. 37(b)

| D | x | y | z | 2×y+z |
|---|---|---|---|---|
| ... | ... | ... | ... | ... |
| ... | ... | ... | ... | ... |
| 2008 | 126 | 55 | 0 | 110 |
| 2009 | 126 | 55 | 1 | 111 |
| 2010 | 126 | 56 | 0 | 112 |
| 2011 | 126 | 56 | 1 | 113 |
| 2012 | 126 | 57 | 0 | 114 |
| 2013 | 126 | 57 | 1 | 115 |
| 2014 | 126 | 58 | 0 | 116 |
| 2015 | 126 | 58 | 1 | 117 |
| 2016 | 126 | 59 | 0 | 118 |
| 2017 | 126 | 59 | 1 | 119 |
| 2018 | 126 | 60 | 0 | 120 |
| 2019 | 126 | 60 | 1 | 121 |
| 2020 | 126 | 61 | 0 | 122 |
| 2021 | 126 | 61 | 1 | 123 |
| 2022 | 126 | 62 | 0 | 124 |
| 2023 | 127 | 51 | 0 | 102 |
| 2024 | 127 | 51 | 1 | 103 |
| 2025 | 127 | 52 | 0 | 104 |
| 2026 | 127 | 52 | 1 | 105 |
| 2027 | 127 | 53 | 0 | 106 |
| 2028 | 127 | 53 | 1 | 107 |
| 2029 | 127 | 54 | 0 | 108 |
| 2030 | 127 | 54 | 1 | 109 |
| 2031 | 127 | 55 | 0 | 110 |
| 2032 | 127 | 55 | 1 | 111 |
| 2033 | 127 | 56 | 0 | 112 |
| 2034 | 127 | 56 | 1 | 113 |
| 2035 | 127 | 57 | 0 | 114 |
| 2036 | 127 | 57 | 1 | 115 |
| 2037 | 127 | 58 | 0 | 116 |
| 2038 | 127 | 58 | 1 | 117 |
| 2039 | 127 | 59 | 0 | 118 |
| 2040 | 127 | 59 | 1 | 119 |
| 2041 | 127 | 60 | 0 | 120 |
| 2042 | 127 | 60 | 1 | 121 |
| 2043 | 127 | 61 | 0 | 122 |
| 2044 | 127 | 61 | 1 | 123 |
| 2045 | 127 | 62 | 0 | 124 |
| 2046 | 127 | 62 | 1 | 125 |
| 2047 | 127 | 63 | 0 | 126 |

Fig. 39(a)

| 91 | -17 | -6 | 1 | -2 | 0 | 3 | -2 |
|---|---|---|---|---|---|---|---|
| -28 | 8 | 3 | -2 | 1 | 1 | -4 | 2 |
| 14 | -3 | -1 | 1 | 0 | -3 | 3 | -1 |
| -14 | 4 | 1 | -1 | 0 | 1 | -1 | 2 |
| 9 | 1 | 0 | 1 | 2 | -3 | -2 | 0 |
| -6 | 0 | -1 | 1 | 0 | 1 | 0 | 0 |
| 0 | 2 | 1 | -1 | 1 | 0 | -1 | 0 |
| -1 | 0 | 0 | 0 | 0 | 0 | 0 | 0 |

Fig. 39(b)

| 17 | -1 | -1 | 0 | -1 | 0 | 2 | -1 |
|---|---|---|---|---|---|---|---|
| -2 | 3 | 2 | -1 | 0 | 0 | -1 | 1 |
| 5 | -1 | -1 | 0 | 0 | -1 | 2 | -1 |
| -1 | 2 | 0 | -1 | 0 | 0 | -1 | 1 |
| 4 | 0 | 0 | 0 | 1 | -1 | -1 | 0 |
| -1 | 0 | -1 | 0 | 0 | 0 | 0 | 0 |
| 0 | 1 | 0 | -1 | 0 | 0 | -1 | 0 |
| -1 | 0 | 0 | 0 | 0 | 0 | 0 | 0 |

Fig. 39(c)

| 7 | -18 | -7 | 1 | -3 | 0 | 0 | -3 |
|---|---|---|---|---|---|---|---|
| -6 | 2 | 0 | -3 | 1 | 1 | -5 | 1 |
| 1 | -4 | -2 | 1 | 0 | -4 | 0 | -2 |
| -15 | 1 | 1 | -2 | 0 | 1 | -2 | 1 |
| 0 | 1 | 0 | 1 | 1 | -4 | -3 | 0 |
| -7 | 0 | -2 | 1 | 0 | 1 | 0 | 0 |
| 0 | 1 | 1 | -2 | 1 | 0 | -2 | 0 |
| -2 | 0 | 0 | 0 | 0 | 0 | 0 | 0 |

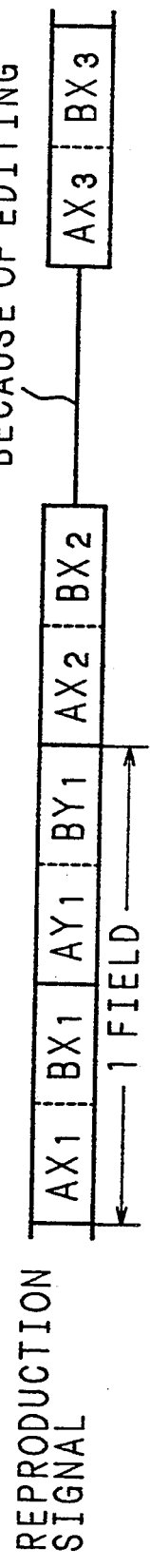
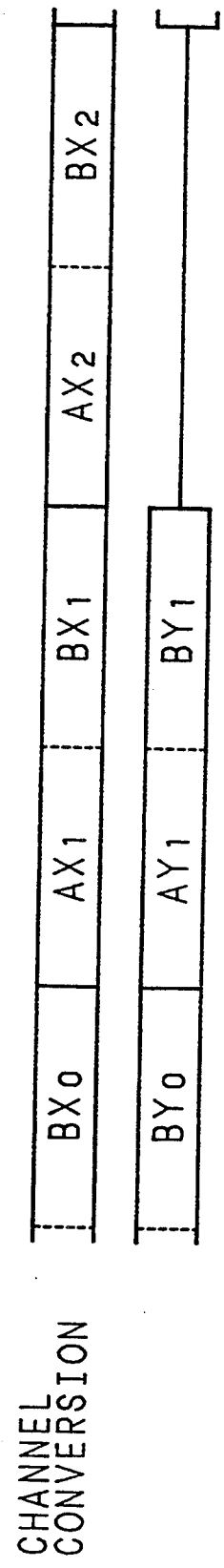
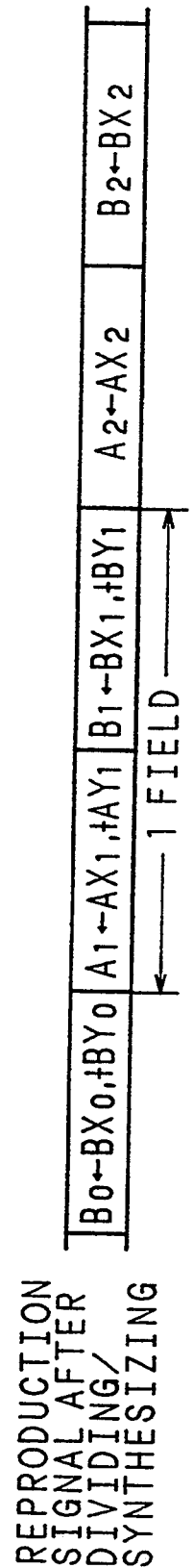
Fig. 40(a) REPRODUCTION SIGNAL
Fig. 40(b) CHANNEL CONVERSION
Fig. 40(c) DETECTION SIGNAL
Fig. 40(d) REPRODUCTION SIGNAL AFTER DIVIDING/SYNTHESIZING

Fig. 41

| X | D | Y | D |
|---|---|---|---|
| 0 | 1 | 0 | 21 |
| 1 | 2 | 1 | 27 |
| 2 | 4 | 2 | 46 |
| 3 | 7 | 3 | 52 |
| 4 | 11 | 4 | 81 |
| 5 | 15 | 5 | 92 |
| 6 | 19 | 6 | 117 |
| 7 | 23 | 7 | 123 |
| 8 | 28 | 8 | 150 |
| 9 | 34 | 9 | 160 |
| 10 | 40 | 10 | 190 |
| 11 | 46 | 11 | 191 |
| ⋮ | ⋮ | ⋮ | ⋮ |
| 120 | 1864 | 120 | 1982 |
| 121 | 1888 | 121 | 1994 |
| 122 | 1913 | 122 | 2007 |
| 123 | 1937 | 123 | 2008 |
| 124 | 1961 | 124 | 2021 |
| 125 | 1986 | 125 | 2034 |
| 126 | 2010 | 126 | 2046 |
| 127 | 2035 | 127 | 2047 |

Fig. 42(a)

| x | D MAX | D MIN | D DIF-FERENCE | D NUMBER | D AVERAGE |
|---|---|---|---|---|---|
| 0 | 1 | 0 | 1 | 2 | 0.5 |
| 1 | 2 | 2 | 0 | 1 | 2 |
| 2 | 5 | 3 | 2 | 3 | 4 |
| 3 | 8 | 6 | 2 | 3 | 7 |
| 4 | 12 | 9 | 3 | 4 | 10.5 |
| 5 | 16 | 13 | 3 | 4 | 14.5 |
| 6 | 20 | 17 | 3 | 4 | 18.5 |
| 7 | 25 | 21 | 4 | 5 | 23 |
| 8 | 30 | 26 | 4 | 5 | 28 |
| 9 | 36 | 31 | 5 | 6 | 33.5 |
| 10 | 42 | 37 | 5 | 6 | 39.5 |
| 11 | 48 | 43 | 5 | 6 | 45.5 |
| 12 | 56 | 49 | 7 | 8 | 52.5 |
| 13 | 62 | 57 | 5 | 6 | 59.5 |
| 14 | 69 | 63 | 6 | 7 | 66 |
| 15 | 77 | 70 | 7 | 8 | 73.5 |
| 16 | 85 | 78 | 7 | 8 | 81.5 |
| 17 | 93 | 86 | 7 | 8 | 89.5 |
| 18 | 101 | 94 | 7 | 8 | 97.5 |
| 19 | 111 | 102 | 9 | 10 | 106.5 |
| 20 | 119 | 112 | 7 | 8 | 115.5 |
| 21 | 128 | 120 | 8 | 9 | 124 |
| 22 | 137 | 129 | 8 | 9 | 133 |
| 23 | 147 | 138 | 9 | 10 | 142.5 |
| 24 | 156 | 148 | 8 | 9 | 152 |
| 25 | 167 | 157 | 10 | 11 | 162 |
| 26 | 177 | 168 | 9 | 10 | 172.5 |
| 27 | 187 | 178 | 9 | 10 | 182.5 |
| 28 | 199 | 188 | 11 | 12 | 193.5 |
| 29 | 209 | 200 | 9 | 10 | 204.5 |
| 30 | 220 | 210 | 10 | 11 | 215 |
| 31 | 231 | 221 | 10 | 11 | 226 |
| 32 | 243 | 232 | 11 | 12 | 237.5 |
| 33 | 255 | 244 | 11 | 12 | 249.5 |
| 34 | 266 | 256 | 10 | 11 | 261 |
| 35 | 278 | 267 | 11 | 12 | 272.5 |
| 36 | 292 | 279 | 13 | 14 | 285.5 |
| 37 | 304 | 293 | 11 | 12 | 298.5 |

Fig. 42(b)

| x | D MAX | D MIN | D DIF-FERENCE | D NUMBER | D AVERAGE |
|---|---|---|---|---|---|
| 38 | 316 | 305 | 11 | 12 | 310.5 |
| 39 | 330 | 317 | 13 | 14 | 323.5 |
| 40 | 342 | 331 | 11 | 12 | 336.5 |
| 41 | 355 | 343 | 12 | 13 | 349 |
| 42 | 369 | 356 | 13 | 14 | 362.5 |
| 43 | 383 | 370 | 13 | 14 | 376.5 |
| 44 | 397 | 384 | 13 | 14 | 390.5 |
| 45 | 410 | 398 | 12 | 13 | 404 |
| 46 | 425 | 411 | 14 | 15 | 418 |
| 47 | 439 | 426 | 13 | 14 | 432.5 |
| 48 | 454 | 440 | 14 | 15 | 447 |
| 49 | 468 | 455 | 13 | 14 | 461.5 |
| 50 | 484 | 469 | 15 | 15 | 476.07 |
| 51 | 498 | 483 | 15 | 15 | 490.93 |
| 52 | 513 | 499 | 14 | 15 | 506 |
| 53 | 529 | 514 | 15 | 16 | 521.5 |
| 54 | 544 | 530 | 14 | 15 | 537 |
| 55 | 560 | 545 | 15 | 16 | 552.5 |
| 56 | 576 | 561 | 15 | 16 | 568.5 |
| 57 | 592 | 577 | 15 | 16 | 584.5 |
| 58 | 607 | 593 | 14 | 15 | 600 |
| 59 | 624 | 608 | 16 | 17 | 616 |
| 60 | 640 | 625 | 15 | 16 | 632.5 |
| 61 | 657 | 641 | 16 | 17 | 649 |
| 62 | 673 | 658 | 15 | 16 | 665.5 |
| 63 | 691 | 674 | 17 | 18 | 682.5 |
| 64 | 707 | 692 | 15 | 16 | 699.5 |
| 65 | 725 | 708 | 17 | 18 | 716.5 |
| 66 | 742 | 726 | 16 | 17 | 734 |
| 67 | 760 | 743 | 17 | 18 | 751.5 |
| 68 | 777 | 761 | 16 | 17 | 769 |
| 69 | 795 | 778 | 17 | 18 | 786.5 |
| 70 | 813 | 796 | 17 | 18 | 804.5 |
| 71 | 831 | 814 | 17 | 18 | 822.5 |
| 72 | 849 | 832 | 17 | 18 | 840.5 |
| 73 | 867 | 850 | 17 | 18 | 858.5 |
| 74 | 886 | 868 | 18 | 19 | 877 |
| 75 | 904 | 887 | 17 | 18 | 895.5 |

Fig. 42(c)

| x | D MAX | D MIN | D DIFFERENCE | D NUMBER | D AVERAGE |
|---|---|---|---|---|---|
| 76 | 923 | 905 | 18 | 19 | 914 |
| 77 | 941 | 924 | 17 | 18 | 932.5 |
| 78 | 961 | 942 | 19 | 20 | 951.5 |
| 79 | 979 | 962 | 17 | 18 | 970.5 |
| 80 | 999 | 980 | 19 | 20 | 989.5 |
| 81 | 1018 | 1000 | 18 | 19 | 1009 |
| 82 | 1038 | 1019 | 19 | 20 | 1028.5 |
| 83 | 1059 | 1039 | 20 | 21 | 1049 |
| 84 | 1078 | 1060 | 18 | 19 | 1069 |
| 85 | 1098 | 1079 | 19 | 20 | 1088.5 |
| 86 | 1118 | 1099 | 19 | 20 | 1108.5 |
| 87 | 1138 | 1119 | 19 | 20 | 1128.5 |
| 88 | 1158 | 1139 | 19 | 20 | 1148.5 |
| 89 | 1178 | 1159 | 19 | 20 | 1168.5 |
| 90 | 1199 | 1179 | 20 | 21 | 1189 |
| 91 | 1221 | 1200 | 21 | 22 | 1210.5 |
| 92 | 1241 | 1222 | 19 | 20 | 1231.5 |
| 93 | 1263 | 1242 | 21 | 22 | 1252.5 |
| 94 | 1283 | 1264 | 19 | 20 | 1273.5 |
| 95 | 1305 | 1284 | 21 | 22 | 1294.5 |
| 96 | 1327 | 1306 | 21 | 21 | 1316.05 |
| 97 | 1347 | 1326 | 21 | 21 | 1336.95 |
| 98 | 1369 | 1348 | 21 | 22 | 1358.5 |
| 99 | 1390 | 1370 | 20 | 21 | 1380 |
| 100 | 1412 | 1391 | 21 | 22 | 1401.5 |
| 101 | 1435 | 1413 | 22 | 23 | 1424 |
| 102 | 1457 | 1436 | 21 | 22 | 1446.5 |
| 103 | 1479 | 1458 | 21 | 22 | 1468.5 |
| 104 | 1501 | 1480 | 21 | 22 | 1490.5 |
| 105 | 1524 | 1502 | 22 | 23 | 1513 |
| 106 | 1546 | 1525 | 21 | 22 | 1535.5 |
| 107 | 1569 | 1547 | 22 | 23 | 1558 |
| 108 | 1591 | 1570 | 21 | 22 | 1580.5 |
| 109 | 1615 | 1592 | 23 | 24 | 1603.5 |
| 110 | 1638 | 1616 | 22 | 23 | 1627 |
| 111 | 1660 | 1639 | 21 | 22 | 1649.5 |
| 112 | 1684 | 1661 | 23 | 24 | 1672.5 |
| 113 | 1708 | 1685 | 23 | 24 | 1696.5 |

Fig. 42(d)

| x | D MAX | D MIN | D DIF-FERENCE | D NUMBER | D AVERAGE |
|---|---|---|---|---|---|
| 114 | 1731 | 1709 | 22 | 23 | 1720 |
| 115 | 1755 | 1732 | 23 | 24 | 1743.5 |
| 116 | 1779 | 1756 | 23 | 24 | 1767.5 |
| 117 | 1802 | 1780 | 22 | 23 | 1791 |
| 118 | 1826 | 1803 | 23 | 24 | 1814.5 |
| 119 | 1851 | 1827 | 24 | 25 | 1839 |
| 120 | 1875 | 1852 | 23 | 24 | 1863.5 |
| 121 | 1900 | 1876 | 24 | 25 | 1888 |
| 122 | 1924 | 1901 | 23 | 24 | 1912.5 |
| 123 | 1948 | 1925 | 23 | 24 | 1936.5 |
| 124 | 1973 | 1949 | 24 | 25 | 1961 |
| 125 | 1997 | 1974 | 23 | 24 | 1985.5 |
| 126 | 2022 | 1998 | 24 | 25 | 2010 |
| 127 | 2047 | 2023 | 24 | 25 | 2035 |

Fig. 43(a)

| y | D MAX | D MIN | D DIFFERENCE | D NUMBER | D AVERAGE |
|---|---|---|---|---|---|
| 0 | 70 | 0 | 70 | 27 | 24.33 |
| 1 | 103 | 5 | 98 | 34 | 48.85 |
| 2 | 158 | 25 | 133 | 35 | 86.14 |
| 3 | 210 | 55 | 155 | 35 | 119.86 |
| 4 | 244 | 77 | 167 | 36 | 154.67 |
| 5 | 280 | 110 | 170 | 36 | 190.17 |
| 6 | 318 | 128 | 190 | 36 | 222.72 |
| 7 | 370 | 167 | 203 | 36 | 263.17 |
| 8 | 411 | 198 | 213 | 36 | 294.22 |
| 9 | 440 | 231 | 209 | 34 | 331.5 |
| 10 | 483 | 255 | 228 | 35 | 367.66 |
| 11 | 515 | 291 | 224 | 36 | 399.11 |
| 12 | 561 | 329 | 232 | 35 | 437.71 |
| 13 | 608 | 355 | 253 | 35 | 474.34 |
| 14 | 641 | 383 | 258 | 36 | 507.92 |
| 15 | 675 | 424 | 251 | 36 | 546.11 |
| 16 | 709 | 453 | 256 | 36 | 577.78 |
| 17 | 744 | 484 | 260 | 35 | 613.69 |
| 18 | 796 | 513 | 283 | 36 | 650.72 |
| 19 | 832 | 544 | 288 | 36 | 684.31 |
| 20 | 868 | 576 | 292 | 36 | 718.42 |
| 21 | 905 | 623 | 282 | 35 | 757.2 |
| 22 | 943 | 656 | 287 | 36 | 796.61 |
| 23 | 1000 | 690 | 310 | 37 | 837.03 |
| 24 | 1039 | 724 | 315 | 37 | 873.54 |
| 25 | 1041 | 742 | 299 | 35 | 892.54 |
| 26 | 1099 | 777 | 322 | 36 | 934.53 |
| 27 | 1139 | 813 | 326 | 36 | 972.42 |
| 28 | 1180 | 849 | 331 | 37 | 1015.32 |
| 29 | 1201 | 885 | 316 | 36 | 1040.39 |
| 30 | 1243 | 922 | 321 | 36 | 1079.72 |
| 31 | 1285 | 960 | 325 | 36 | 1119.61 |
| 32 | 1326 | 998 | 328 | 35 | 1155.17 |
| 33 | 1370 | 1037 | 333 | 35 | 1195.91 |
| 34 | 1413 | 1058 | 355 | 37 | 1227.43 |
| 35 | 1436 | 1078 | 358 | 36 | 1253.86 |
| 36 | 1480 | 1118 | 362 | 36 | 1295.75 |
| 37 | 1503 | 1158 | 345 | 35 | 1332.77 |

Fig. 43(b)

| y | D MAX | D MIN | D DIFFERENCE | D NUMBER | D AVERAGE |
|---|---|---|---|---|---|
| 38 | 1548 | 1199 | 349 | 35 | 1375.54 |
| 39 | 1593 | 1220 | 373 | 38 | 1403.66 |
| 40 | 1617 | 1262 | 355 | 36 | 1436.61 |
| 41 | 1662 | 1304 | 358 | 36 | 1480.39 |
| 42 | 1709 | 1327 | 382 | 36 | 1514.08 |
| 43 | 1733 | 1368 | 365 | 36 | 1548 |
| 44 | 1780 | 1411 | 369 | 35 | 1587.69 |
| 45 | 1827 | 1434 | 393 | 37 | 1622.35 |
| 46 | 1852 | 1457 | 395 | 36 | 1651.39 |
| 47 | 1877 | 1501 | 376 | 35 | 1691.6 |
| 48 | 1925 | 1524 | 401 | 36 | 1721.56 |
| 49 | 1950 | 1569 | 381 | 35 | 1762.34 |
| 50 | 1999 | 1614 | 385 | 36 | 1803.94 |
| 51 | 2024 | 1638 | 386 | 35 | 1833.97 |
| 52 | 2026 | 1683 | 343 | 32 | 1853 |
| 53 | 2028 | 1707 | 321 | 30 | 1866.3 |
| 54 | 2030 | 1754 | 276 | 26 | 1890.96 |
| 55 | 2032 | 1778 | 254 | 24 | 1904.33 |
| 56 | 2034 | 1825 | 209 | 20 | 1929.2 |
| 57 | 2036 | 1850 | 186 | 18 | 1942.72 |
| 58 | 2038 | 1875 | 163 | 15 | 1961.6 |
| 59 | 2040 | 1900 | 140 | 13 | 1975.08 |
| 60 | 2042 | 1948 | 94 | 9 | 2000 |
| 61 | 2044 | 1973 | 71 | 7 | 2013.43 |
| 62 | 2046 | 2022 | 24 | 3 | 2037.67 |
| 63 | 2047 | 2047 | 0 | 1 | 2047 |

Fig. 44(a)

| 2xy+z | D MAX | D MIN | D DIFFERENCE | D NUMBER | D AVERAGE |
|---|---|---|---|---|---|
| 0 | 49 | 0 | 49 | 12 | 21.25 |
| 1 | 70 | 1 | 69 | 15 | 26.8 |
| 2 | 102 | 5 | 97 | 18 | 46.06 |
| 3 | 103 | 12 | 91 | 16 | 52 |
| 4 | 157 | 25 | 132 | 18 | 80.72 |
| 5 | 158 | 36 | 122 | 17 | 91.88 |
| 6 | 188 | 55 | 133 | 17 | 116.71 |
| 7 | 210 | 56 | 154 | 18 | 122.83 |
| 8 | 232 | 77 | 155 | 18 | 149.56 |
| 9 | 244 | 85 | 159 | 18 | 159.78 |
| 10 | 279 | 110 | 169 | 18 | 189.67 |
| 11 | 280 | 111 | 169 | 18 | 190.67 |
| 12 | 317 | 128 | 189 | 19 | 217.53 |
| 13 | 318 | 147 | 171 | 17 | 228.53 |
| 14 | 356 | 167 | 189 | 18 | 257.06 |
| 15 | 370 | 177 | 193 | 18 | 269.28 |
| 16 | 384 | 198 | 186 | 17 | 287.24 |
| 17 | 411 | 199 | 212 | 19 | 300.47 |
| 18 | 426 | 231 | 195 | 17 | 324.88 |
| 19 | 440 | 243 | 197 | 17 | 338.12 |
| 20 | 483 | 255 | 228 | 19 | 364.63 |
| 21 | 470 | 278 | 192 | 16 | 371.25 |
| 22 | 514 | 291 | 223 | 18 | 398.61 |
| 23 | 515 | 292 | 223 | 18 | 399.61 |
| 24 | 545 | 329 | 216 | 17 | 433.59 |
| 25 | 561 | 330 | 231 | 18 | 441.61 |
| 26 | 577 | 355 | 222 | 17 | 462.94 |
| 27 | 608 | 369 | 239 | 18 | 485.11 |
| 28 | 625 | 383 | 242 | 18 | 500.28 |
| 29 | 641 | 397 | 244 | 18 | 515.56 |
| 30 | 674 | 424 | 250 | 18 | 545.61 |
| 31 | 675 | 425 | 250 | 18 | 546.61 |
| 32 | 708 | 453 | 255 | 18 | 577.28 |
| 33 | 709 | 454 | 255 | 18 | 578.28 |
| 34 | 743 | 497 | 246 | 17 | 617 |
| 35 | 744 | 484 | 260 | 18 | 610.56 |
| 36 | 778 | 513 | 265 | 18 | 642.39 |
| 37 | 796 | 529 | 267 | 18 | 659.06 |

Fig. 44(b)

| 2xy+z | D MAX | D MIN | D DIFFERENCE | D NUMBER | D AVERAGE |
|---|---|---|---|---|---|
| 38 | 814 | 544 | 270 | 18 | 675.83 |
| 39 | 832 | 560 | 272 | 18 | 692.78 |
| 40 | 850 | 576 | 274 | 18 | 709.83 |
| 41 | 868 | 592 | 276 | 18 | 727 |
| 42 | 887 | 623 | 264 | 17 | 752.35 |
| 43 | 905 | 624 | 281 | 18 | 761.78 |
| 44 | 942 | 656 | 286 | 18 | 796.11 |
| 45 | 943 | 657 | 286 | 18 | 797.11 |
| 46 | 980 | 690 | 290 | 18 | 832 |
| 47 | 1000 | 691 | 309 | 19 | 841.79 |
| 48 | 1019 | 724 | 295 | 18 | 868.44 |
| 49 | 1039 | 725 | 314 | 19 | 878.37 |
| 50 | 1040 | 742 | 298 | 18 | 887.89 |
| 51 | 1041 | 760 | 281 | 17 | 897.47 |
| 52 | 1079 | 777 | 302 | 18 | 925.11 |
| 53 | 1099 | 795 | 304 | 18 | 943.94 |
| 54 | 1119 | 813 | 306 | 18 | 962.89 |
| 55 | 1139 | 831 | 308 | 18 | 981.94 |
| 56 | 1179 | 849 | 330 | 19 | 1010.47 |
| 57 | 1180 | 867 | 313 | 18 | 1020.44 |
| 58 | 1200 | 885 | 315 | 18 | 1039.89 |
| 59 | 1201 | 886 | 315 | 18 | 1040.89 |
| 60 | 1242 | 922 | 320 | 18 | 1079.22 |
| 61 | 1243 | 923 | 320 | 18 | 1080.22 |
| 62 | 1284 | 960 | 324 | 18 | 1119.11 |
| 63 | 1285 | 961 | 324 | 18 | 1120.11 |
| 64 | 1326 | 998 | 328 | 18 | 1159.44 |
| 65 | 1307 | 999 | 308 | 17 | 1150.65 |
| 66 | 1348 | 1037 | 311 | 17 | 1190.29 |
| 67 | 1370 | 1038 | 332 | 18 | 1201.22 |
| 68 | 1391 | 1058 | 333 | 18 | 1221.78 |
| 69 | 1413 | 1059 | 354 | 19 | 1232.79 |
| 70 | 1414 | 1078 | 336 | 18 | 1243.44 |
| 71 | 1436 | 1098 | 338 | 18 | 1264.28 |
| 72 | 1458 | 1118 | 340 | 18 | 1285.22 |
| 73 | 1480 | 1138 | 342 | 18 | 1306.28 |
| 74 | 1502 | 1158 | 344 | 18 | 1327.44 |
| 75 | 1503 | 1178 | 325 | 17 | 1338.41 |

Fig. 44(c)

| 2xy+z | D MAX | D MIN | D DIF-FERENCE | D NUMBER | D AVERAGE |
|---|---|---|---|---|---|
| 76 | 1547 | 1199 | 348 | 18 | 1370.17 |
| 77 | 1548 | 1219 | 329 | 17 | 1381.24 |
| 78 | 1592 | 1220 | 372 | 19 | 1403.16 |
| 79 | 1593 | 1221 | 372 | 19 | 1404.16 |
| 80 | 1616 | 1262 | 354 | 18 | 1436.11 |
| 81 | 1617 | 1263 | 354 | 18 | 1437.11 |
| 82 | 1661 | 1304 | 357 | 18 | 1479.89 |
| 83 | 1662 | 1305 | 357 | 18 | 1480.89 |
| 84 | 1685 | 1346 | 339 | 17 | 1513.35 |
| 85 | 1709 | 1327 | 382 | 19 | 1514.74 |
| 86 | 1732 | 1368 | 364 | 18 | 1547.5 |
| 87 | 1733 | 1369 | 364 | 18 | 1548.5 |
| 88 | 1756 | 1411 | 345 | 17 | 1581.53 |
| 89 | 1780 | 1412 | 368 | 18 | 1593.5 |
| 90 | 1803 | 1434 | 369 | 18 | 1616.17 |
| 91 | 1827 | 1435 | 392 | 19 | 1628.21 |
| 92 | 1828 | 1457 | 371 | 18 | 1639.94 |
| 93 | 1852 | 1479 | 373 | 18 | 1662.83 |
| 94 | 1876 | 1501 | 375 | 18 | 1685.83 |
| 95 | 1877 | 1523 | 354 | 17 | 1697.71 |
| 96 | 1901 | 1524 | 377 | 18 | 1709.94 |
| 97 | 1925 | 1546 | 379 | 18 | 1733.17 |
| 98 | 1949 | 1569 | 380 | 18 | 1756.5 |
| 99 | 1950 | 1591 | 359 | 17 | 1788.53 |
| 100 | 1998 | 1614 | 384 | 18 | 1803.44 |
| 101 | 1999 | 1615 | 384 | 18 | 1804.44 |
| 102 | 2023 | 1638 | 385 | 18 | 1828.06 |
| 103 | 2024 | 1660 | 364 | 17 | 1840.24 |
| 104 | 2025 | 1683 | 342 | 16 | 1852.5 |
| 105 | 2026 | 1684 | 342 | 16 | 1853.5 |
| 106 | 2027 | 1707 | 320 | 15 | 1865.8 |
| 107 | 2028 | 1708 | 320 | 15 | 1866.8 |
| 108 | 2029 | 1754 | 275 | 13 | 1890.46 |
| 109 | 2030 | 1755 | 275 | 13 | 1891.46 |
| 110 | 2031 | 1778 | 253 | 12 | 1903.83 |
| 111 | 2032 | 1779 | 253 | 12 | 1904.83 |
| 112 | 2033 | 1825 | 208 | 10 | 1928.7 |
| 113 | 2034 | 1826 | 208 | 10 | 1929.7 |

Fig. 44(d)

| 2×y+z | D MAX | D MIN | D DIFFERENCE | D NUMBER | D AVERAGE |
|---|---|---|---|---|---|
| 114 | 2035 | 1850 | 185 | 9 | 1942.22 |
| 115 | 2036 | 1851 | 185 | 9 | 1943.22 |
| 116 | 2037 | 1875 | 162 | 8 | 1955.75 |
| 117 | 2038 | 1899 | 139 | 7 | 1968.29 |
| 118 | 2039 | 1900 | 139 | 7 | 1969.29 |
| 119 | 2040 | 1924 | 116 | 6 | 1981.83 |
| 120 | 2041 | 1948 | 93 | 5 | 1994.4 |
| 121 | 2042 | 1972 | 70 | 4 | 2007 |
| 122 | 2043 | 1973 | 70 | 4 | 2008 |
| 123 | 2044 | 1997 | 47 | 3 | 2020.67 |
| 124 | 2045 | 2022 | 23 | 2 | 2033.5 |
| 125 | 2046 | 2046 | 0 | 1 | 2046 |
| 126 | 2047 | 2047 | 0 | 1 | 2047 |

2

DATA DIVIDING APPARATUS

BACKGROUND OF THE INVENTION

1. Field of the Invention

The present invention relates to a digital data recording and reproducing apparatus which records and reproduces digital data, and more particularly to a digital data dividing apparatus which is used in the digital data recording and reproducing apparatus.

2. Description of Related Art

As home color television sets with larger screens have become popular in recent years, a number of improvements in video signal recording and reproduction media have been made to obtain higher picture quality. In the meantime, vigorous efforts to develop magnetic recording and reproduction apparatuses of digital information (digital VTR hereafter) for home use which digitize video signals and record them through bandwidth compression (high-efficiency encoding) and reproduce them have been made by manufacturers, as the data storage media for recording and reproducing high-quality video data while retaining the high picture quality.

The method of recording and reproduction with a conventional home digital VTR will be described below, taking an example in the recording and reproduction process of Phillips Corp., which is reported in "An experimental digital VCR with 40 mm drum, single actuator and DCT-based bit-rate reduction," PP. 597–605, IEEE Transactions in Consumer Electronics, Vol. 34, No. 3 (August, 1988).

FIG. 1 shows a block diagram of the recording system of a prior art home digital VCR. It is assumed that this system employs 2-channel recording system. In FIG. 1, elements 1a through 1c are input terminals, elements 2a through 2c are A/D converters which convert analog data to digital data, numeral 3 denotes a high-efficiency encoder which applies high-efficiency encoding to a luminance signal Y and color signals CB and CR which have been fed as inputs, numeral 4 denotes an error correction encoder which adds error-correcting code to 2-channel output data from the high-efficiency encoder 3 in order to correct or detect errors which take place during reproduction, numerals 5a, 5b denote digital modulator circuits which apply digital modulation to the output data from the error correction encoder 4, numerals 6a, 6b denote sync-signal adding circuits which add sync signals and ID signals, numerals 7a, 7b denote recording amplifiers, numerals 8a, 8b denote rotary heads, and numeral 9 denote a magnetic tape.

FIG. 2 shows a block diagram of the reproduction system of a prior art home digital VCR. In FIG. 2, numerals 8a, 8b and 9 denote the same as in FIG. 1 and description thereof will be omitted. Numerals 10a, 10b denote head amplifiers which amplify the signals reproduced by the rotary heads 8a, 8b, numerals 11a, 11b denote data detectors which detect data from the reproduced signals as well as detect and correct jitter in the reproduced signals, numerals 12a, 12b denote digital demodulators, numeral 13 denotes an error correction decoder which detects and corrects errors in the reproduced signals, numeral 14 denotes a high-efficiency decoder which applies high-efficiency decoding to the output of the error correction decoder 13 to restore video signals, numerals 15a through 15c denote D/A converters which convert digital signals to analog signals, and numerals 16a through 16c denote output terminals.

FIG. 3 shows a block diagram of a prior art high-efficiency encoder 3 described in the above-mentioned literature. In FIG. 3, numerals 17a, 17b denote field memories, numeral 18 denotes a DCT circuit which applies discrete cosine transform (DCT hereafter) to each block of output data of the field memories 17a, 17b which has been structured into specified blocks of the field memories 17a, 17b, numeral 19 denotes an adaptive quantizer which quantizes the coefficients which have been transformed by the DCT circuit 18, numeral 20 denotes a variable-length encoder which applies variable-length encoding to the output from the adaptive quantizer 19, numeral 21 denotes a buffer memory used to provide the output of the variable-length encoder 20 at a fixed rate and numeral 22 denotes a buffer controller which switches the quantization parameter of the adaptive quantizer 19 and selects the components to be encoded in the variable-length encoder 20. The field memories 17a, 17b, the DCT circuit 18, the adaptive quantizer 19, the variable-length encoder 20, the buffer memory 21 and the buffer controller 22 constitute the high-efficiency encoder 3.

FIG. 4 shows a block diagram of a prior art high-efficiency decoder 14. In FIG. 4, numeral 23 denotes a variable-length decoder which converts the variable-length encoded data to the original fixed-length data, numeral 25 denotes an inverse adaptive quantizer, numeral 26 denotes an inverse DCT circuit which applies inverse discrete cosine transform (called inverse DCT hereafter) to the output data of the inverse adaptive quantizer 25 and numerals 27a, 27b denote field memories used to apply a specified delay to the reproduced digital signal output from the inverse DCT circuit 26 and give an output by decoding the data which was structured into blocks during recording. The variable-length decoder 23, the buffer memory 24, the inverse adaptive quantizer 25, the inverse DCT circuit 26, and the field memories 27a, 27b constitute the high-efficiency decoder 14.

The operation of the recording system will now be described below with reference to FIG. 1. The luminance signal Y and the two color signals CB and CR which have been supplied via the input terminals 1a through 1c are converted from analog to digital signals by the A/D converters 2a through 2c, and the recording bit rate thereof is reduced by the high-efficiency encoder 3. Operation of the high-efficiency encoder 3 will be described in detail below. The data with the recording bit rate having been reduced by the high-efficiency encoder 3 is provided with an error-correcting code which is generated to detect and correct errors which take place during reproduction. The recording digital signals with the error-correcting code (called check hereinafter) added thereto in the error correction encoder 4 are processed in the digital demodulators 5a, 5b in the specified modulation rule to suppress the low-frequency components of the recording signal (digital modulation). The recording signals which have been digital-modulated are provided with sync-signal, ID signal and the like added thereto in the sync-signal adding circuits 6a, 6b and, after being amplified by the recording amplifiers 7a, 7b, recorded on the magnetic tape 9 via the rotary heads 8a, 8b.

Operation of the reproduction system will now be described similarly with reference to FIG. 2. The 2- channel reproduction signals which were reproduced from the magnetic tape 9 via the rotary heads 8a, 8b are amplified by the head amplifiers 10a and 10b, then converted into digital data by the data detectors 11a, 11b while the jitter (time domain error) included in the reproduced signals is absorbed. Then digital demodulation is applied to the signals by the digital demodulators 12a, 12b to convert them to reproduced digital signals, which are supplied to the error correction decoder 13, The error correction decoder 13, based on the check added during recording, detects or corrects errors which occur in the reproduction signals. The reproduction signals, with errors detected and corrected by the error correction decoder 13, are subjected to variable-length decoding and inverse DCT by the high-efficiency decoder 14, then restored to the original luminance signal and the two color signals CB, CR, which are converted to analog signals by the D/A converters 15a through 15c and are applied to the output terminals 16a through 16c as output signals.

The operation of the high-efficiency encoder 3 will now be described below with reference to FIG. 3. The input luminance signal Y and two color signals CB and CR are processed in the field memories 17a, 17b to be delayed by a specified time period and structured into blocks each including eight lines of eight pixels each. The luminance signal Y and the two color signals CB and CR which have been structured into blocks are subjected to time-division multiplexing and supplied to the DCT circuit 18. The outputs of the field memories 17a, 17b in the form of blocks are subjected to DCT processing in the DCT circuit 18. That is, denoting the data of each pixel in a block as X (i,j) (i=0, 1, ..., 7; j=0, 1, ..., 7), the DCT circuit 18 first calculates the DCT of eight points in horizontal direction, namely calculates the following expressions $$f(0,j) = \frac{1}{\sqrt{8}} \sum_{i=0}^{7} X(i,j)$$

$$f(m,j) = \frac{1}{2} \sum_{i=0}^{7} X(i,j) \times \cos\left(\frac{(2 \times i + 1) \times m \times \pi}{16}\right)$$

(where m=1, ..., 7; j=0, 1, ..., 7).

Then DCT of eight points in vertical direction is performed for the converted data f(m, j) (where m=0, ..., 7; j=0,1, ..., 7) to calculate the following.

$$F(m,0) = \frac{1}{\sqrt{8}} \sum_{j=0}^{7} f(m,j)$$

$$F(m,n) = \frac{1}{2} \sum_{j=0}^{7} f(m,j) \times \cos\left(\frac{(2 \times j + 1) \times n \times \pi}{16}\right)$$

(where n=1, ..., 7; m=0,1, ..., 7).

Then these conversion coefficients F(m,n) (m=0, ..., 7; n=0,1, ..., 7) are given as output. Conversion coefficients F(m,n) thus obtained with small values of m and n determine the basic picture quality and represent low-frequency components which include DC, and those of greater values of m and n represent components of higher frequencies and give the fine picture information.

Conversion coefficients supplied from the DCT circuit 18 are quantized by the adaptive quantizer 19, which holds a plurality of quantization tables of different quantization steps, and switches the quantization steps based on the conversion coefficient of each block and parameters obtained from the buffer memory 21. For example, rise-up portions of high contrast are roughly quantized and details of less amplitudes are finely quantized. Output of the adaptive quantizer 19 is subjected to variable-length coding in the variable-length encoder 20, and is fed to the buffer memory 21, from which it is later read at a fixed rate. The buffer controller 22 detects data stored in the buffer memory 21 and determines the quantization parameter based on the amount of data to control the adaptive quantizer 19. The buffer controller 22 also uses the amount of data stored in the buffer memory 21 to determine the conversion coefficients of encoding in the variable-length encoder 20.

The operation of the high-efficiency decoder 14 will now be described below with reference to FIG. 4. The reproduction digital signals supplied from the error correction decoder 13 are subjected to variable-length decoding in the variable-length decoder 23 and converted to fixed-length data. In the buffer memory 24, fixed-length data which has been subjected to variable-length decoding is read at a fixed rate. The fixed-length data which has been read from the buffer memory 24 is inverse-quantized by the inverse adaptive quantizer 25 and supplied to the inverse DCT circuit 26 which applies inverse DCT to the reproduction digital signals. The reproduced luminance signal Y and the two reproduced color signals CB and CR which have been subject to inverse DCT are temporarily stored in the field memories 27a, 27b and are provided with a specified amount of delay, and then supplied to D/A converts 15a through 15c with the block structure which was applied during recording being decoded.

FIG. 5 shows the pattern of the recording tracks formed on the magnetic tape 9 of digital VTR which employs 2-channel recording system of the prior art. In this example, it is assumed that data of two channels are recorded simultaneously on the magnetic tape 9 as shown in FIG. 5. A and B in the figure represent the recording tracks formed by the rotary heads of different channels. The rotary heads of the respective channel are assumed to have different azimuth angles.

The prior art digital VTR has been described above. When editing video data with a digital VTR having such a recording format, problems of servo control, unsteadiness of the track, etc. which are characteristic to VTR sometimes cause overwrite of the track of another channel which has been recorded, thereby destroying the data on the track of the other channel. As a result, about half of the video data in one field is not reproduced making it difficult to obtain good video images when the data is reproduced with the track on one channel being over-written.

As a means to obtain reproduced images of acceptable quality even when the data on one track is completely destroyed, there is a method of using an interleave format represented by the digital audio tape recorder. In a digital audio tape recorder, data of even-numbered samples is recorded on the track of one channel and data of odd-numbered samples is recorded on the track of another channel. With this method, even when the information of the track of channel A is not reproduced (data is destroyed by over-writing), the information which would have been recorded on channel A is restored through the use of interpolation by using the information on the track of channel B.

In the case of prior art digital VTR discussed above, however, because bandwidth compression (high-efficiency encoding) is applied by means of DCT transform or variable-length encoding, when the conversion coefficients described above are divided into two channels alternately, it is difficult to determine all conversion coefficients by interpolation if the data of one channel cannot be reproduced, resulting in a problem that a satisfactorily reproduced image cannot be obtained at splicing points of editing.

There has also been a problem that writing every piece of data on each track twice leads to an increase in the redundancy of recording data.

SUMMARY OF THE INVENTION

One object of the invention is to provide a data dividing apparatus which effectively divides data which has been subjected to bandwidth compression (high-efficiency encoding) while suppressing the increase of redundancy.

Another object of the invention is to provide a data dividing apparatus which reproduces images without being disturbed even at the splicing points of editing such as the cut-in point (or cut-out point) or the like.

A data dividing apparatus of a first embodiment of the present invention divides the input digital data into two main codes and a subcode through a specified modular arithmetic. Specifically, input digital data X is divided into main codes Y1, Y2 and subcode Z which are calculated by expression $X=2^{n-1}\times(Y1+Y2)+Z$. For Y1, Y2 and Z, values calculated with the following expressions are used.

$$Y1 = INT(X/2^n)$$

$$Y2 = INT(X/2^{n-1}) - INT(X/2^n)$$

$$Z = X \bmod 2^{n-1}$$

where INT (A/B) is the quotient of dividing A by B, and A mod B is the remainder of division of A by B. Alternatively, input digital data X is divided into two main codes Y1 and Y2 (both having the same values) and a subcode Z based on the calculation of expression $2^n \times Y1$ (or Y2) + Z arithmetic. For Y1 (or Y2) and Z, values calculated by the following modular arithmetic.

$$Y1 (\text{or } Y2) = INT(X/2^n)$$

$$Z = X \bmod 2^n$$

where INT (A/B) is the quotient of dividing A by B, and A mod B is the remainder of division of A by B.

A data dividing apparatus of a second embodiment of the present invention has converting means for, when denoting the input digital data D and n kinds of converted output codes such as $X_0, X_1, \ldots, X_{n-1}$, converting the input digital data D into output codes $X_0, X_1, \ldots, X_{n-1}$ based on the rule which relates D and $X_0, X_1, \ldots, X_{n-1}$ as $D = K_0 X_0 + K_1 X_1 + \ldots + K_{n-1} X_{n-1}$ ($K_0, K_1, \ldots, K_{n-1}$ are real numbers) and channel synthesizing means for synthesizing the n output codes into two channels.

In the second embodiment, it is assumed that the input digital data D is converted to two output codes X and Y, and the relation of D, X and Y at this time is expressed by $D = 2X + Y$ or $D = 3X + Y$.

A data dividing apparatus of a third embodiment of the present invention has converting means for converting the input digital data into n output codes according to a rule described below and supplies it as the output, and synthesizing means for synthesizing the n output codes into two channels. All input digital data is divided into such groups that each group includes not greater than t (t is an integer) kinds of different input digital data, so that each digital data included in a group can be uniquely represented by a combination of output code $X_0$ which has $m_0$ kinds of different values, output code $X_1$ which has $m_1$ kinds of different values, ... and output code $X_{n-1}$ which has $m_{n-1}$ kinds of different values ($m_0, m_1, \ldots, m_{n-1}$ are integers and $m_0 \times m_1 \times \ldots \times m_{n-1} \geq n$), and a combination of output codes $X_0, X_1, \ldots, X_{n-1}$ which represents the digital data in a particular group does not represent another digital data.

The converting means of the third embodiment divides all input digital data into groups, each of which includes four different input digital data according to a prescribed rule, so that each digital data included in a group can be uniquely represented by a combination of output code X which has two different values and an output code Y which has two different values, and a combination of the values of output codes X and Y which represents the digital data in a particular group does not represent another digital data.

A data dividing apparatus of a fourth embodiment of the present invention divides the input data into a plurality of data which satisfy the following conditions, so that the data an be distributed among a plurality of tracks and can be recorded thereon. Conditions to be satisfied are that relationship $D = c \times X^a$ holds for at least one divided data X and input data D, and that relationship $D = b \times Y$ holds for at least one divided data Y and input data D (a, b and c are constants).

The fourth embodiment divides one data into multiple portions and minimizes the increase of the total amount of divided data over the recorded data (increase in the redundancy), restoring the data before division almost completely from at least one of the divided data sets with the errors decreasing as the amount of data increases, and making it possible to completely restore the data if all the divided data is obtained. Thus it is possible to obtain reproduced images in proportion to the ratio of correctly reproduced tracks to all tracks reproduced. In an extreme example, even when the plurality of recording heads include a faulty head which is incapable of reproducing due to loading or some other cause, reproduced images can be obtained in proportion to the number of remaining normal heads which can normally reproduce.

In the fourth embodiment, input data D is divided into two pieces of data D1 and D2 to satisfy the following two relationships, so that the data can be distributed among two tracks and recorded thereon.

Relationship 1

$$D = X^a + b \times Y + Z$$

Relationship 2

$$D1 = C \times X^a, D2 = b \times Y + Z$$

or otherwise $$D1 = c \times X^a + Z, D2 = b \times Y$$

where a, b and c are constants.

Also, in the fourth embodiment, when supplying output data to a recording or transmission apparatus, wherein the probability of the incidence of data errors in the recording or transmission medium is not uniform with respect to the positions thereof, as is seen in particular recording tracks which are affected by failures at the cut-in point or cut-out point during editing, data D1 is supplied to a position having a lower probability of error occurrence and data D2 is supplied to the point having a higher probability of error occurrence. In this scheme, the accuracy of data restoration from one group can be improved as a whole in such a case that the locations of failures in the recording medium are known beforehand or by assigning data D2 to a portion of particularly high probability of error occurrence and increasing the rate of normal reproduction on the side of data D1 in the divided data.

Further in the fourth embodiment, the dividing operation is applied only to a part of the input data, for example, to the data of low order of DCT which determines the basic picture quality. This enables it to restore data in case of a failure and to restrain the amount of data to the minimum necessary.

Because the data dividing apparatus of the invention is capable of nearly completely restoring the original data from only one of the main codes or from one of the divided digital data sets during reproduction, it is capable of dividing data effectively into two parts even for such data that has been subjected to bandwidth compression (high-efficiency encoding) by means of DCT or the like as in the case of digital VTR described in the prior art, making it possible to reproduce images without being disturbed even at the splicing points of editing such as the cut-in point (or cut-out point) or the like, due to the capability of restoring most of the original digital values during reproduction from one of the main codes or one of the divided data groups described above, even when the track of one of the channels which have been recorded is overwritten and is destroyed.

Also because data is not simply written twice on each track, it is also capable of reducing the increase of redundancy of recorded data. Also in case of such failures as drop-out, flaw on the magnetic tape, or loading of the rotary head, because the original digital data can be nearly completely restored if one of the main codes described above can be reproduced, interpolation or other process can be applied in case of drop-out to such digital images as has been subjected to bandwidth compression (high-efficiency encoding), thereby to obtain satisfactorily reproduced images.

The above and further objects and features of the invention will more fully be apparent from the following detailed description with accompanying drawings.

BRIEF DESCRIPTION OF THE DRAWINGS

FIGS. 17(a) and (b) are another recording format diagram of a digital VTR.

FIG. 21 is a diagram illustrative of the conversion code table.

FIGS. 22(a)-(c) are diagrams explaining the operation of the invention.

FIGS. 24(a)-(d) are diagrams explaining the operation of the invention.

FIG. 25 is a diagram illustrative of the inverse conversion code table.

FIG. 26 is a diagram illustrative of the conversion code table.

FIG. 30 is a diagram illustrative of the conversion code table.

FIG. 31 is a diagram illustrative of the conversion code table.

FIGS. 32(a)-(c) are diagrams explaining the operation of the invention.

FIG. 33 is a diagram illustrative of the inverse conversion code table.

FIG. 34 is a diagram illustrative of the conversion code table.

FIG. 35 is a diagram illustrative of the conversion code table.

FIG. 36 is a diagram illustrative of the comparison of the information amounts.

FIGS. 37(a)-(b) are diagrams illustrating the conversion code table.

FIGS. 39 (a)-(c) are diagrams explaining the operation of the invention.

FIGS. 40 (a)-(d) are diagrams explaining the operation of the invention.

FIG. 41 is a diagram illustrative of the inverse conversion code table.

FIGS. 42(a)-(d) are diagrams illustrating the inverse conversion characteristic of x value.

FIGS. 43(a)-(b) are diagrams illustrating the inverse conversion characteristic of y value.

FIGS. 44(a)-(d) are diagrams illustrating the inverse conversion characteristic of Y value.

DESCRIPTION OF THE PREFERRED EMBODIMENTS

The invention will now be described in detail below with reference to drawings illustrative of the preferred embodiments.

Figure 1:
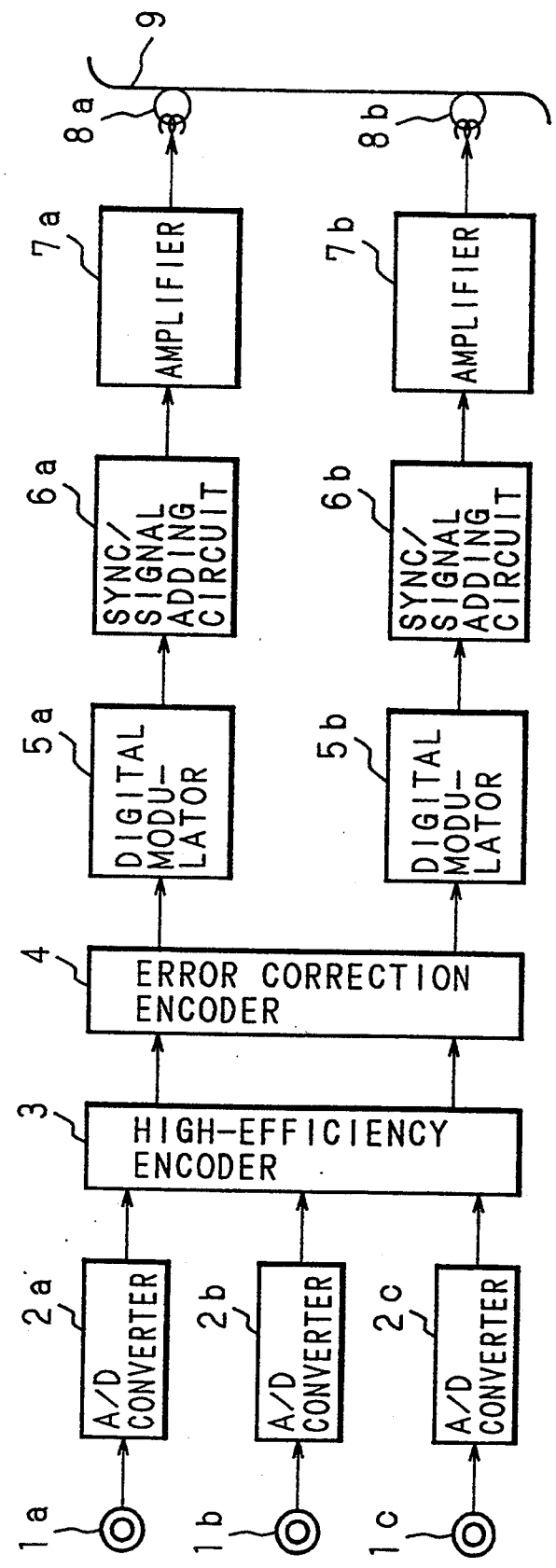
FIG. 1 is a block diagram of a prior art recording system of a digital VTR.
Figure 7:
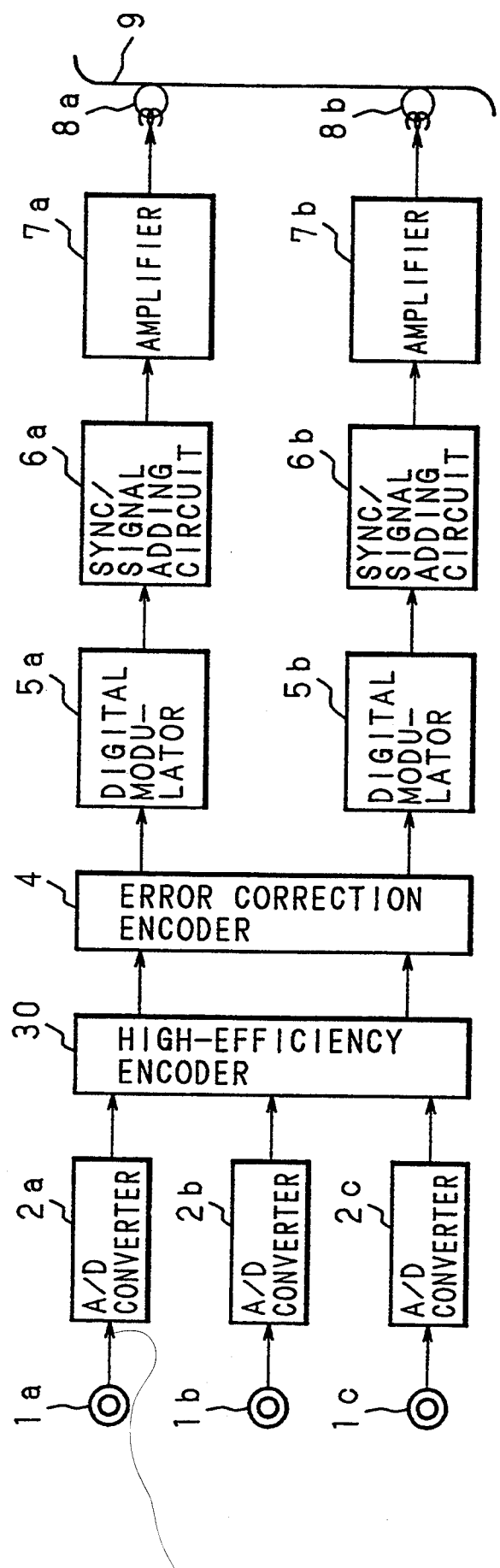
FIG. 7 is a block diagram of the recording system of a digital VTR equipped with the data dividing apparatus of the invention.

FIG. 7 shows the block diagram of the recording system of a digital VTR equipped with the data dividing apparatus of the invention. Those parts in FIG. 7 assigned with the same numerals as those in FIG. 1 represent identical part and description thereof will be omitted. Numeral 30 denote the high-efficiency encoder of the invention.

Figure 2:
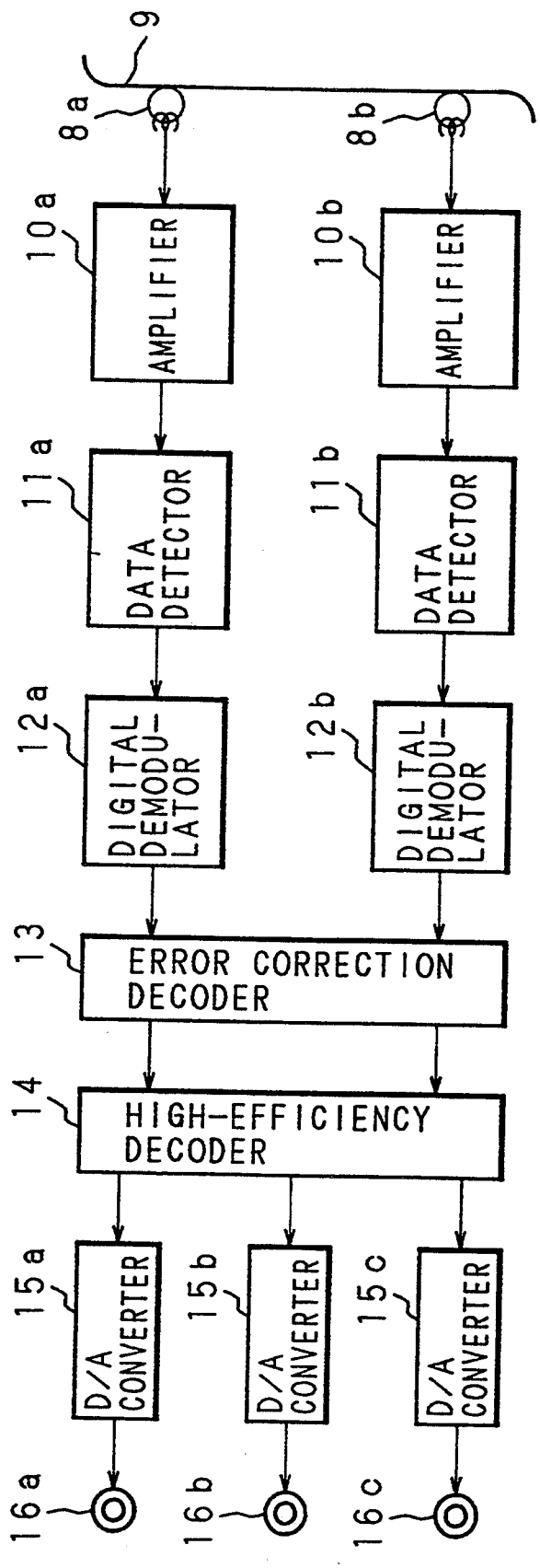
FIG. 2 is a block diagram of a prior art reproduction system of a digital VTR.
Figure 8:
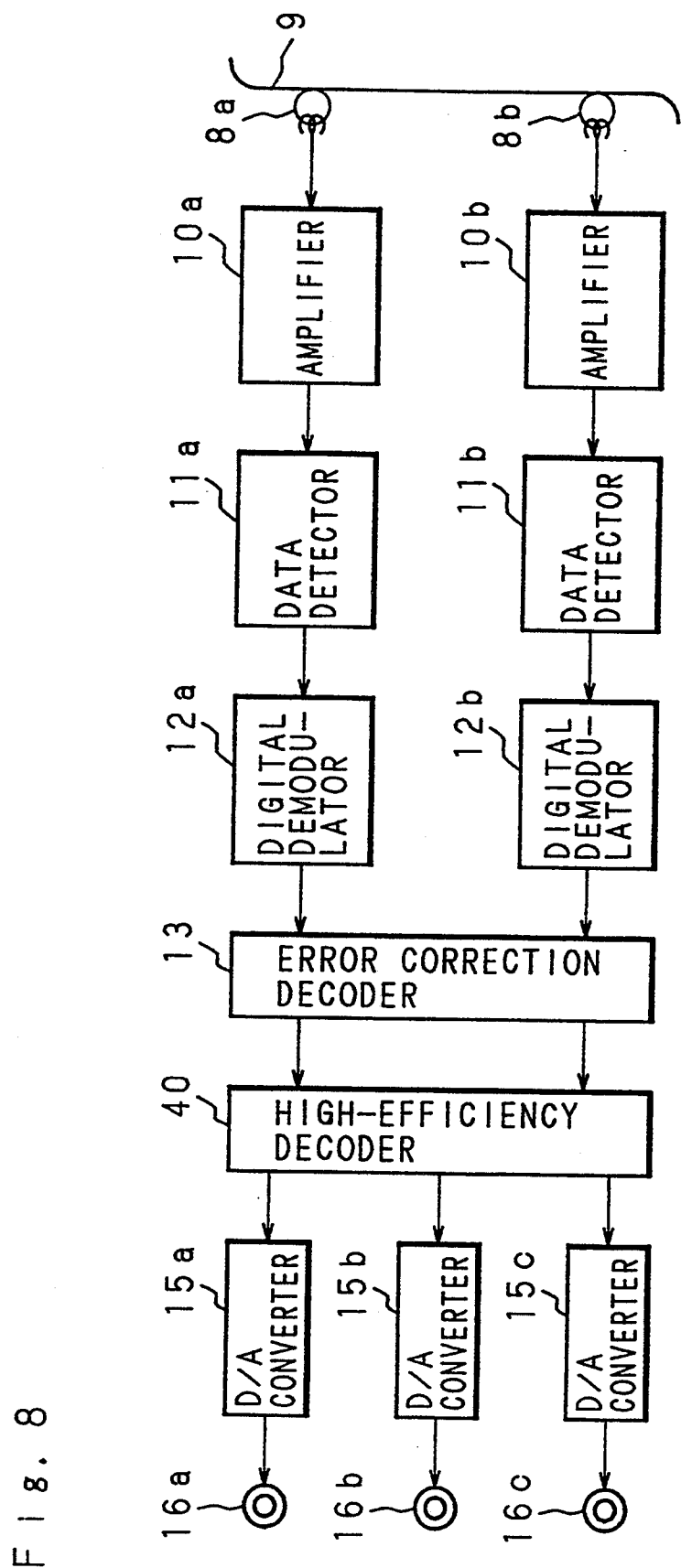
FIG. 8 is a block diagram of the reproduction system of a digital VTR equipped with the data dividing apparatus of the invention.

FIG. 8 shows the block diagram of the reproduction system of a digital VTR equipped with the data dividing decoder apparatus which decodes the reproduced digital signals which have been divided into two parts by the data dividing apparatus of the invention. Those parts in FIG. 8 assigned with the same numerals as those in FIG. 2 represent identical parts and the description thereof will be omitted. Numeral 40 denotes the high-efficiency decoder of the invention.

Embodiment 1

Figure 3:
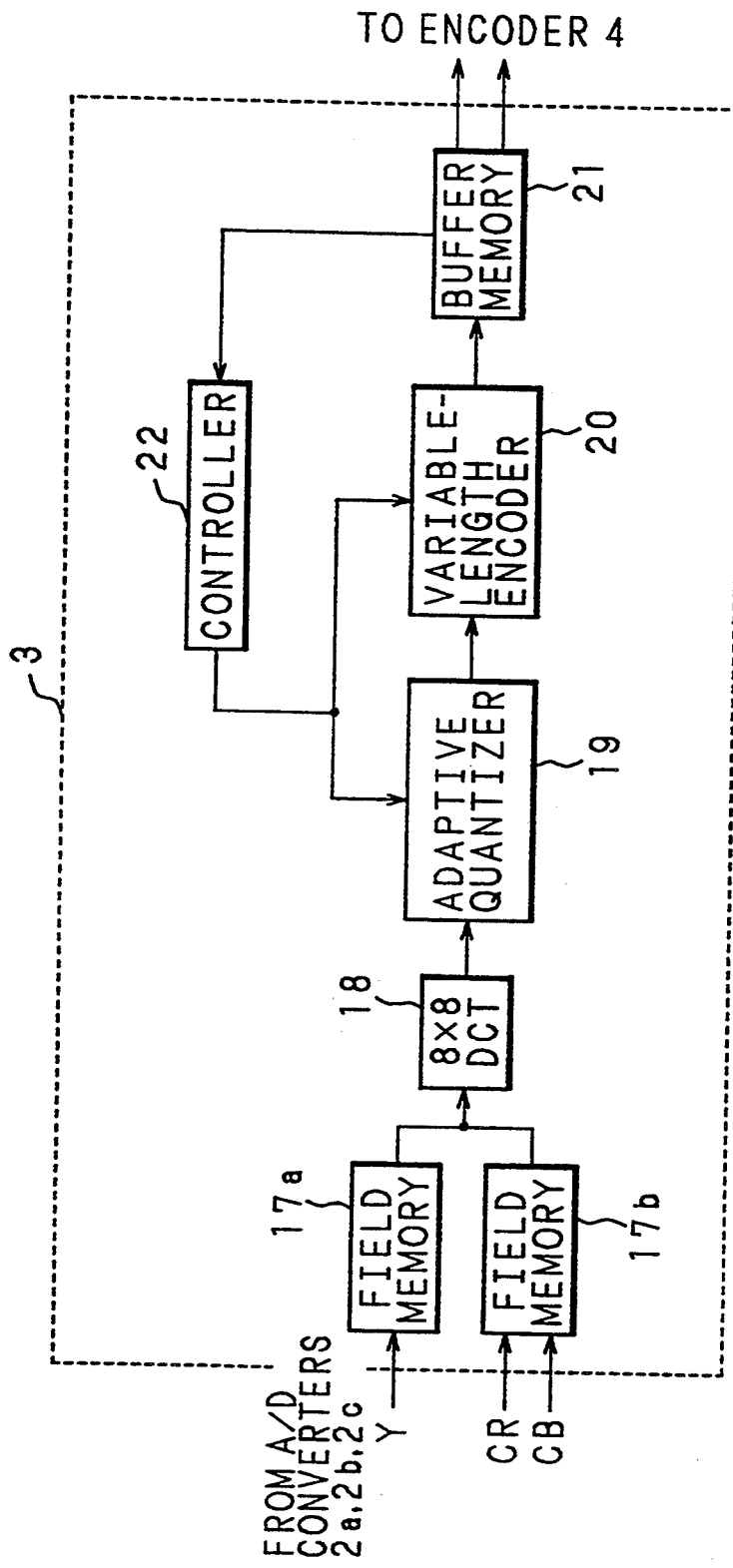
FIG. 3 is a block diagram of a prior art high-efficiency encoder.
Figure 9:
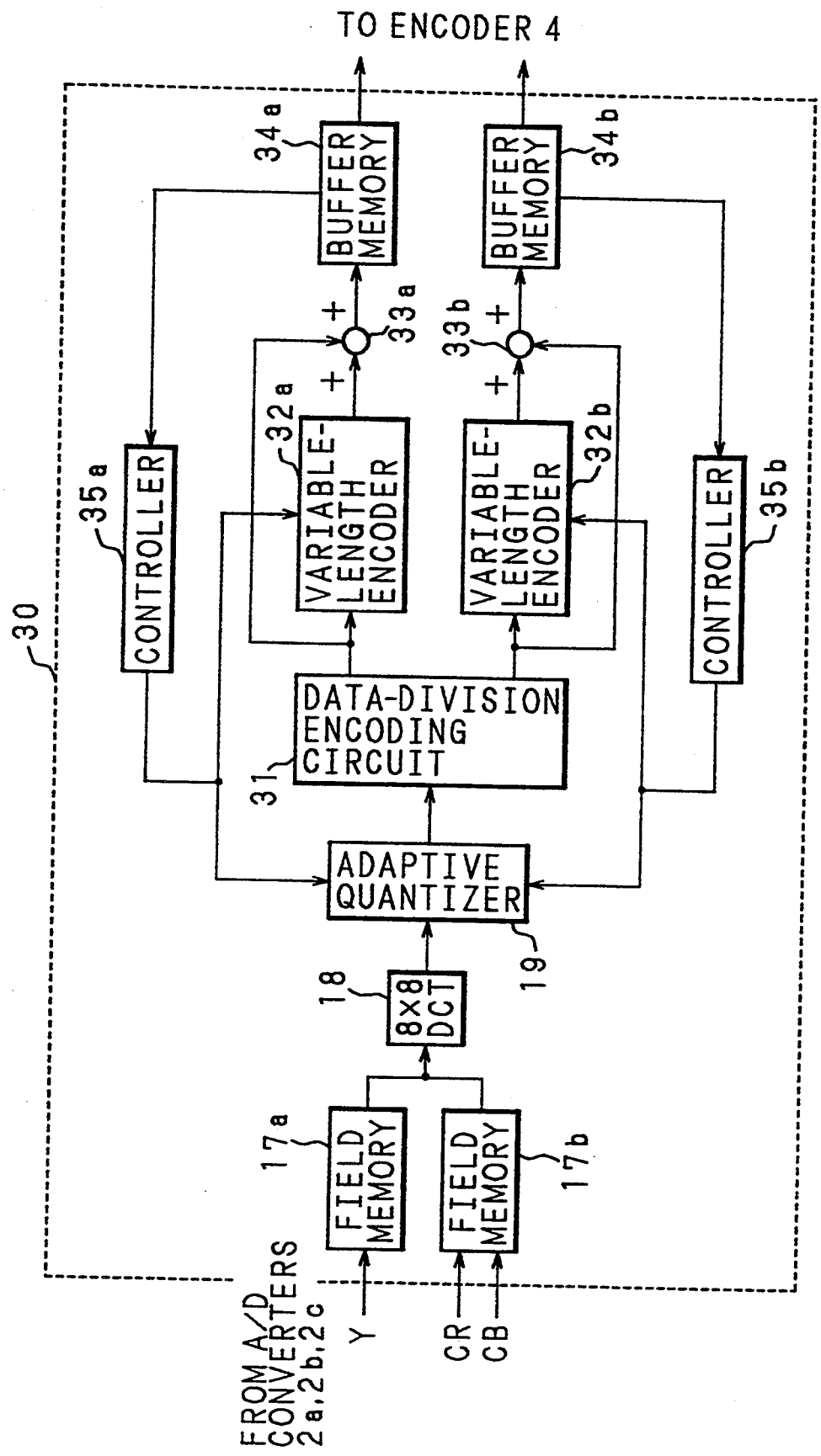
FIG. 9 is a block diagram of the high-efficiency encoder of the invention.

FIG. 9 shows the block diagram of the high-efficiency encoder 30 in the first embodiment of the invention. In FIG. 9, numerals 17a, 17b, 18 and 19 denote the same parts as those in FIG. 3 and the description thereof will be omitted. Numeral 31 denotes a data-division encoding circuit which divides input digital data into two parts, numerals 32a, 32b denote variable-length encoders, numerals 33a, 33b denote adders which mix the subcodes (to be described in detail later) provided by the data-division encoding circuit 31 and the main codes (to be described in detail later) provided by the variable-length encoders 32a, 32b, numerals 34a, 34b denote buffer memories used to provide output of the adders 33a, 33b at a fixed rate, numerals 35a, 35b denote buffer controllers which switch the quantization parameters of the adaptive quantizer 19 to prevent overflow of the buffer memories 34a, 34b and select the components to be encoded in the variable-length encoders 32a, 32b. The field memories 17a, 17b, DCT circuit 18, adaptive quantizer 19, data-division encoding circuit 31, variable-length encoders 32a, 32b, adders 33a, 33b, buffer memories 34a, 34b and buffer controllers 35a, 35b constitute the high-efficiency encoder 30.

Figure 10:
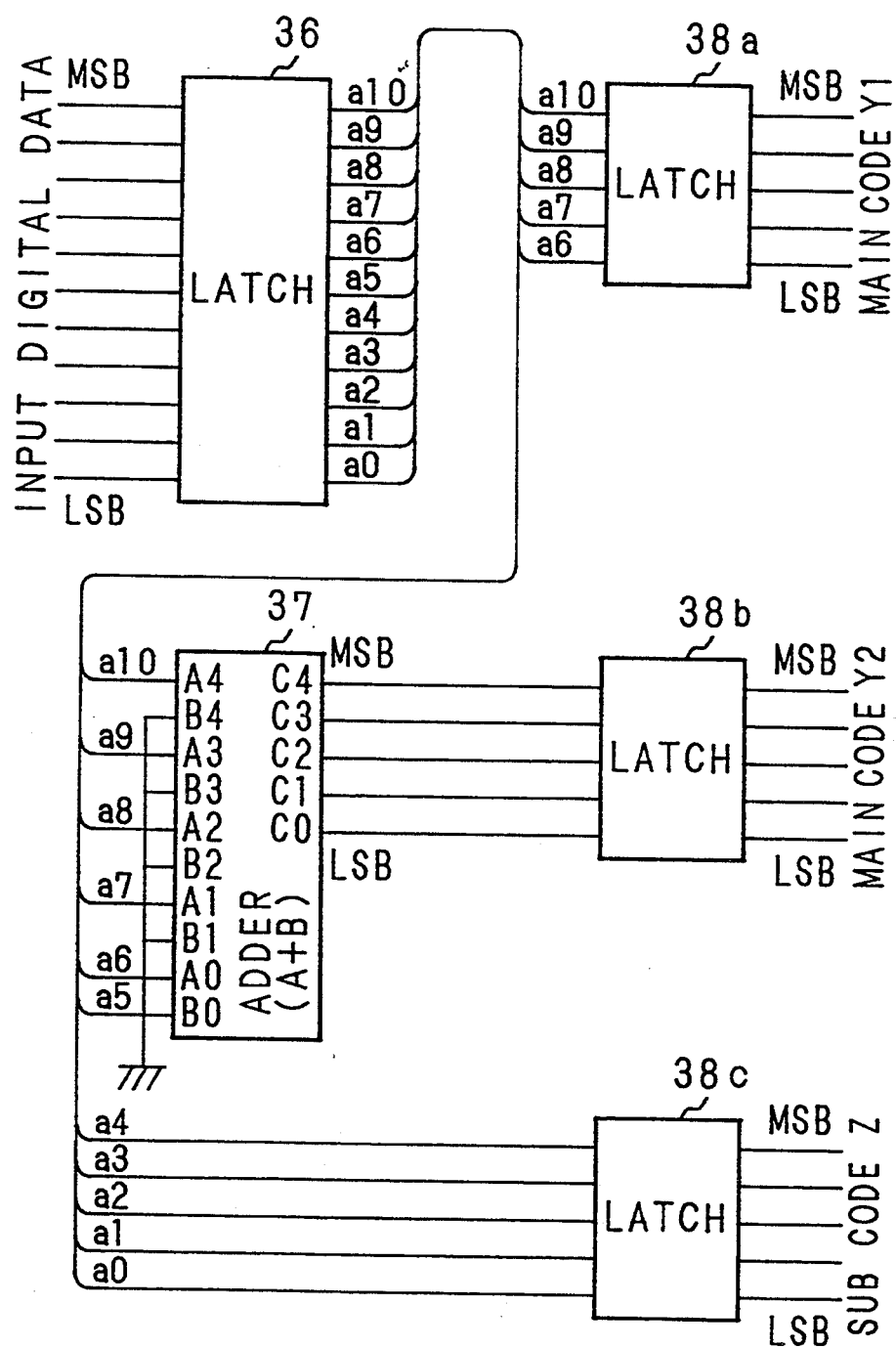
FIG. 10 is a block diagram of the data-division encoding circuit shown in FIG. 9.

FIG. 10 shows the block diagram of the data-division encoding circuit 31 in the first embodiment of the invention. In this embodiment, a case of dividing 11-bit input data into two 5-bit main codes and a 5-bit subcode will be described. In FIG. 10, numeral 36 denotes an 11-bit data latch circuit, numeral 37 denotes an adder and numerals 38a through 38c denote data latch circuits. The data latch circuits 36 and 38a through 38c and the adder 37 constitute the data-division encoding circuit 31.

Figure 4:
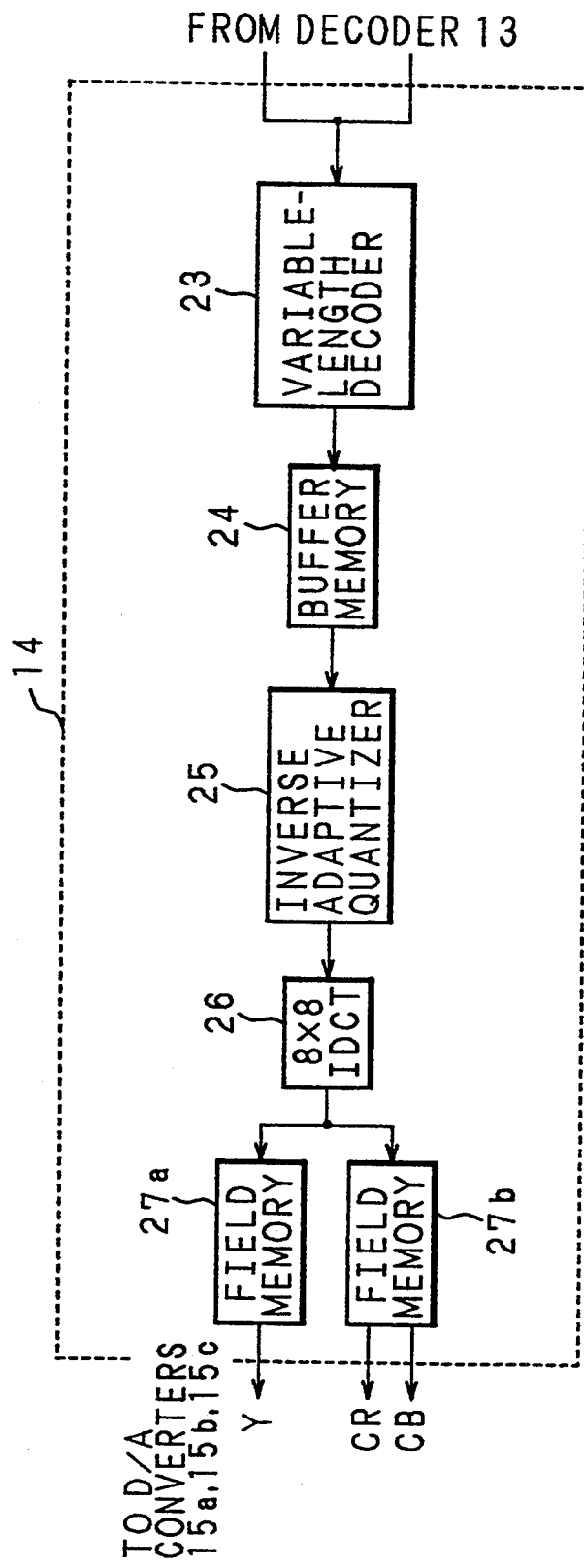
FIG. 4 is a block diagram of a prior art high-efficiency decoder.
Figure 5:
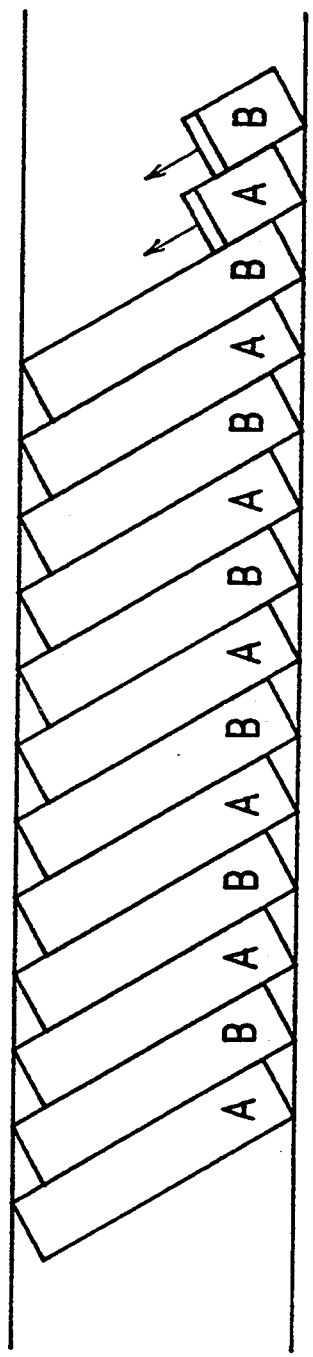
FIG. 5 is a recording format diagram of a prior art digital VTR.
Figure 6:
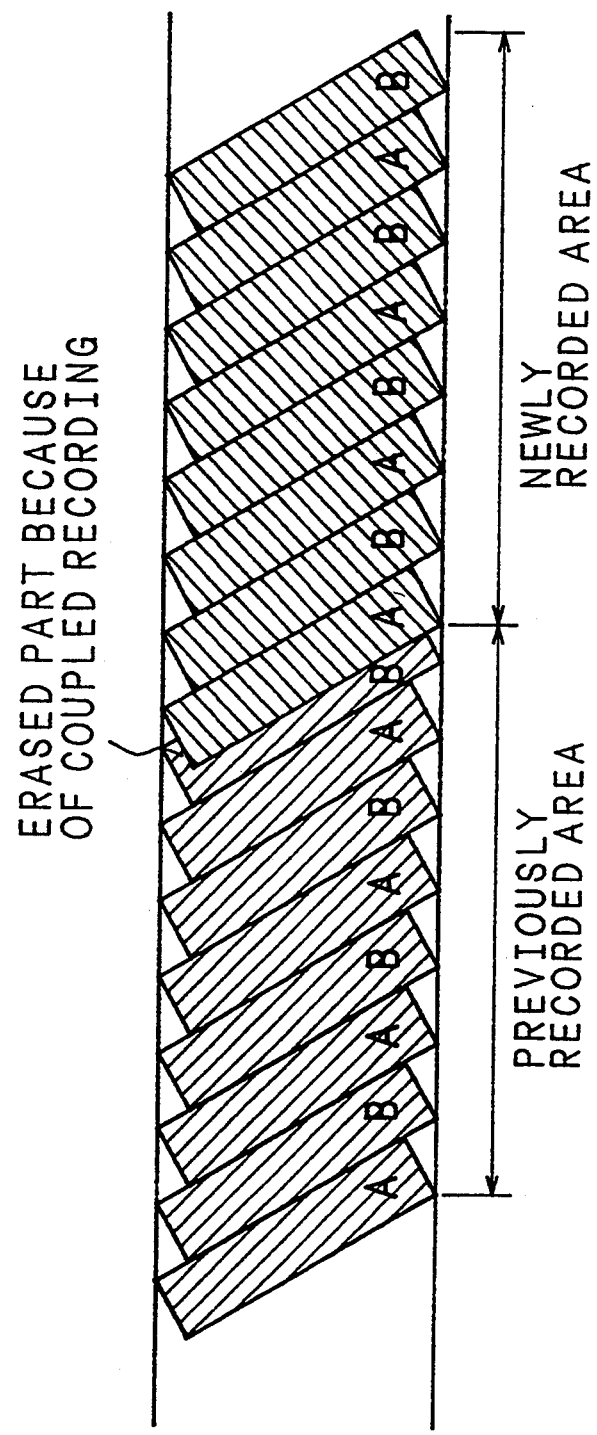
FIG. 6 is a magnetic tape track pattern diagram explanatory of the problems of a prior art digital VTR.
Figure 11:
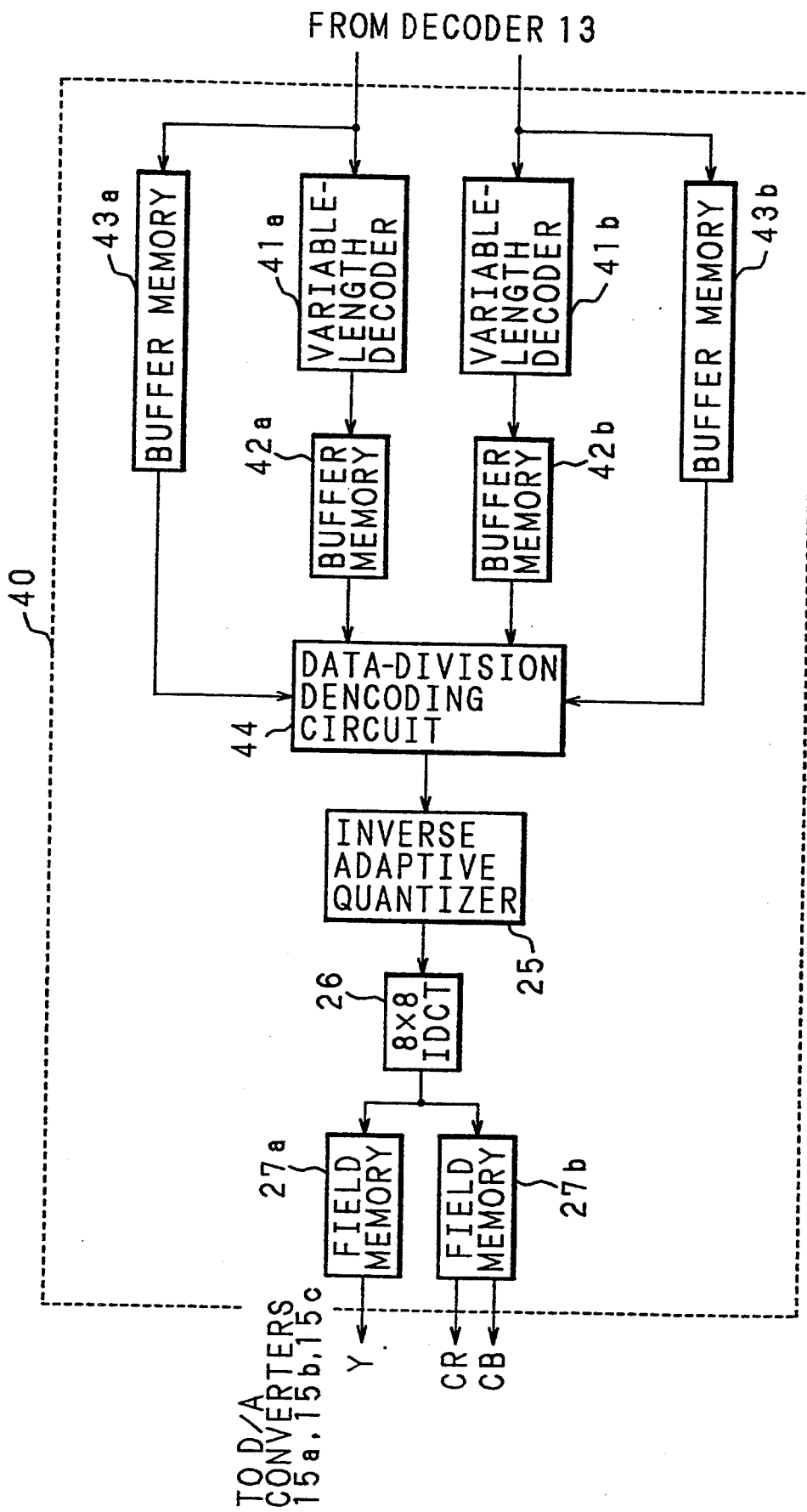
FIG. 11 is a block diagram of the high-efficiency decoder of the invention.

FIG. 11 shows the block diagram of the high-efficiency decoder 40 in the first embodiment of the invention. In FIG. 11, numerals 25, 26, 27a, 27b denote the same parts as those in FIG. 4, and the description thereof will be omitted. Numerals 41a, 41b denote variable-length decoders 41a, 41b which convert the main code data which have been subjected to variable-length encoding into the original fixed-length data, numerals 42a, 42b denote buffer memories which are used to provide the output of the variable-length decoders 41a, 41b at a fixed rate, numerals 43a, 43b denote buffer memories which are used to apply a specified delay to the subcode data to match the timing thereof with the output timing of the main code, and numeral 44 denotes a data-division decoding circuit which restores the original digital signals from the reproduced signals which have been divided into the main codes and the subcode. The variable-length decoders 41a, 41b, buffer memories 42a, 42b, 43a, 43b, data-division decoding circuit 44, the inverse adaptive quantizer 25, the inverse DCT circuit 26 and the field memories 27a, 27b constitute the high-efficiency decoder 40.

Figure 12:
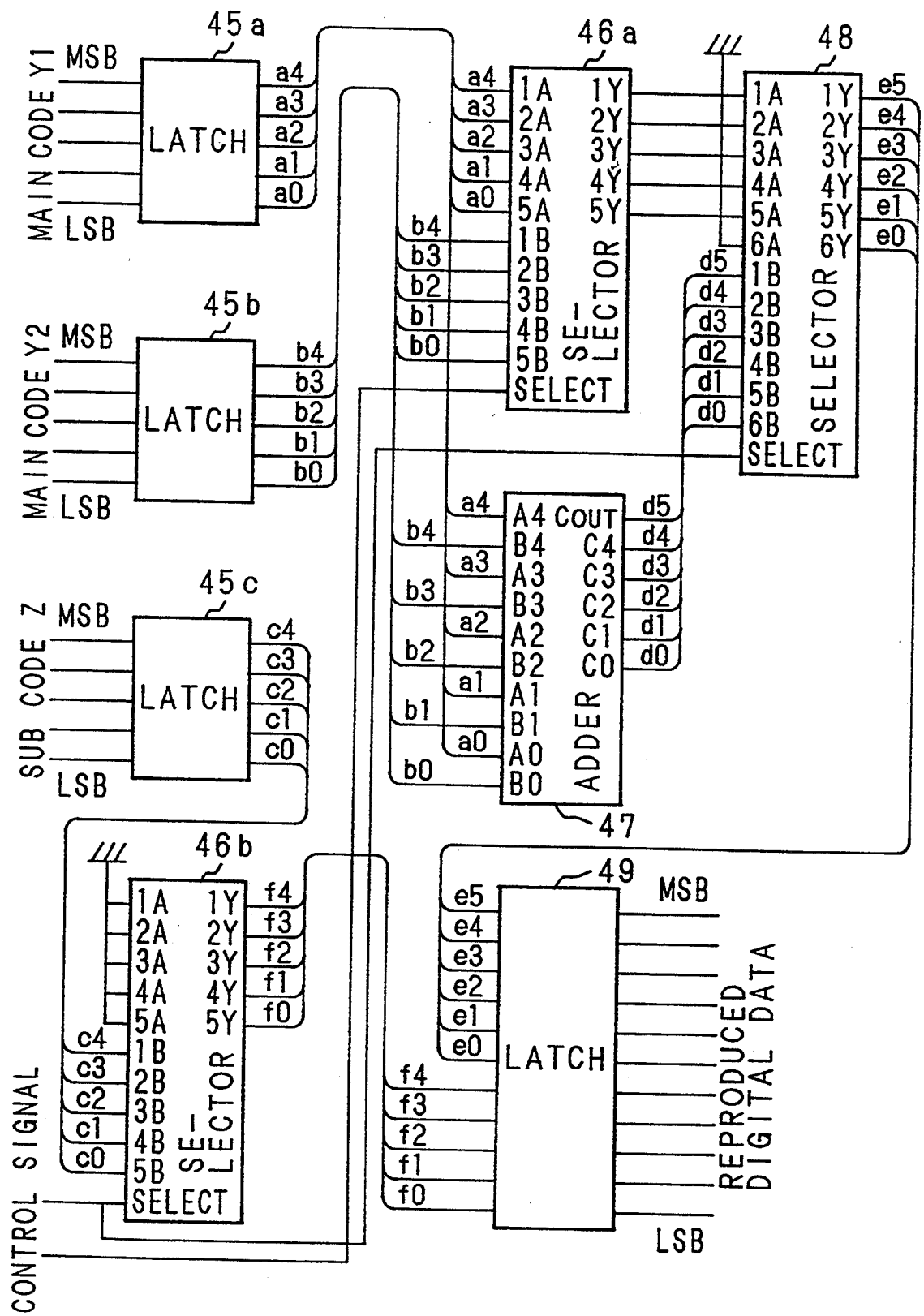
FIG. 12 is a block diagram of the data-division decoding circuit shown in FIG. 11.

FIG. 12 shows the block diagram of the data-division decoding circuit 44 in the first embodiment of the invention. This embodiment is an example of constituting a circuit which restores the digital data which has been divided into two main codes and a subcode by the data-division encoding circuit 31 shown in FIG. 10. Numerals 45a through 45c denote data latch circuits, numerals 46a, 46b denote selectors, numeral 47 denotes an adder, numeral 48 denotes a selector and numeral 49 denotes a data latch circuit. The data latch circuits 45a through 45c and 49, the selectors 46a, 46b, and 48, and the adder 47 constitute the data-division decoding circuit 44.

The operation of the recording system will now be described with reference to FIG. 7. Luminance signal Y and two color signals CR and CB which are supplied via the input terminals 1a through 1c are A/D-converted by the A/D converters 2a through 2c and supplied to the high-efficiency encoder 30 which divides the input digital data into two parts to reduce the recording bit rate and provides the output data. The operation of the high-efficiency encoder 30 will be described in detail later. The data with the recording bit rate having been reduced in the high-efficiency encoder 30 is provided with an error-correcting code generated to detect and correct errors occurring during reproduction being added to the recording signal in the error correction encoder 4. The recording digital signals with the check added thereto in the error correction encoder 4 are processed in the digital modulator 5 according to the specified modulation rule to suppress the low-frequency components of the recording signal. Sync signal and ID signal are added to the digital-modulated recording digital data in the sync-signal adding circuits 6a, 6b, and amplified in the recording amplifiers 7a, 7b, then recorded onto the magnetic tape 9 via the rotary heads 8a, 8b.

Operation of the reproduction system will now be described similarly with reference to FIG. 8. The 2-channel reproduction signals which have been reproduced from the magnetic tape 9 via the rotary heads 8a, 8b are amplified by the head amplifiers 10a, 10b, then converted to digital data by the data detectors 11a, 11b while jitter included in the reproduced signals is absorbed. The reproduced signals are then digitally-demodulated by the digital demodulators 12a, 12b, converted to reproduced digital signals and fed to the error correction decoder 13. The error correction decoder 13 detects errors occurring in the reproduced signals by means of the check added in advance during recording, and corrects the errors if detected. Reproduced signals with the errors being detected and corrected in the error correction decoder 13 are subjected to variable-length demodulation of the reproduced digital data of each channel, synthesis of data which has been divided into two main codes and a subcode by the data-division encoding circuit 31, and inverse DCT to restore the original luminance signal Y and two color signals CR and CB. Operation of the high-efficiency decoder 40 will be described in detail later together with the decoding of the divided data. The digital data is then converted to analog data by the D/A converters 15a through 15c and provided at the output terminals 16a through 16c.

The operation of the high-efficiency encoder 30 will now be described with reference to FIG. 9. Input luminance signal Y and two color signals CR and CB are provided with the specified delay in the field memories 17a, 17b and structured into blocks. This is done by first grouping the input signals into blocks of 8 pixels by 8 lines, then time-division multiplexing the luminance signal Y and two color signals CR and CB, and feeding them to the DCT circuit 18. The block-structured output of the field memories 17a, 17b is subjected to DCT in the DCT circuit 18. The conversion coefficients provided by the DCT circuit 18 are quantized by the adaptive quantizer 19. The adaptive quantizer 19 holds a plurality of quantization tables of different quantization steps and switches the quantization steps based on the conversion coefficients of each block and the parameters from the buffer memories 34a, 34b. Output of the adaptive quantizer 19 is fed to the data-division encoding circuit 31.

Operation of the data-division encoding circuit 31 of this embodiment will now be described in detail below. Let the value of the input digital data to the data-division encoding circuit 31 be X, then the data-division encoding circuit 31 divides the data into two parts by the following modular arithmetic.

The input digital data X to the data-division encoding circuit 31 is divided into main codes Y1, Y2 and subcode Z by the modular arithmetic $X = 2^{n-1} X (Y1+Y2) + Z$, with Y1, Y2 and Z calculated as follows.

$$Y1 = INT(X/2^n) \quad (1)$$

$$Y2 = INT(X/2^{n-1}) - INT(X/2^n) \quad (2)$$

$$Z = X \bmod 2^{n-1} \quad (3)$$

where INT (A/B) denote the quotient when A is divided by B, and A mod B denotes the remainder when A is divided by B.

The rule Of the above division will be described below using specific numerical values. Assume that digital data having a value of 395 is fed to the data-division encoding circuit 31. It is also assumed that n=6 in this embodiment. The input data is converted into two main codes Y1 and Y2 and a subcode Z according to the above equations (1), (2) and (3) as follows.

$$Y1 = INT(395/2^6) = 6$$

$$Y2 = INT(395/2^5) - INT(395/2^6) = 6$$

$$Z = 395 \bmod 2^5 = 11$$

The original value of the digital data X is completely restored as $X = 2^5 \times (6+6) + 11 = 395$.

According to this rule of division, the value of the input digital value of X can be nearly completely restored by the following calculation using the main code Y1 or Y2. Let the restored value be X', then the following equation holds.

$$X' = Y1(\text{or } Y2) \times 2^n \quad (4)$$

In the case of this embodiment, the following value is obtained from equation (4).

$$X' = 6 \times 2^6 = 384$$

Thus it can be seen that the value of input digital data X can be nearly completely restored, even when only the main code Y1 or Y2 is used.

When compared to the prior art wherein data is transmitted by writing twice, the number of transmitted bits with this method of division is (m−n) bits for the main code Y1 or Y2, and (n−1) bits for the subcode Z when the number of bits of the input digital data supplied to the data-division encoding circuit 31 is m. Consequently, if the input digital data has 11 bits, total number of transmitted bits after dividing into two parts is 15, provided that n is 6. Thus the bit rate of transmission is reduced in comparison to the prior art.

An embodiment when the above method of division is built in a circuit is shown in FIG. 10. This embodiment is to divide 11-bit input digital data into a 5-bit main code and a 5-bit subcode according to the division rule described above.

The operation of the data-division encoding circuit 31 will now be described below. Input 11-bit digital data X is latched in the data latch circuit 36 and fed to the adder 37 and the data latch circuit 38a. The data latch circuit 38a performs the operation of INT(X/2^6) shown in equation (1). In this embodiment where binary data is handled, operation of equation (1) can be performed by shifting the input data to the right by n bits and discarding the fraction. The value 395 mentioned above, for example, is represented as 00110001011 in the binary form. Consequently the value of INT (395/2^6), in the case of this binary expression, can be obtained by shifting the data to the right by n bits and discarding the fraction, resulting in 00110 (obtained by taking five bits from MSB).

The adder 37 similarly performs the operation INT (X/2^{6−1}) − INT (X/2^6) in equation (2). (The same result can be obtained by adding the value of the sixth bit from MSB to the value of INT ($X/2^6$), though the reason will not be explained here). Specifically, 00000 is added to 00110 to obtain the result of 00110.

Similarly ($X$ mod $2^5$) of equation (3) can be obtained by taking five bits from LSB because it is the remainder when $X$ is divided by $2^5$. Therefore (395 mod $2^5$) gives a value of 01011. It is assumed here that the data division for the subcode is performed by dividing one or more subcodes into two channels in the unit of multiple bits. (For example, data is divided into two channels every one bit alternately.)

The main codes of the two channels which have been divided into two parts by the data-division encoding circuit 31 are subjected to variable-length encoding by the variable-length encoders 32a, 32b and fed to the adders 33a, 33b which mix the variable-length encoded main code and the subcode which has been divided into two parts by the data-division encoding circuit 31, thereby to generate 2-channel recording data. The buffer memories 34a, 34b temporarily store the output data of the adders 33a, 33b to allow the data to be read at a fixed rate. The buffer controllers 35a, 35b detect the data stored in the buffer memories 34a, 34b and determine the quantization parameter according to the amount of the data, to control the adaptive quantizer 19. The buffer controllers 35a, 35b also select the conversion coefficients for the encoding in the variable-length encoders 32a, 32b according to the amount of data stored in the buffer memories 34a, 34b.

Operation of the high-efficiency decoder 40 will be described similarly with reference to FIG. 11. The 2-channel reproduced digital signal output from the error correction decoder 13 is separated into the main code and subcode, with the main code supplied to the variable-length decoders 41a, 41b and the subcode supplied to the buffer memories 43a, 43b. The main code supplied to the variable-length decoders 41a, 41b is subjected to variable-length decoding and converted to fixed-length main code. In the buffer memories 42a, 42b, the fixed-length main code which has been subjected to variable-length decoding is read at a fixed rate. The subcode which has been supplied to the buffer memories 43a, 43b is synchronized with the main code which is read at the fixed rate from the buffer memories 42a, 42b and is supplied to the data-division decoding circuit 44.

Operation of the data-division decoding circuit 44 of this embodiment will now be described in detail below with reference to FIG. 12. Input data to the data-division decoding circuit 44 is restored by the following modular arithmetic. Let the restored value be $X$ and it is expressed as follows.

$$X = 2^5 \times (Y1 + Y2) + Z \quad (5)$$

or either $$X = 2^6 \times Y1 \text{(or } Y2) \quad (6)$$

When the code data (Y1, Y2 and Z) which has been distributed into the channels is all reproduced, the output data calculated by modular arithmetic (5) is provided. When the data of one channel is not reproduced at a discontinuity of the track pattern such as cut-in point (or cut-out point) of editing described in the prior art, the output data calculated by equation (6) is given. When equation (6) is selected, it is assumed that the value of Y1 or Y2 which has been normally reproduced is used. Selection of the equations (5) and (6) is determined by means of the error detection flag provided by the error correction decoder 13 in this embodiment.

The main code and the subcode, which are reproduced from each channel are temporarily latched in the data latch circuits 45a through 45c. The 2-channel main codes Y1 and Y2 provided by the data latch circuits 45a, 45b are both supplied to the selector 46a and to the adder 47. The adder 47 sums up both 5-bit main codes, which have been supplied, to provide the sum as 6-bit digital output data (Y1+Y2 is calculated). The 6-bit digital data from the adder is supplied to the selector 48. The main code Y1 or Y2 supplied to the selector 46a is selected to give the output data based on the error detection flag given by the error correction decoder 13 (one without error is selected).

Outputs of the adder 47 and the selector 46a (output of the selector 46a is fed to the selector 48 in the form of 6-bit data ($2^6 \times Y1$ (or Y2) is calculated) by adding "0" to the least significant bit thereof) are selected such that the output of the selector 46a is selected when an error is detected in the reproduced digital signal by the selector 48, and the output of the adder 47 is selected when no error is detected. Similarly, the selector 46b is made in such a scheme as to select 00000 when an error is detected in the reproduced digital signal, and to select the subcode when no error is detected. The outputs of the selector 48 and the selector 46 are mixed ($2^5 \times (Y1+Y2)+Z$ or $2^5 \times 2 \times Y1$ (or Y2) is calculated) in the latch circuit 49 to provide the reproduced digital data as the output.

The reproduced digital data provided by the data-division decoding circuit 44 is inverse-quantized by the inverse adaptive quantizer 25 and fed to the inverse DCT circuit 26 which applies inverse DCT to the input reproduced digital signal. Reproduced luminance signal Y and the two reproduced color signals CB and CR which have been subjected to inverse DCT are temporarily stored in the field memories 27a, 27b with a specified delay added thereto, and the block structure which is given during recording is decoded, and supplied to the D/A converters 15a through 15c as outputs.

Figure 13:
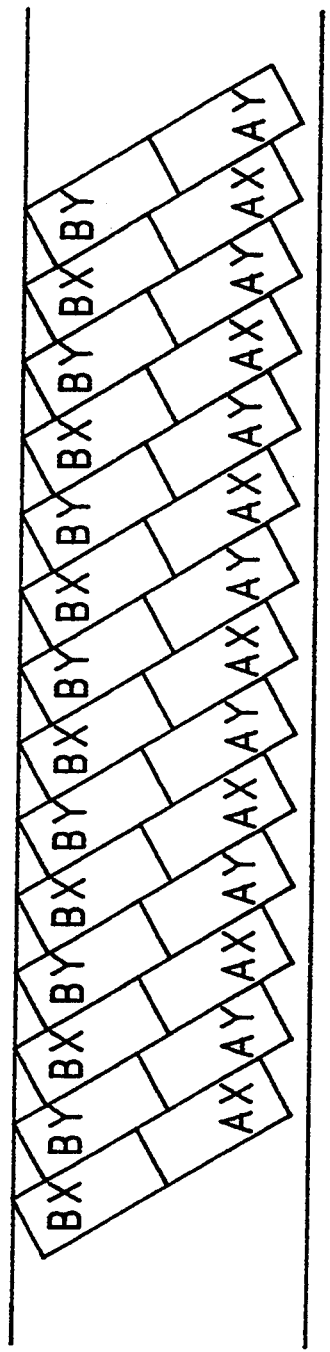
FIG. 13 is a recording format diagram of a digital VTR.

FIG. 13 shows the recording track pattern formed on the magnetic tape 9 of a digital VTR of this embodiment which employs 2-channel recording method. AX, AY, BX and BY denote the positions of recording data which has been divided into two parts by the data-division encoding circuit 31 (A is divided into AX and AY, and B is divided into BX and BY in this embodiment). It is assumed that the rotary heads of different channels have different azimuth angles.

Figure 14:
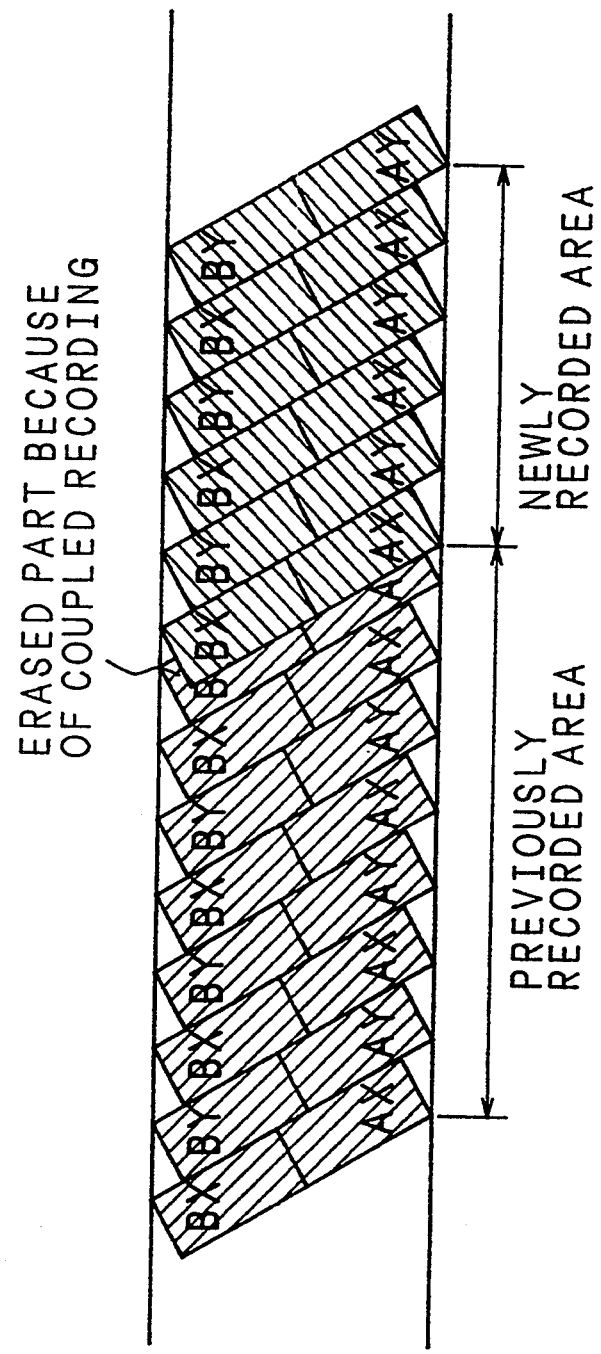
FIG. 14 is a diagram illustrative of the track pattern on the magnetic tape.

Now the editing operation by means of the digital VTR shown in this embodiment will be described below. Similarly to the prior art, it may happen that the track of one channel which has been recorded is overwritten with the data being destroyed at the cut-in point (or cut-out point) of editing operation as shown in FIG. 14 due to a failure of servo accuracy or misalignment of the track which is characteristic to the VTR. An operation for reproducing the data when the track of one channel is destroyed in such a situation will be briefly described below.

Even when the track of one channel is completely destroyed as described above, the digital VTR shown in this embodiment which employs interleave format as shown in FIG. 13 is capable of restoring the following original digital data A' and B' by using equation (6) if the main code (AX (or AY) and BX (or BY)) in one of the tracks can be reproduced as described previously.

$$A' = 2^6 \times AX(\text{or } AY)$$

$$B' = 2^6 \times BX(\text{or } BY)$$

When a digital value of 395 is given as input, for example, it can be restored as follows by the modular arithmetic (5) if both channels can be reproduced.

$$2^5 \times (6+6) + 11 = 395$$

If only the main code Y1 is reproduced due to an error occurring in the reproduced signal, on the other hand, the following value is restored by the modular arithmetic (6).

$$2^5 \times 6 = 384$$

Thus even such data that has been subjected to bandwidth compression (high-efficiency encoding) can be effectively divided into two parts by dividing the input digital data according to a specified rule of operation (for example, calculation of modular arithmetic (1) through (3)). And even when the data of one channel is completely overwritten and destroyed during editing, for example, the value of digital data can be nearly correctly restored by means of the main code which is reproduced from another track, thereby to obtain satisfactorily reproduced images without disturbance.

When compared to the case where data is simply written twice on each track, the amount of transmitted data in this embodiment is 15/22 prior to input to the variable-length encoders 32a, 32b, and the redundancy of recorded data is about 70% that of double writing.

As described above, the data dividing apparatus of this embodiment performs calculation of the input digital data by modular arithmetic which is determined in advance, to divide the data into two main codes and a subcode. And because it is capable of restoring the original digital value by means of the two main codes and the subcode during reproduction and nearly completely restoring the original digital value from only one of the main codes, it is possible to divide the data effectively into two parts even if the data has been subjected to bandwidth compression (high-efficiency encoding) by means of DCT or the like as in the case of digital VTR of this embodiment.

Thus it is possible to reproduce images without being disturbed at the cut-in point (or cut-out point), due to the capability of restoring most of the original digital values during reproduction from one of the main codes described above, even when the track of one of the channels which have been recorded is overwritten and is destroyed.

Also because data is not simply written twice on each track, redundancy of recording data is reduced.

Also in case of such defects as drop-out, flaw on the magnetic tape and loading of the rotary head, because the original digital value can be nearly completely restored if one of the main codes described above can be reproduced, interpolation or other process can be applied to digital images in case of drop-out subjected to bandwidth compression (high-efficiency encoding), thereby to obtain satisfactorily reproduced images.

Also in quick reproduction or slow reproduction, satisfactory variable-speed reproduction is made possible because the number of bits used to record one encoding word (main code) is reduced, resulting in increased number of encoding words which can be reproduced in one scanning of the rotary head, but detailed explanation will be omitted. Also because the same image data is recorded at two positions, probability of image information at a particular position being rewritten during variable-speed reproduction is increased by a factor of two, making it possible to obtain satisfactory variable-speed reproduction.

Embodiment 2

A block diagram of the digital VTR equipped with the data dividing apparatus of the second embodiment of the invention is the same as FIG. 7 and FIG. 8 indicated for the above embodiment. Block diagrams of the high-efficiency encoder 30 and high-efficiency decoder 40 are also the same as those shown in FIG. 9 and FIG. 11.

Figure 15:
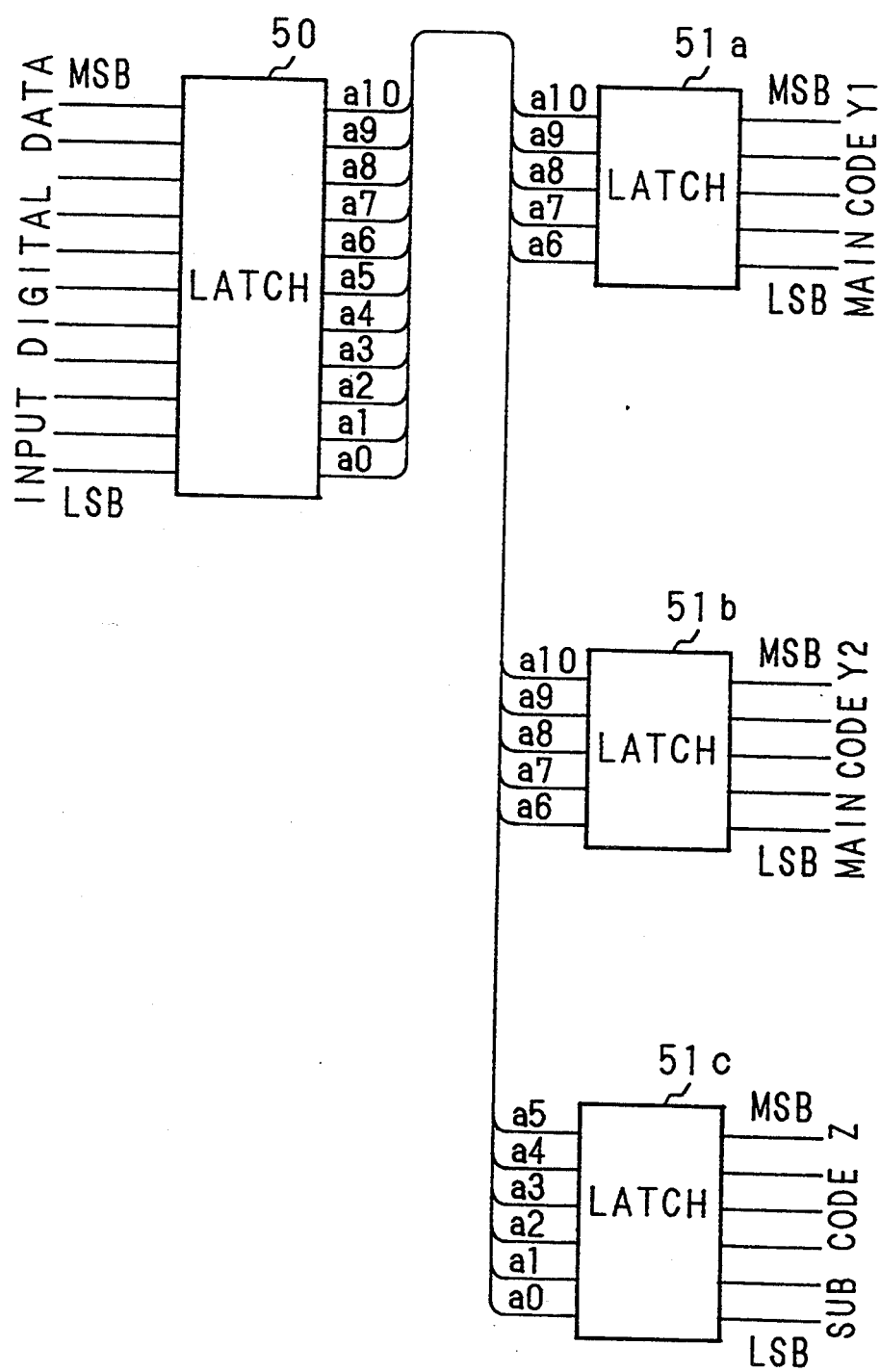
FIG. 15 is a block diagram of another data-division encoding circuit in FIG. 9.

FIG. 15 shows the block diagram of the data-division encoding circuit 31 of embodiment 2 of the invention. In FIG. 15, numeral 50 denote a data latch circuit and numerals 51a through 51c denote data latch circuits, which constitute the data-division encoding circuit 31.

Figure 16:
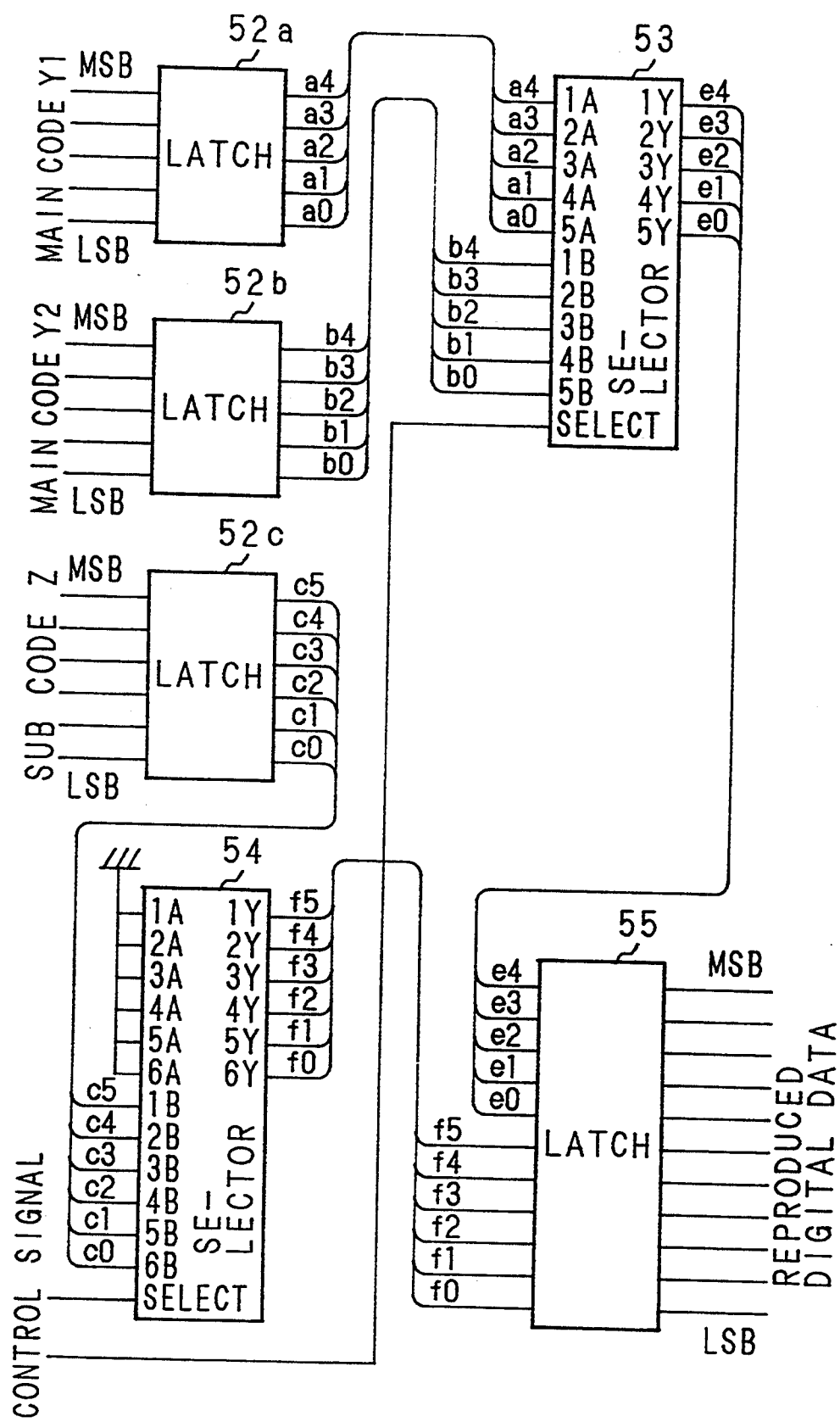
FIG. 16 is a block diagram of another data-division decoding circuit in FIG. 11.

Similarly, FIG. 16 shows the block diagram of the data-division decoding circuit 44 of embodiment 2. In FIG. 16, numerals 52a through 52c denote data latch circuits, numerals 53, 54 denote selectors and numeral 55 denotes a data latch circuit. The data latch circuits 52a through 52c and 55 and the selectors 53, 54 constitute the data-division decoding circuit 44.

Operation of embodiment 2 will now be described. Basic operation of embodiment 2 is the same as that of embodiment 1 with only the operations of the data-division encoding circuit 31 and the data-division decoding circuit 44 being different. Therefore description of the basic operation of embodiment 2 will be omitted and only the operations of the data-division encoding circuit 31 and the data-division decoding circuit 44 will be described in detail below.

First, the operation of the data-division encoding circuit 31 of this embodiment will be described in detail. Let the value of the input digital data supplied to the data-division encoding circuit 31 be X, then the data-division encoding circuit 31 divides the data into two parts by the following modular arithmetic.

The input digital data X supplied to the data-division encoding circuit 31 is divided into main codes Y1, Y2 and subcode Z calculated by the modular arithmetic $X = 2^n \times Y1$ (or $Y2) + Z$, with Y1, Y2 and Z being calculated as follows.

$$Y1 \text{ (or } Y2) = INT(X/2^n) \tag{7}$$

$$X = X \bmod 2^n \tag{8}$$

where INT (A/B) denote the quotient when A is divided by B, and A mod B denotes the remainder when A is divided by B.

The above rule of division will be described below using specific numerical values. Assume that digital data having a value of 395 is fed to the data-division encoding circuit 31. It is also assumed that n=6 in this embodiment. The input digital data is converted to two main codes Y1 and Y2 and a subcode Z according to the above equations (7), (8) as follows.

$$Y1 (\text{or } Y2) = INT(395/2^6) = 6$$

$$Z = 395 \bmod 2^6 =$$

The original value of the digital data X is completely restored as $X = 2^6 \times 6 + 11 = 395$.

Also according to this rule of division, the value of the input digital data X can be nearly correctly restored by the following calculation using the main code Y1 or Y2. Let the restored value be X', then the following equation holds.

$$X' = Y1(\text{or } Y2) \times 2^n \qquad (9)$$

In the case of this embodiment, the following value is obtained from equation (9).
$$X' = 6 \times 2^6 = 384$$

Thus it can be seen that the value of input digital data X can be nearly correctly restored even when only the main code Y1 or Y2 is used.

When compared to the prior art wherein data is transmitted by writing twice, the number of transmitted bits with this method of division is (m−n) bits for each of the main code Y1 and Y2, and n bits for the subcode Z when the number of bits of the input digital data to the data-division encoding circuit 31 is m. Consequently, if the input digital data has 11 bits, total number of transmitted bits after division into two parts is 16, provided that n is 6. Thus the bit rate of transmission is reduced in comparison to the prior art.

An embodiment when the above method of division is built in a circuit is shown in FIG. 15. This embodiment is to divide 11-bit input digital data into two 5-bit main codes and a 6-bit subcode according to the division rule described above.

The operation of the data-division encoding circuit 31 will now be described below. Input 11-bit digital data X is latched in the data latch circuit 50 and fed to the data latch circuits 51a through 51c which perform the operation of $INT(X/2^6)$ shown in equation (7). In this embodiment where binary data is handled, operation of equation (7) can be performed by shifting the input data to the right by n bits and discarding the fraction. The value 395 mentioned above, for example, is expressed as 00110001011 in the binary form. Consequently, the value of $INT(395/2^6)$, in the case of this binary expression, can be obtained by shifting the data to the right by six bits and discarding the fraction, resulting in 00110.

Similarly $(X \bmod 2^6)$ of equation (8) can be obtained by taking six bits from LSB because it is the remainder when X is divided by $2^6$. Therefore $(395 \bmod 2^6)$ gives a value of 001011. It is assumed here that the data division for the subcode is performed by dividing one or more subcodes into two channels in the unit of one bit. (For example, data is divided into two channels every one bit alternately.)

Operation of the data-division decoding circuit 44 of this embodiment will now be described in detail below with reference to FIG. 16. Input data to the data-division decoding circuit 44 is restored by the following modular arithmetic. Let the restored value be X and it is expressed as follows.

$$X = 2^6 \times Y1(\text{or } Y2) + Z \qquad (10)$$

or either $$X = 2^6 \times Y1(\text{or } Y2) \qquad (11)$$

When the code data which has been divided into the channels is all reproduced, the output data calculated by the modular arithmetic equation (10) is given. When the data of one channel is not reproduced at a discontinuity of the track pattern such as cut-in point (or cut-out point) of editing described in the prior art, it is assumed that the value of Y1 or Y2 which has been normally reproduced is used. Selection of the equations (10) and (11) is determined by means of the error detection flag provided by the error correction decoder 13 in this embodiment.

The main code and the subcode which are reproduced from each channel are temporarily latched in the data latch circuits 52a through 52c. The 2-channel main codes Y1 and Y2 provided by the data latch circuits 52a, 52b are supplied to the selector 53. The main codes Y1 and Y2 supplied to the selector 53 are selected by means of the error detection flag supplied by the error correction decoder 13 to switch the output data (one without error is selected). Similarly the selector 54 is built so that 000000 is selected when an error is detected in the reproduced signal (subcode signal) and the subcode is selected when no error is detected. Outputs of the selectors 53, 54 are mixed ($2^6 \times Y1$ (or Y2)+Z or $2^6 \times Y1$ (or Y2) is calculated) in the data latch circuit 55 to provide reproduced digital data.

FIG. 13 shows the recording track pattern formed on the magnetic tape 9 of a digital VTR of embodiment 2 which employs 2-channel recording method. AX, AY, BX and BY denote the positions of recording data, which has been divided into two parts, by the data-division encoding circuit 31 (A is divided into AX and AY, and B is divided into BX and BY in this embodiment). It is assumed that the rotary heads of different channels have different azimuth angles.

Now the editing operation by means of the digital VTR shown in embodiment 2 will be described below. Similarly to embodiment 1, it may happen that the track of one channel which has been recorded is overwritten with the data being destroyed at the cut-in point (or cut-out point) of editing operation as shown in FIG. 14 due to a problem of servo accuracy or misalignment of the track which is characteristic to the VTR. Operation of reproducing the data when the track of one channel is destroyed will be briefly described below.

Even when the track of one channel is completely destroyed as described above, the digital VTR shown in this embodiment which employs interleave format as shown in FIG. 13 is capable of restoring the original digital data if the main code (AX (or AY) and BX (or BY)) in one of the tracks can be reproduced as described previously. When a digital data of 395 is given as input, for example, it can be restored as follows by modular arithmetic equation (10) if both channels can be reproduced.

$$2^6 \times 6 + 11 = 395$$

If only the main code Y1 is reproduced due to an error occurring in the reproduced signal, on the other hand, the following value is restored by modular arithmetic equation (11).

$$2^6 \times 6 = 384$$

Thus even data that has been subjected to bandwidth compression (high-efficiency encoding) can be effectively divided into two parts by dividing the input digital data according to a specified rule of operation (for example, calculation of modular arithmetic equation (7)

and (8)). And even when the data of one channel is completely overwritten and destroyed during editing, for example, the value of digital data can be nearly correctly restored by means of the main code which is reproduced from another track, thereby to obtain satisfactorily reproduced images without disturbance.

When compared to the case where data is simply written twice on each track, amount of transmitted data in this embodiment is 16/22 prior to the input to the variable-length encoders 32a, 32b, and the redundancy of recorded data is about 73% that of double writing.

In a situation wherein this embodiment is applied to actual images (in this situation, 11-bit input data is divided into 9-bit main code and 2-bit subcode according to the above-mentioned rule of division), the amount of transmitted data after dividing into two parts is about 62.5% of that in the case of writing twice. , This improvement of transmission efficiency is caused by the increase of the 0 run length of AC components in the conversion coefficient main code data obtained by the DCT.

As described above, embodiment 2 is also constituted similarly to the embodiment 1 to perform a calculation of the input digital data by the modular arithmetic determined in advance, to divide the data into two main codes and a subcode. And because it is capable of restoring the original digital value by means of the two main codes and the subcode during reproduction and nearly completely restoring the original digital value from only one of the main codes, it is possible to divide the data effectively into two parts even for data that has been subjected to bandwidth compression (high-efficiency encoding) by means of DCT or the like as in the case of a digital VTR of this embodiment.

Thus it is possible to reproduce images without being disturbed even at the splicing point of editing such as the cut-in point (or cut-out point) or the like, due to the capability of restoring most of the original digital values during reproduction from one of the main codes described above, even when the track of one of the channels which have been recorded is overwritten and is destroyed.

Also because data is not simply written twice on each track, redundancy of recorded data is reduced. Also in case of such defects as drop-outs, a flaw on the magnetic tape and loading of the rotary head, because the original digital value can be nearly completely restored if one of the main codes described above can be reproduced, interpolation or other process can be applied in case of drop out to digital images subjected to bandwidth compression (high-efficiency encoding), to thereby obtain satisfactorily reproduced images.

Also in quick reproduction or slow reproduction, satisfactory variable-speed reproduction is made possible because the number of bits used to record one encoding word (main code) is reduced resulting in increased number of encoding words which can be reproduced in one scan of the rotary head, but detailed explanation will be omitted. Also because the same image data is recorded at two positions, probability of image information at a particular position being rewritten during variable-speed reproduction is increased by a factor of two, making it possible to obtain satisfactory variable-speed reproduction.

Because the same information is recorded for the main codes Y1 and Y2 in the first and second embodiments, it goes without saying that similar effect of data division can be obtained even when it is performed after variable-length encoding to simplify the circuit.

Because the same information is used for the main codes Y1 and Y2 in the embodiments 1 and 2, it goes without saying that similar effect can be obtained even when variable-length decoding is applied by means of a single system of variable-length decoder.

Also, because the same information is transmitted for the main codes Y1 and Y2 in embodiments 1 and 2, error detection may be conducted by using these data (check is made to see if the data agrees).

Embodiment 3

Although the data-division encoding circuit and the data-division decoding circuit in embodiments 1 and 2 are constituted as shown in FIG. 10, FIG. 12, FIG. 15 and FIG. 16, they are not restricted to those constitutions and may be constituted of microprocessors, ROMs or application specific ICs to obtain the similar results.

Embodiment 4

Although the data-division decoding circuit in embodiments 1 and 2 use the error selection signal from the error correction decoder 13 for the error select signal, the spirit of the invention is not limited to this scheme and the output level of the reproduction signal or the like may be used.

Embodiment 5

Although data is restored from only one main code when no error is detected in the data of one channel in embodiments 1 and 2, the subcode wherein no error is detected may be used for the data restoration to obtain similar effect.

Embodiment 6

Although input data is divided into two parts by the modular arithmetic equations (1) through (3), (7) and (8) in embodiments 1 and 2, a similar effect can be obtained by dividing input digital data into two main codes and a subcode according to a predetermined rule of calculation. Data dividing operation is conducted in such a manner that the original digital value can be restored if the two main codes and the subcode described above are reproduced, and the original digital value can be nearly correctly restored even from the main code only.

Embodiment 7

Although data is recorded by dividing all conversion coefficients into two parts in embodiments 1 and 2, the spirit of the invention is not limited to this scheme and similar effect can be obtained by dividing the DC component only in the case of DCT, or dividing only the low-frequency components -where the power is concentrated and applying variable-length encoding to other data as it is without dividing and transmitting the data. (In a simulation with 2-dimensional DCT, satisfactorily reproduced image can be obtained simply by transmitting the conversion coefficients up to tenth to twentieth components from DC in case of zig-zag scanning.)

Embodiment 8

Similar effect can be obtained by switching to another method (not described in this embodiment) by the distribution of the conversion coefficients after bandwidth compression in embodiments 1 and 2. (That is, this system is suited to the division of input digital data into two parts for such data that is distributed uniformly such as Gaussian distribution, and it has been verified by a simulation to have a remarkable effect in dividing the DC components when used in DCT.)

Embodiment 9

Although the subcode is mixed with the main code and transmitted simply after dividing into two parts in embodiments 1 and 2, a similar effect can be obtained by transmitting after applying run-length encoding or the like.

Embodiment 10

Although the data which has been divided into two parts is interleaved with such a recording format as shown in FIG. 13 before being recorded in embodiments 1 and 2, recording format is not limited to this and interleaved recording format as shown in FIGS. 17(a), (b) has the same effect.

Embodiment 11

Figure 18:
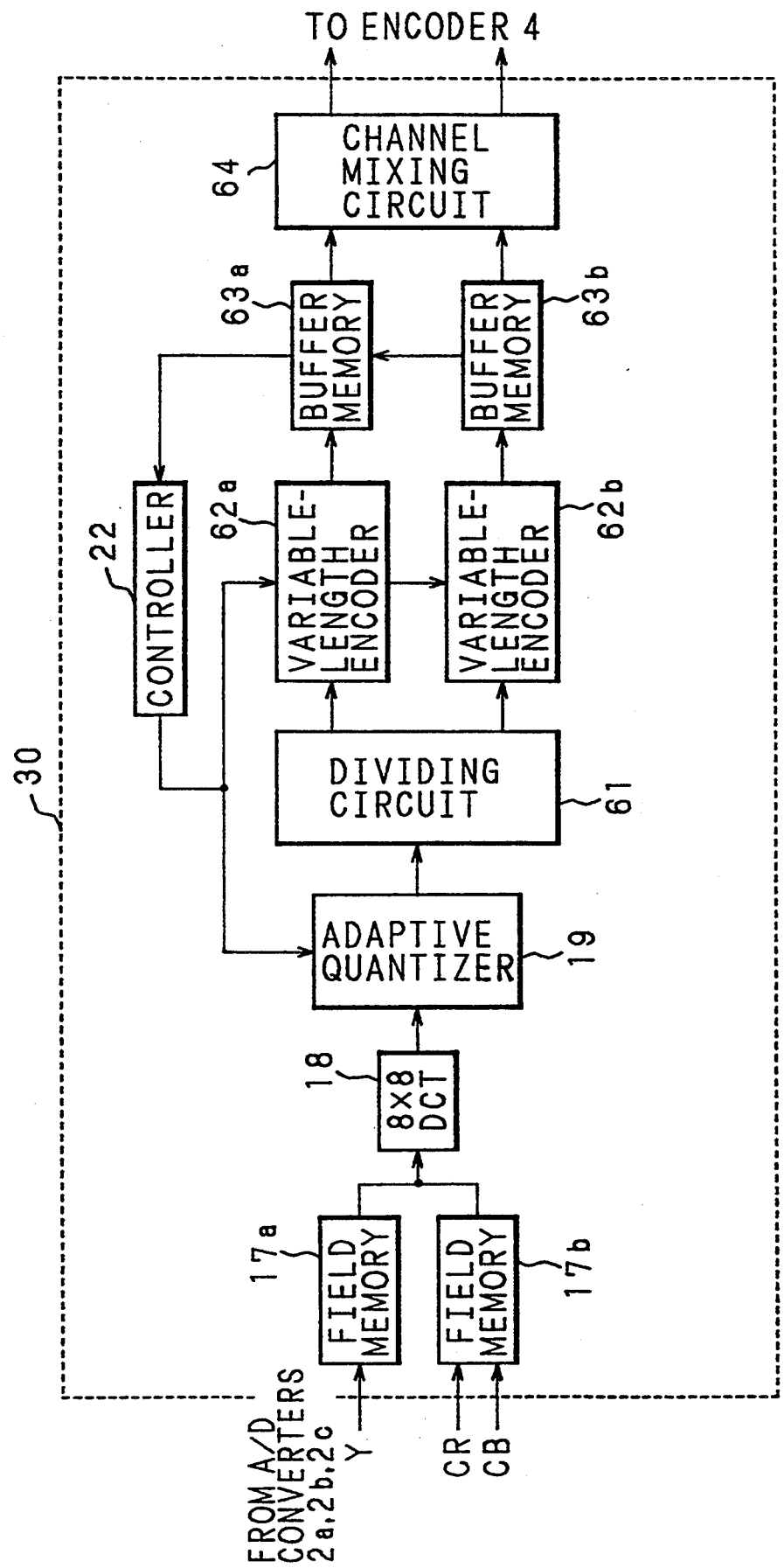
FIG. 18 is a block diagram of another high-efficiency encoder of the invention.
Figure 19:
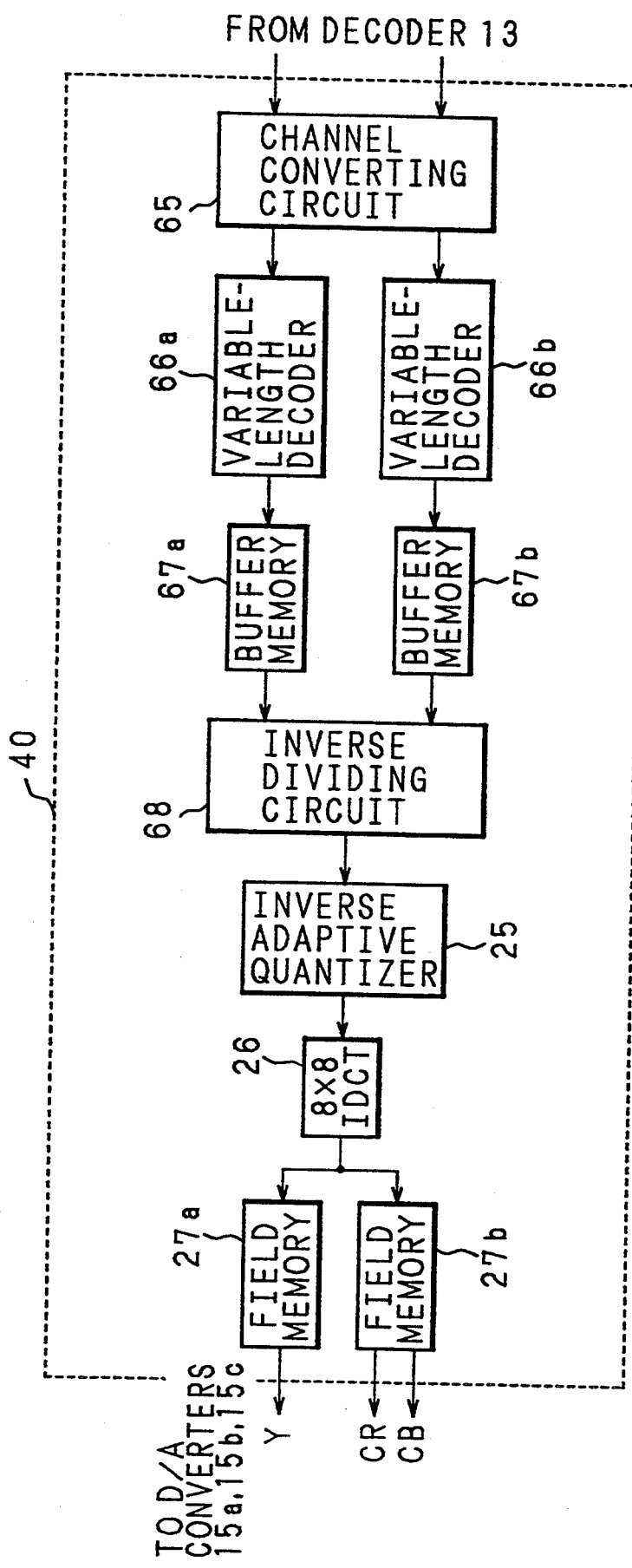
FIG. 19 is a block diagram of another high-efficiency decoder of the invention.

The basic constitution of the digital VTR in embodiment 11 is the same as that of the embodiment 1 (FIGS. 7, 8), though the constitutions of the high-efficiency encoder 30 and the high-efficiency decoder 40 are different. FIG. 18 shows the block diagram of the high-efficiency encoder 30 in embodiment 11, and FIG. 19 shows the block diagram of the high-efficiency decoder 40 in the embodiment 11. In FIG. 18, numeral 61 denotes a dividing circuit which converts a quantized coefficient into two digital codes X, Y, numerals 62a, 62b denote variable-length encoders which apply variable-length encoding to the digital codes X, Y obtained from the dividing circuit 61, numerals 63a, 63b denote buffer memories used to obtain the output of the variable-length encoders 62a, 62b at a fixed rate, and numeral 64 denotes a channel mixing circuit which mixes the output codes X, Y which have been divided by the dividing circuit 61 and converts them to 2-channel output.

In FIG. 19, numeral 65 denotes a channel converting circuit which converts signals reproduced by the rotary heads 8a, 8b into a channel of output code X only and a channel of output code y only, numerals 66a, 66b denote variable-length decoders, 67a, 67b denote buffer memories used to obtain outputs of the variable-length decoders 66a, 66b at a fixed rate, numeral 68 denotes an inverse dividing circuit which applies inverse conversion to a digital code by using the two output codes X, Y or either only the output code X or only the output code Y. In FIGS. 18, 19, the same numerals as those in FIGS. 9, 11 denote parts which are identical with those in the prior art.

Figure 20:
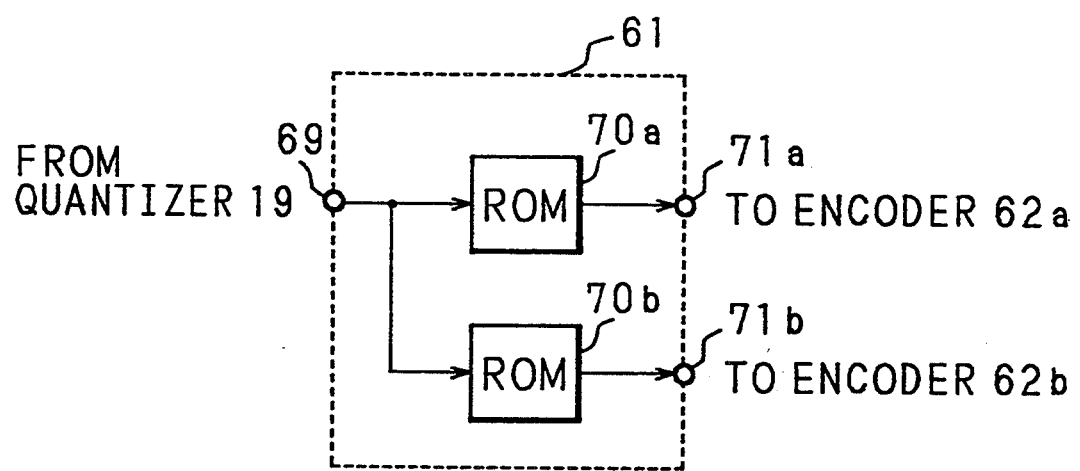
FIG. 20 is a block diagram of the dividing circuit in FIG. 18.

FIG. 20 shows the constitution of the dividing circuit 61 of FIG. 20, numeral 69 denotes an input terminal to receive adaptive-quantized conversion coefficients, numeral 70a denotes a ROM used to convert the conversion coefficients to digital code X, numeral 70b denotes a ROM used to convert a conversion coefficient to digital code Y, numerals 71a, 71b denote output terminals to supply the digital codes X, Y to the variable-length encoders 62a, 62b.

The operation will now be described below with reference to FIG. 18. Luminance signal Y and two color signals CR, CB which have been entered through the input terminals 1a through 1c are recorded onto the magnetic tape 9 through identical processes with those in the prior art except for the process in the high-efficiency encoder 30.

The operation of the high-efficiency encoder 30 will be described below with reference to FIG. 18. Luminance signal Y and two color signals CR, CB which have been entered are structured into blocks each having eight pixels by eight lines by the field memories 17a, 17b similarly to the prior art. The blocks are subjected to 2-dimensional DCT in the DCT circuit 18 to provide the outputs of the conversion coefficients. These conversion coefficients are quantized while switching the quantization step according to the conversion coefficients from each block and the parameters from the buffer memories 63a, 63b.

Let an adaptive-quantized conversion coefficient be D and the two output codes be X and Y. Input D and output X are related to each other in such a manner that a multiplicity of consecutive values of input D are related to one output code X, and a multiplicity of consecutive values of input D that follow are related to the above output code X plus one. Output code Y is obtained from the input D and output code X to satisfy the relation $D=2X+Y$. A conversion table is prepared in advance from the relationship between the input D and the output code X. This conversion table is shown in FIG. 21. Based on this relationship between the input D and output code X, output code X is written onto the ROM 70a at address indicated by the input D to generate a conversion table for output code X. Similarly for ROM 70b, a conversion table for output code Y is generated based on this relationship between the input D and output code Y. The dividing circuit 61 uses this conversion table to divide the adaptive-quantized conversion coefficients into two output codes X and Y. This operation will be described below with reference to FIGS. 22(a)-(c). FIG. 22(a) shows conversion coefficients of one block after adaptive quantization. The conversion coefficient D is entered in the ROM 70a, 70b as an address which has a conversion table as shown in FIG. 21 to obtain two output codes X and Y. Digital codes of one block of X and Y at this time are shown in FIGS. 22(b) and (c).

The output codes X and Y which have been converted by the dividing circuit 61 are subjected to variable-length encoding in the variable-length encoders 62a, 62b, respectively, and are supplied to the buffer memories 63a, 63b. Data stored in the buffer memories 63a, 63b is read at a fixed rate. The buffer controller 22 controls the adaptive quantizer 19 and the variable-length encoders 62a, 62b according to the amount of data stored in the buffer memories 63a, 63b similarly to the prior art.

Figure 23:
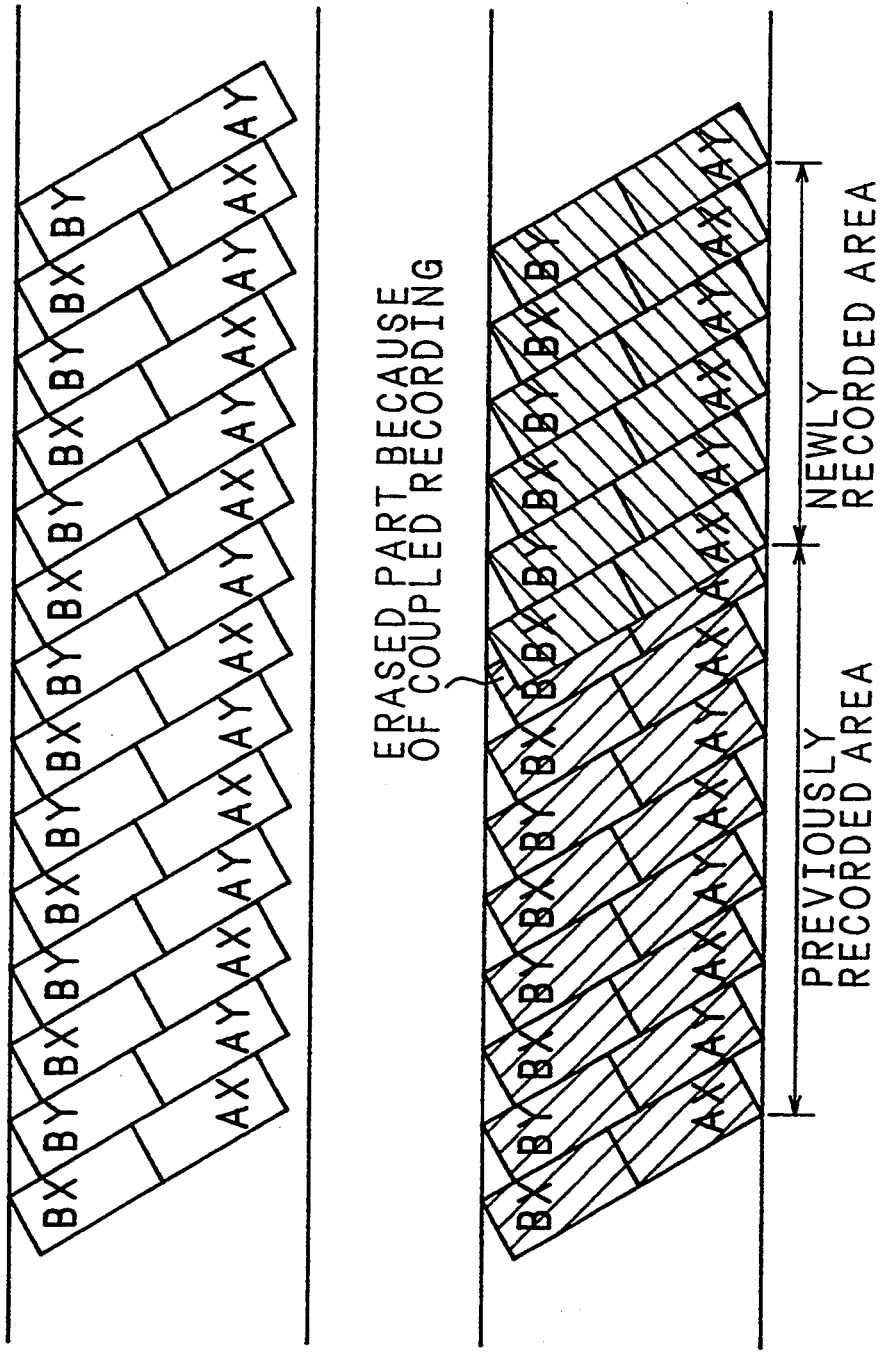
FIG. 23 is a diagram explanatory of the operation of the invention.

Output code X which is read from the buffer memory 63a and output code Y read from the buffer memory 63b are synthesized by the channel mixing circuit 64 and distributed between the respective rotary heads 8a, 8b so that the output code X and the output code Y are recorded on different tracks. The pattern of recording tracks at this time is shown in FIG. 23. A and B inscribed in the drawing correspond to A and B inscribed in the prior art described previously and carry the same information as that in the prior art. X and Y correspond to the output code X and the output codes Y, respectively.

Operation of the reproduction system will now be described below. Similarly to the prior art described previously, a reproduced signal is subjected to digital demodulation and error correction, then converted to the channels which correspond to the output code X and output code Y by the channel converting circuit 65. The channel which corresponds to the output code X is subjected to variable-length decoding by the variable-length decoder 66a, and the channel which corresponds to the output code Y is subjected to variable-length decoding by the variable-length decoder 66b, both being converted to fixed-length data and temporarily stored in the buffer memories 67a, 67b. In the buffer memories 67a, 67b, variable-length decoded fixed-length data is read at a fixed rate. In the inverse dividing circuit 68, output codes X and Y which have been read from the buffer memories 67a, 67b are used to calculate 2X+Y in reverse to the operation performed during recording and provide the value as output. This is followed by inverse quantization, inverse DCT and inverse block structuring similarly to the prior art to obtain the reproduced luminance signal Y and two reproduced color signals CR and CB.

When editing on a digital VTR which uses the high-efficiency encoder 30 and the high-efficiency decoder 40 constituted as described above, such a trouble as destroying the track of one channel which has been recorded may occur at the cut-in point (or cut-out point) of editing similarly to the case of the prior art (FIG. 23). Even in such a case, entire image data of one field can be reproduced although the reproduced signals from the remaining track are degraded to a certain degree.

Operation at this time will be described below. Signals reproduced from the rotary heads 8a, 8b are shown in FIG. 24 (a). If a track which has been destroyed in the editing operation is reproduced by the rotary head 8a or 8b, it is recognized from the fact that the reproduction envelope is less than specified or that the number of errors in the reproduced signals is greater than specified, and a detection signal output is given as shown in FIG. 24(c). Reproduced signals from each channel are converted to a channel of output code X only and a channel of output code Y only by the channel converting circuit 65 (FIG. 24(b)), and are subjected to variable-length decoding by the variable-length decoders 66a, 66b, then fed to the inverse dividing circuit 68. In the inverse dividing circuit 68, based on the detection signal, reproduced digital data is obtained by the calculation 2X+Y when neither track is destroyed by the editing operation or the like and, if one track is destroyed, use of the reproduced signals from the track is inhibited and only the reproduced signals from another track (output code X in the case of FIGS. 24(a)-(d)) are converted by means of the conversion table as shown in FIG. 25 to construct the image of one field.

Because the reproduced signals are composed by using both or only one of the divided outputs depending on the states of the tracks when reproducing after dividing the coefficients which have been subjected to DCT and adaptive quantization into two parts and recording them on separate tracks, acceptable image quality can be obtained even when one of the tracks is destroyed during editing operation.

Embodiment 12

Embodiment 11 is an example where conversion coefficients are converted to two outputs to satisfy a relation $D=2X+Y$ when dividing the coefficients D which have been subjected to DCT and adaptive quantization into two output codes X and Y. Besides this example, a similar effect to embodiment 11 can be obtained by determining the conversion table to satisfy the relation $D=3X+Y$ in advance (the conversion table in this case is shown in FIG. 26), determining the contents to be written onto the ROM 70a, 70b according to the conversion table, entering the conversion coefficients D to the ROM 70a, 70b as addresses to obtain the corresponding two output codes, and recording them.

Also a similar effect to embodiment 11 can be obtained with any patterns, if one input code is converted to two output codes so that the relation $D=AX+BY$ (A and B are real numbers) is satisfied by the input D and the two output codes X, Y such as $D=X+Y$, $D=X+2Y$ or $D=X+3Y$, and so

Embodiment 13

Although a code table is used to obtain output codes X, Y from the input code D in embodiment 11, Y may be obtained by preparing a conversion table which is used to obtain the input code X from the input code D in advance, obtaining the output code X using this code table and calculating $Y=(D-AX)/B$ to obtain Y from D and X.

Embodiment 14

Figure 27:
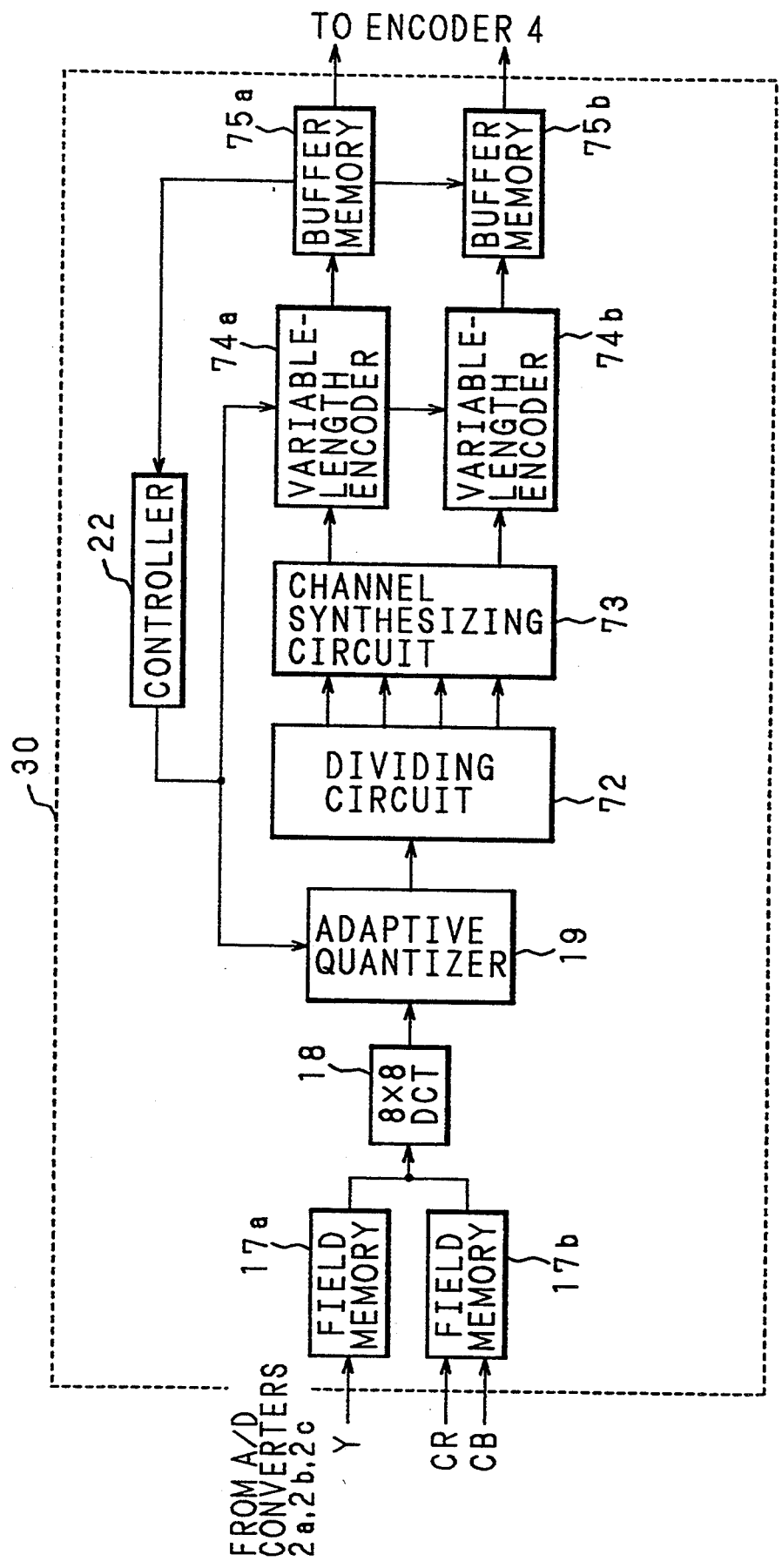
FIG. 27 is a block diagram of another high-efficiency encoder of the invention.
Figure 28:
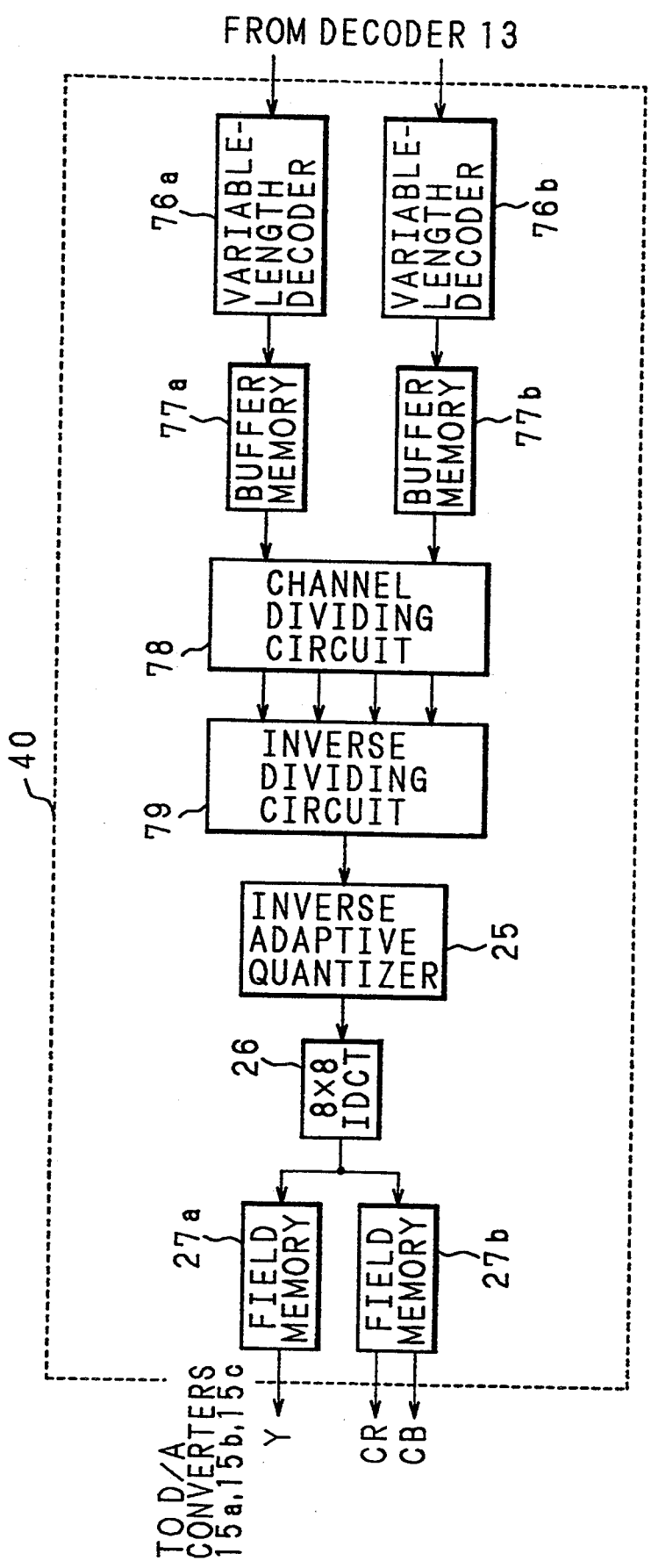
FIG. 28 is a block diagram of another high-efficiency decoder of the invention.

Although input D is converted to two output codes X and Y then recorded in embodiments 11 through 13, input D may be converted to three or more digital codes and synthesized into two channels to be recorded. Such an embodiment will be described below. FIG. 27 shows the block diagram of the high-efficiency encoder 30 of embodiment 14, FIG. 28 shows the block diagram of the high-efficiency decoder 40 of embodiment 14. In FIG. 27, numeral 72 denotes a dividing circuit which converts the quantized conversion coefficients to four digital codes $X_0$, $X_1$, $X_2$ and $X_3$, numeral 73 denotes a channel synthesizing circuit which synthesizes the four digital codes into two channels, numerals 74a, 74b denote variable-length encoders which apply variable-length encoding to the digital codes which have been synthesized into two channels, and numerals 75a, 75b denote buffer memories used to provide the outputs of the variable-length encoders 74a, 74b. In FIG. 28, numerals 76a, 76b denote variable-length decoders 76a, 76b which convert variable-length encoded data to the original fixed length data, numerals 77a, 77b denote buffer memories used to provide the outputs of the variable-length decoders 76a, 76b at a fixed rate, numeral 78 denotes a channel dividing circuit which divides the 2-channel reproduction signals into four digital codes, numeral 79 denotes an inverse dividing circuit which changes the conversion method depending on the state of reproduction among the four digital codes and applies inverse conversion to one digital code. In FIGS. 27, 28, same numerals as in FIGS. 9, 11 denote the same as those in the prior art.

Figure 29:
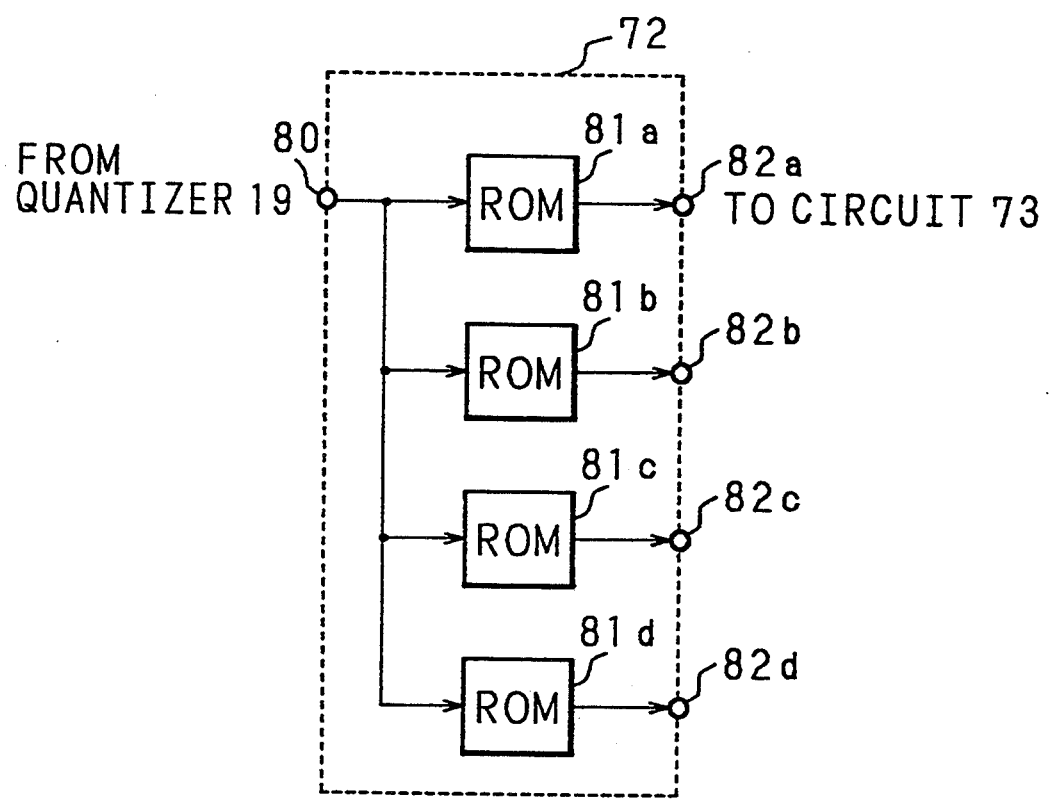
FIG. 29 is a block diagram of the dividing circuit in FIG. 27.

FIG. 29 shows the dividing circuit 72 of FIG. 27. In FIG. 29, numeral 80 denotes an input terminal which receives the input of the conversion coefficients which have been adaptive-quantized, numeral 81a denotes a ROM which converts the conversion coefficients to digital code $X_0$, numeral 81b denotes a ROM which converts the conversion coefficients to digital code $X_1$, numeral 81c denotes a ROM which converts the conversion coefficients to digital code $X_2$, numeral 81d denotes a ROM which converts the conversion coefficients to digital code $X_3$, and numerals 82a through 82d denote output terminals to provide outputs to the channel synthesizing circuit 73.

The operation will now be described below. Similarly to the prior art and the embodiment 11, input signals are subjected to DCT and adaptive quantization, and are fed to the dividing circuit 72. The rule of conversion in the dividing circuit 72 is specified as follows. Let the adaptive-quantized conversion coefficient be D and the two converted codes be $D_0$ and $D_1$, then $D_0$ is determined and $D_1$ is determined to satisfy the relation $D = 2D_0 + D_1$ similarly to the embodiment 11 to relate D to $D_0$ and $D_1$. Let the four output codes be $X_0$, $X_1$, $X_2$ and $X_3$, then $X_0$ and $X_2$ are determined similarly to the embodiment 11 and $X_1$ and $X_3$ are determined from $D_0 = 2X_0 + X_1$, $D = 2X_2 + X_3$. Thus the input D and the outputs $X_0$ through $X_3$ are related to satisfy $D = 4X_0 + 2X_1 + 2X_2 + X_3$. A conversion table based on this conversion rule is prepared and written in the ROMs 81a through 81d in advance. This conversion table is shown in FIG. 30. The dividing circuit 72 uses this conversion table (data stored in ROMs 81a through 81d) to divide the data into four output codes $X_0$ through $X_3$. The channel synthesizing circuit 73 synthesizes one channel from $X_0$ and $X_1$ among the four output codes and synthesizes another channel from $X_2$ and $X_3$. The variable-length encoders 74a, 74b applies variable-length encoding to each channel and records them.

The operation of the reproducing system will now be described below with reference to FIG. 28. Similarly to the prior art and the embodiment 11, the reproduction signal of each channel is subjected to digital demodulation, error correction and variable-length decoding, and is fed to the channel dividing circuit 78. The channel dividing circuit 78 operates reverse to recording to divide the 2-channel reproduction signals into four digital codes. In the inverse dividing circuit 79, when reproduction of a track which has been destroyed during editing is detected, the reproduced digital code from the destroyed track is not used and the original digital value is nearly correctly restored by using the remaining code, similarly to the embodiment 11. If all tracks are reproduced, the original digital value is restored by using the four digital codes.

Because the conversion coefficients which have been subjected to DCT and adaptive quantization are divided into four digital codes, synthesized into two channels and recorded, and the original digital value is restored by using few codes among the four digital codes depending on the state of the reproduced track, similar effect as the embodiment 11 can be obtained.

In the embodiment described above, when dividing the conversion coefficients which have been subjected to DCT and adaptive quantization into four output codes $X_0$ through $X_3$, the conversion coefficients are converted to four digital codes $X_0$ through $X_3$, so that a relationship $D = 4X_0 + 2X_1 + 2X_2 + X_3$ exists. Besides this example, an effect similar to that of embodiment 11 can be obtained by preparing a conversion table which satisfies the relationship $D = 6X_0 + 3X_1 + 2X_2 + X_3$ and dividing the conversion coefficients into four digital codes by using this conversion table to synthesize into two channels and recording them.

The number of digital codes generated by division is not limited to four, but may be any number not less than three. Also a similar effect to embodiment 11 can be obtained with any patterns, if one input code D is converted to n digital codes so that the relation $D = K_0 X_0 + K_1 X_1 + \ldots + K_{n-1} X_{n-1}$ ($K_0, \ldots K_{n-1}$ are real numbers) is satisfied by the input D and the n digital codes $X_0, \ldots X_{n-1}$.

Embodiment 15

The embodiment 15 uses a constitution similar to that of embodiment 11 with a modified rule of generating the conversion table and provides an effect similar to that of embodiment 11.

An effect similar to that of embodiment 11 can be obtained as shown in FIGS. 18 through 20 by preparing a code table according to a rule as described below and converting the input code to output codes X and Y by means of this code table.

All input digital codes D are divided into groups each containing four different input digital codes so that a digital code in one group can be uniquely expressed by a combination of output code X having two different values and output code Y having two different values, and a combination of output codes X and Y which represents a digital code in a particular group does not represent another digital code. A code table composed according to this rule is shown in FIG. 31. A conversion table is prepared by writing onto ROM 70a, 70b according to this code table. This operation will be described below with reference to FIGS. 32(a)–(c). FIG. 32(a) shows conversion coefficients of one block after adaptive quantization, which are supplied to ROM 70a, 70b shown in FIG. 20 as the address to obtain two output codes X and Y. Values of the output codes X and Y are shown in FIGS. 32(b) and (c).

The operation of the reproduction system will now be described below. When it is detected that a track destroyed in the editing operation or the like is reproduced, conversion is carried out by using the code table, among the code tables as shown in FIG. 33, which corresponds to the obtained code, otherwise inverse conversion is carried out by using both output codes X and Y.

Embodiment 16

In embodiment 15, conversion is carried out according to a conversion rule as shown in FIG. 31. A similar effect to that of embodiment 15 can be obtained by dividing the input digital codes D into groups each including six different input digital codes, and preparing a code table according to a rule specified so that a digital code in one group can be uniquely expressed by a combination of output code X having three different values and output code Y having two different values, and a combination of output codes X and Y which represents a digital code in a particular group does not represent another digital code, thereby dividing the inputs to two outputs by of this code table. A code table in this case is shown in FIG. 34.

Besides the code tables described in embodiments 15 and 16, similar effect to those of embodiments 15 and 16 can be obtained by preparing a code table according to the following rule: dividing input digital data D into n output codes $X_0, X_1, \ldots, X_{N31\ 1}$ (where n is an integer not less than 2) so that the input digital data D is divided into a plurality of groups, each group containing not more than t pieces of different input digital data where (t is an integer) so that each piece of digital data in the plurality of groups is uniquely represented by a combination of output codes $X_0$ having $m_0$ different values, output codes $X_1$ having $m_1$ different values, . . . and output codes $X_{n-1}$ having $m_{n-1}$ different values (where $m_0, m_1, \ldots, m_{n-1}$ are integers and $m_0 \times m_1 \times \ldots \times m_{n-1} \geq n$), and a combination of the output codes $X_0$, $X_1, \ldots X_{n-2}$ which represents digital data in a one of the plurality of groups does not represent digital data in another of the plurality of groups.

Embodiment 17

Although the input is divided into two output codes X and Y in the embodiments 15 and 16, similar effect can be obtained by converting the input digital code D into three or more digital codes as shown in FIGS. 27 through 29 and synthesizing two channels.

This embodiment will be described below. The rule of conversion is specified as follows. All input digital codes are divided into groups, each containing eight different input digital codes, so that an input digital code in one group can be uniquely expressed by a combination of four digital codes $X_0$ through $X_3$ having two different digital codes, and a combination of digital codes $X_0$ through $X_3$ which represents an input digital code in a particular group does not represent another input digital code. This conversion table is shown in FIG. 35.

Embodiment 18

Although tracks destroyed in an editing operation are detected by checking the size of the reproduced envelope or the number of errors in the embodiment 11, the accuracy of detection is improved by comparing the size of reproduced envelopes of a plurality of tracks which constitute one field and, when reproduced envelope of only one track is significantly smaller compared to other tracks, providing a detection signal output.

A similar effect can also be obtained by comparing the number of errors and providing a detection signal output when many errors have occurred in a particular track.

An increase in the amount of information when the embodiments 11, 12, 14, 15 and 17 are applied to data which has been subjected to bandwidth compression (high-efficiency encoding) is shown in FIG. 36, which clearly indicates that the amount of information is reduced compared to the case of writing the data twice.

As described above, in embodiments 11 through 17, even when there is a track which has been destroyed by editing operation, images can be reproduced with acceptable picture quality by using the remaining tracks and decrease the amount of data due to the division.

Embodiment 19

The high-efficiency encoder 30 and the high-efficiency decoder 40 in the embodiment 19 are the same as that of embodiment 11 (FIGS. 18, 19), and the dividing circuit 61 of the high-efficiency encoder 30 is the same as that in embodiment 11 (FIG. 20).

The operation will now be described below with reference to FIGS. 18, 19, and 20. Although the basic operation of the entire system is similar to embodiment 11, the relation of the conversion coefficients D subjected to adaptive quantization to the two output codes X and Y is different from that of embodiment 11. In embodiment 19, output code X and output code Y for a value of input D are determined by the following equations.

$$D = x^{1.5608} + 2 \times y + z$$

$$X = x$$

$$Y = 2 \times y + z$$

Figure 38:
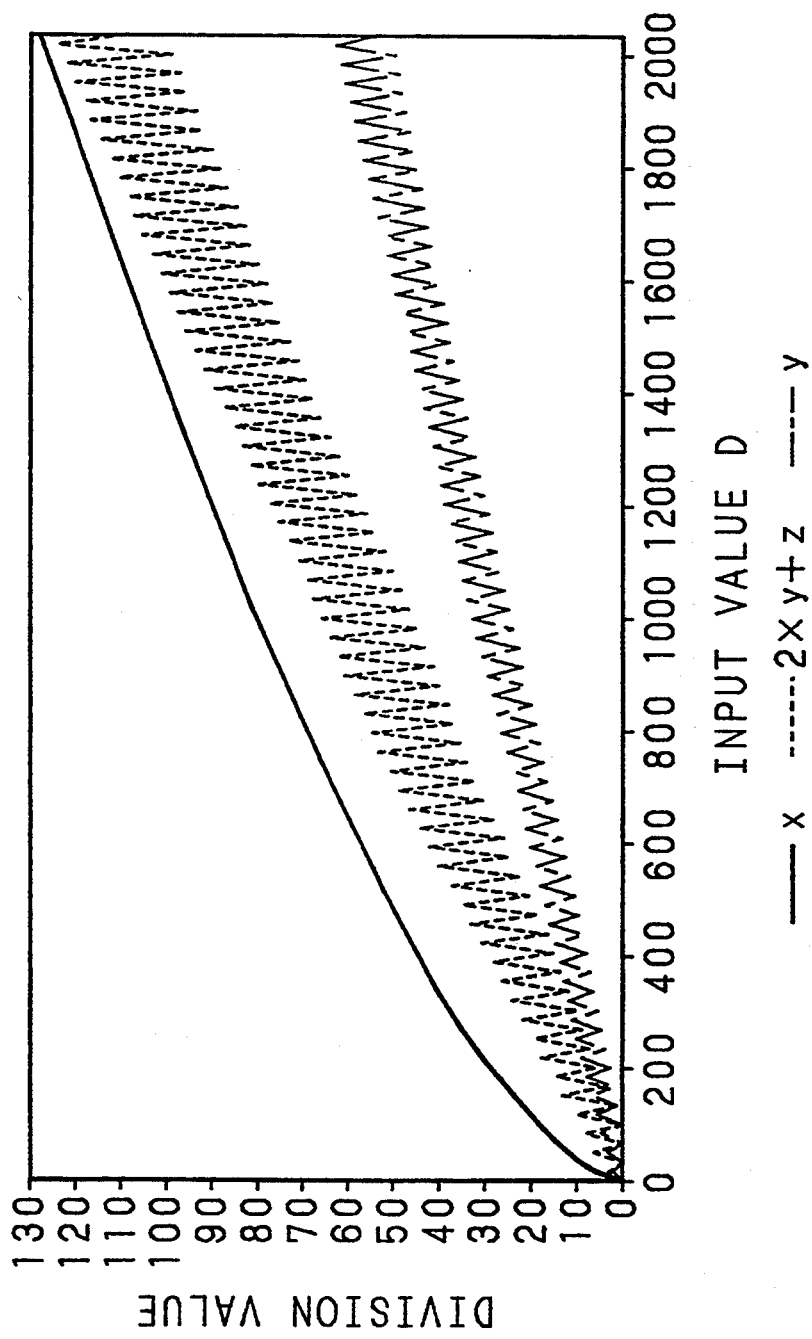
FIG. 38 is a graph illustrative of the dividing characteristic of the code table.

A conversion table is prepared in advance from the relationship between the input D and the output codes X and Y. A conversion table in case the input D is expressed with 11 bits to have a value range from 0 to 2047 ($\pm 1023$ when sign is used) is shown in FIGS. 37(a) and (b). A graph of the dividing characteristic is shown in FIG. 38. Based on the relationship between the input D and the output code X, output code X is written onto ROM 70a at the address indicated by the input D to prepare a conversion table for output code X. Similarly for ROM 70b, a conversion table for output code Y is prepared based on the relationship between the input D and the output code Y. The dividing circuit 61 divides the adaptive quantized conversion coefficients into two output codes X and Y by using this conversion table. This operation will be described below with reference to FIGS. 39(a)-(c). FIG. 39(a) shows the conversion coefficients of one block after adaptive quantization. These conversion coefficient D are supplied as the address to the ROMs 70a, 70b which have conversion table as shown in FIG. 37 to obtain two output codes X and Y. Digital codes of one block of X and Y at this time are shown in FIGS. 39(b) and (c).

The operation of the reproduction system will now be described below. Although the basic operation of the reproduction system is similar to that of embodiment 11, the calculation formula used in the inverse dividing circuit 68 is different. That is, the inverse dividing circuit 68 uses the output codes X and Y read from the buffer memories 67a, 67b and performs an operation reverse to that during recording, namely calculation of $D = X^{1.5608} + Y$, and provides the output of D.

Also in embodiment 19, similarly to embodiment 11, it may happen that the track of one channel where data has been recorded is destroyed at the cut-in point (or cut-out point) of editing (FIG. 23). Even in such a case, entire image data of one field can be reproduced although the reproduced signals from the remaining track are degraded to a certain degree.

A signal diagram of embodiment 19 corresponding to FIG. 24 is shown in FIG. 40. In embodiment 19, the inverse dividing circuit 68 operates based on the detection signal so that reproduced digital data is obtained by the calculation $X^{1.5608} + Y$ when neither track is destroyed in editing operation or the like and, if one track is destroyed, use of the reproduced signals from the track is inhibited and only the reproduced signals from another track (output code X in the case of FIG. 40) are converted by means of the conversion table as shown in FIG. 41 to construct the image of one field.

Figure 45A:
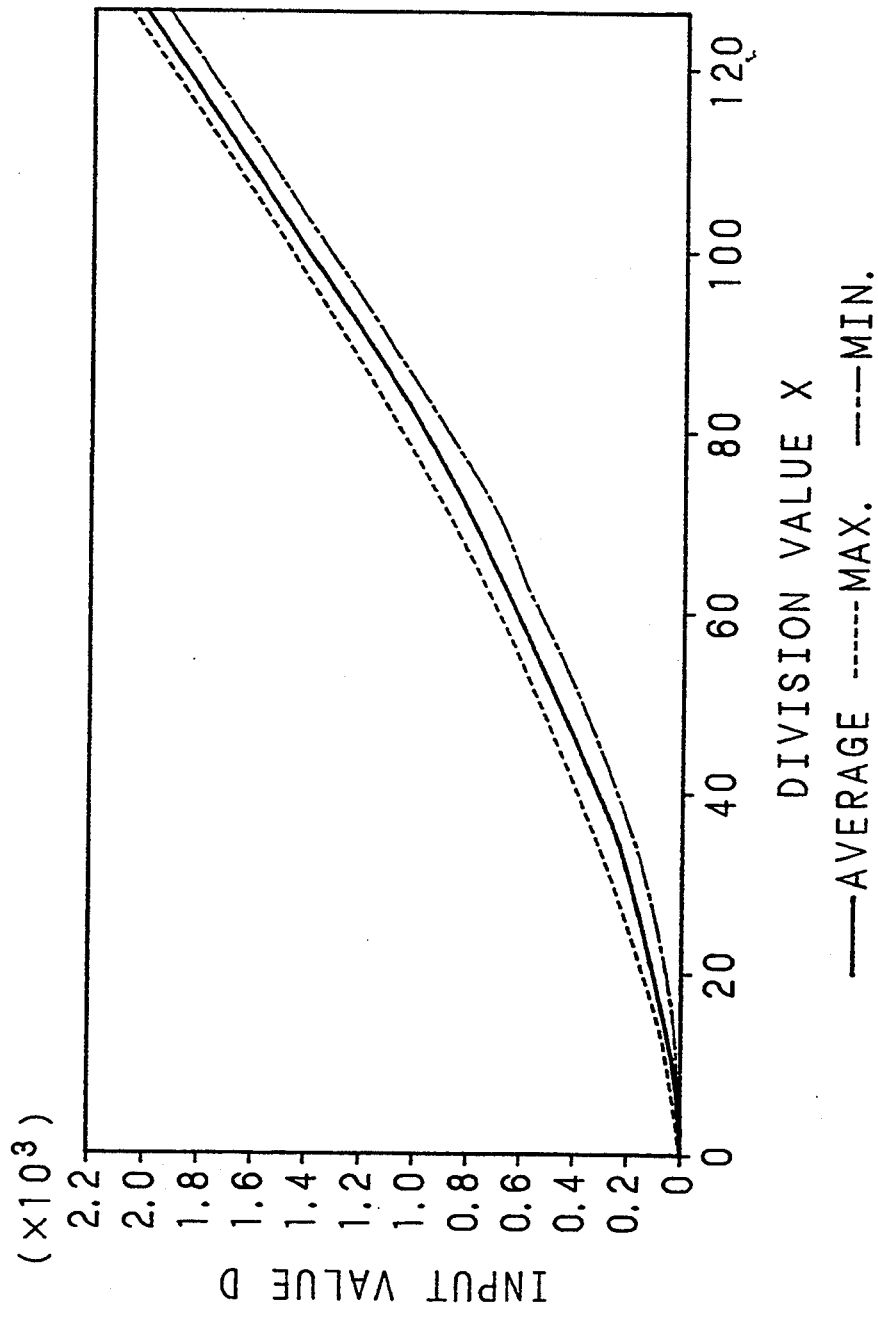
FIGS. 45(a)-(c) are graphs illustrating the inverse conversion characteristic of x value.
Figure 45B:
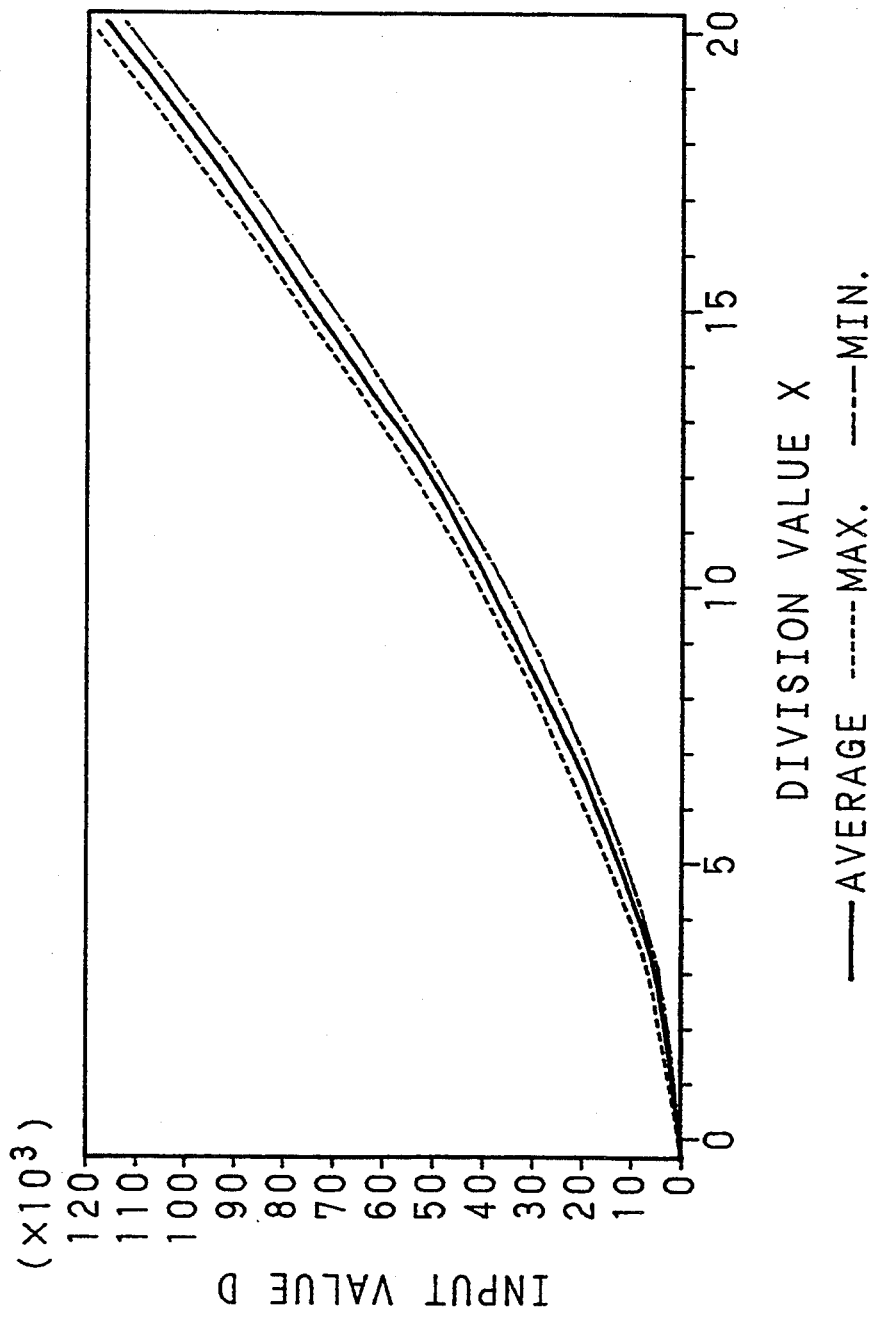
Figure 45C:
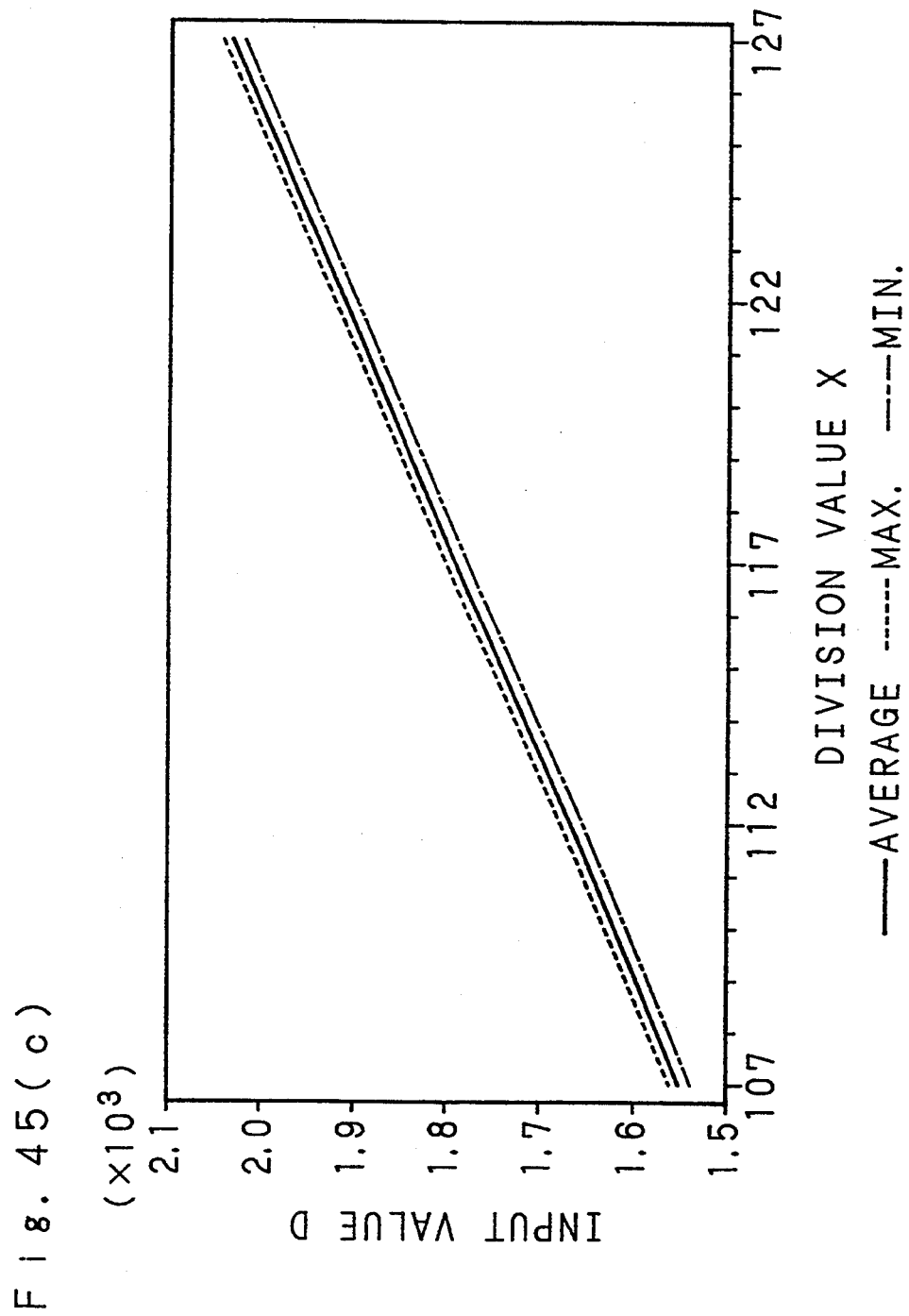
Figure 46:
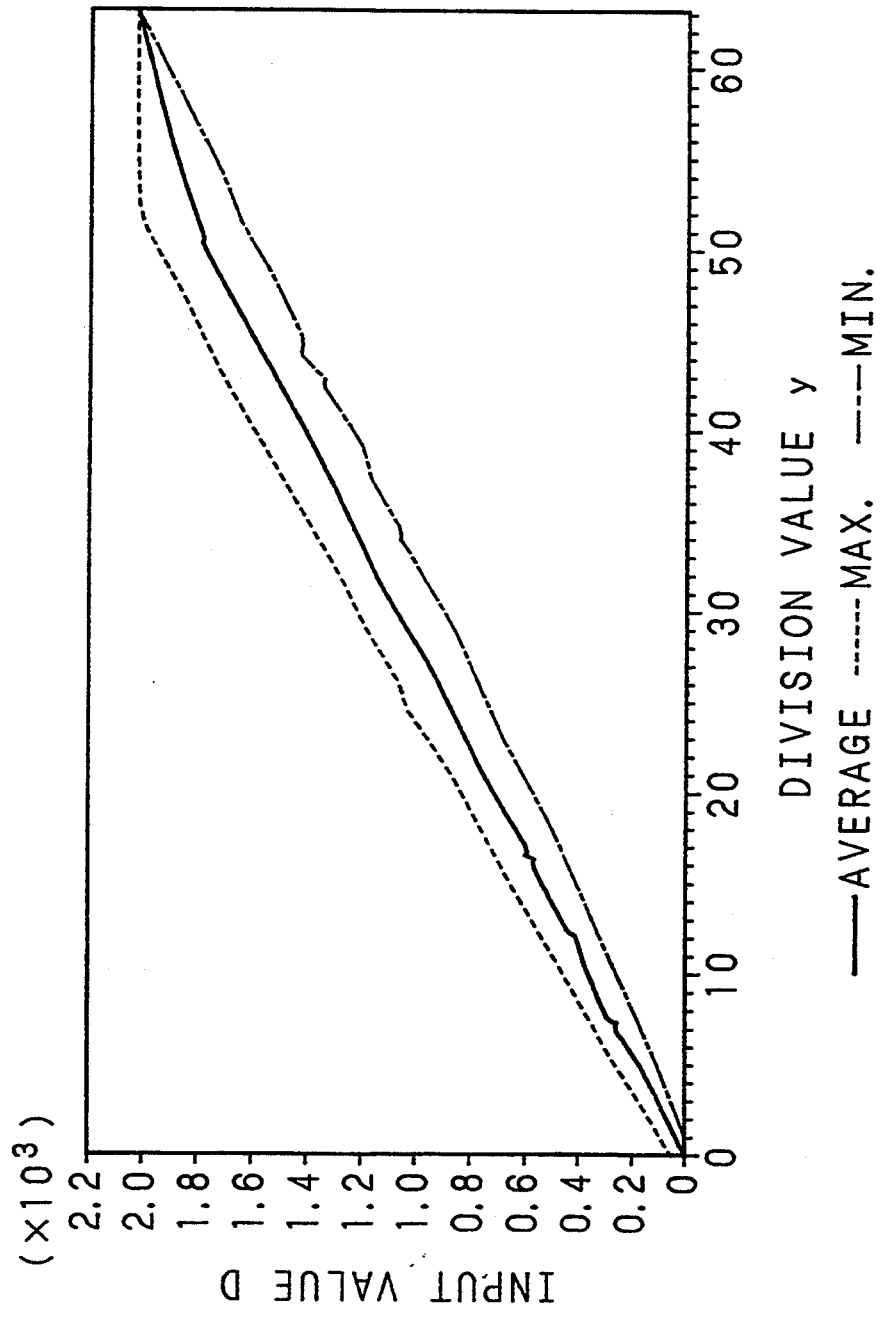
FIG. 46 is a graph illustrative of the inverse conversion characteristic of y value.
Figure 47:
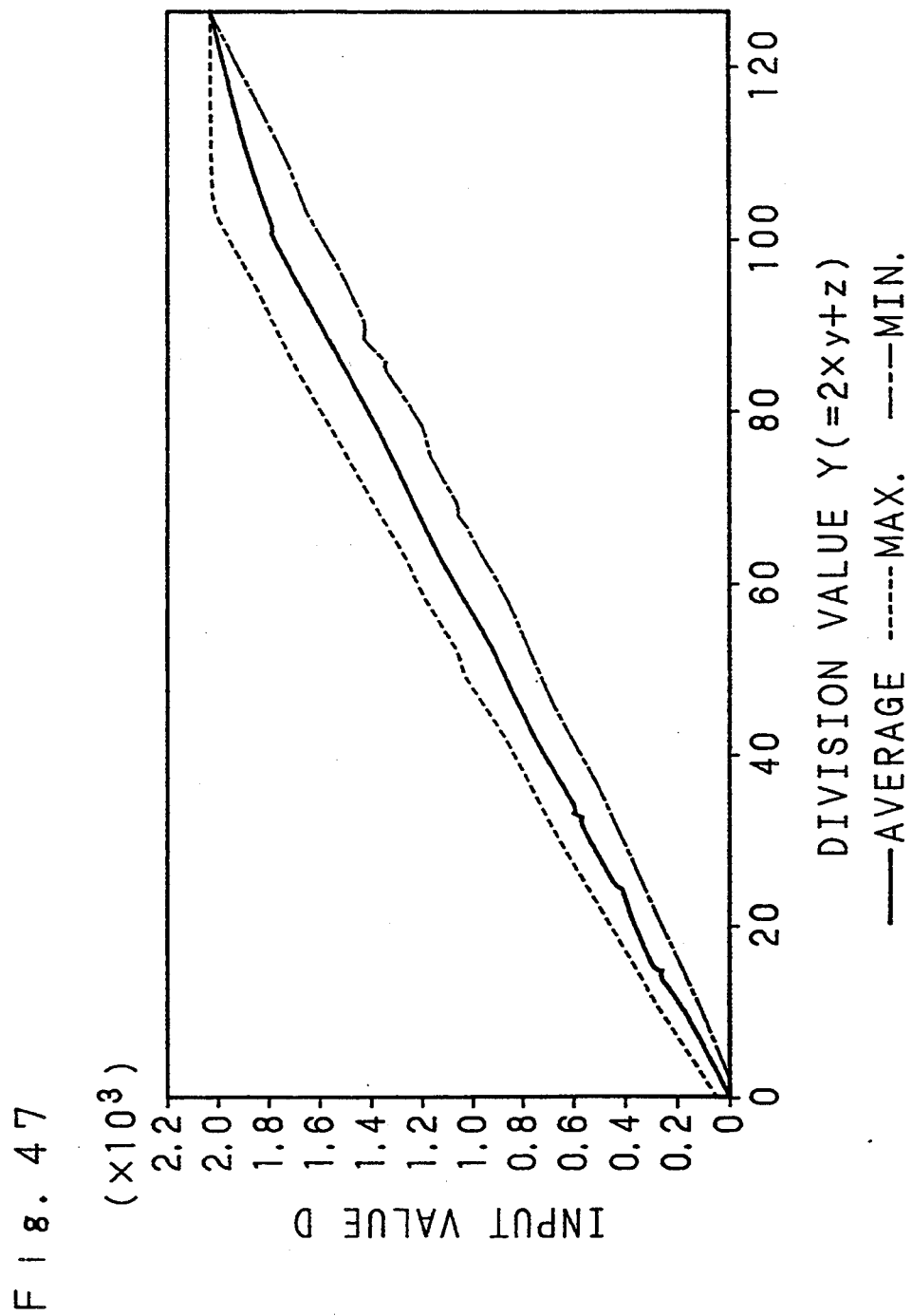
FIG. 47 is a graph illustrative of the inverse conversion characteristic of Y value.

Now an explanation will be provided on the operation of restoring the original data from one of the two divisions of data. In this embodiment, 11 bits of the original data D are divided into two parts of X and Y each consisting of 7 bits. (Division by allotting 7 bits to x, 6 bits to y, 1 bit to z, assigning x to X, y and z to Y, respectively in the division formula.) When estimating the original data D in case the data of only X is obtained, ranges of values of the original data D which can be obtained from the dividing operation are as shown in FIGS. 42(a)-(d). FIGS. 42(a)-(d) show the maximum and minimum values which D can take and the difference thereof (range), number of pieces of data D which can be taken and the average of values which D can take for a particular value of X. Similar tables are shown in FIGS. 43(a)-(b) and FIGS. 44(a)-(d) for a case wherein D is estimated from only y portion (namely 6 bits) of Y and for a case wherein D is estimated for Y (namely 7 bits). Tables shown in these drawings are represented in graphs in FIGS. 45(a) through 47. FIG. 45(a) shows the overall graph, and FIG. 45(b), (c) show partial enlargement of the graphs.

It will be understood from the above drawings that estimation with higher accuracy can be made by estimating D from the data of X than estimating from Y. Consequently as is shown by this embodiment, reproduction with better picture quality is made possible by taking the edit point on the Y side of the track in editing operation represented by splice imaging.

Although it is possible to estimate the original data to a certain degree from Y data only, in case the location of damage caused by editing is known beforehand as described above or there is a location which has a higher probability of damage, storing Y data in the location enables better reproduction from X data even when the data is lost.

Because the reproduced signals are composed by using both or only one of the divided outputs depending on the states of the tracks when reproducing after dividing the coefficients which have been subjected to DCT and adaptive quantization into two parts and recording them on separate tracks, acceptable image quality can be obtained without significant degradation of the picture quality even when one of the tracks is destroyed during editing operation.

Embodiment 20

In embodiment 19, conversion coefficients D after DCT and adaptive quantization are converted to two output codes X and Y to satisfy the following relationship.

$$D = x^{1.5608} + 2 \times y + z$$

$$X = x$$

$$Y = 2 \times y + z$$

In addition, a similar effect as in embodiment 19 can be obtained by the following procedure. Coefficients a and b are determined to satisfy the following expression to obtain the D−X, Y conversion table in advance.

$$D = x^a + b \times y +$$

Then the contents to be written in the ROMs 70a, 70b are determined according to the conversion table and the conversion coefficients D are supplied to the ROMs 70a, 70b as the address to obtain two output codes corresponding thereto which are to be recorded.

An example of preparing a conversion table will be described below.

Assume that the following four conversion conditions are given for the conversion formula below.

$$D = x^a + b \times y +$$

(1) Number of bits assigned to x is sx.
(2) Number of bits assigned to y is sy.
(3) Number of bits assigned to z is sz.
(4) Number of bits assigned to D is sD.

Because an integer less than b is assigned to z, $b = 2^{sz}$ holds. This is also explained by the fact that it is the difference between the sum of x and y and D (namely the remainder component). Then the relation between these parameters can be tentatively expressed as follows (by having the remainder in z).

$$D = x^a + b \times y$$

And the value of a can be determined as follows:

$$2^{sD} - 1 = (2^{sx} - 1)^a + b \times (2^{sy} - 1)$$

$$\therefore a = \frac{\log\{(2^{sD} - 1) - b \times (2^{sy} - 1)\}}{\log(2^{sx} - 1)}$$

Figure 48:
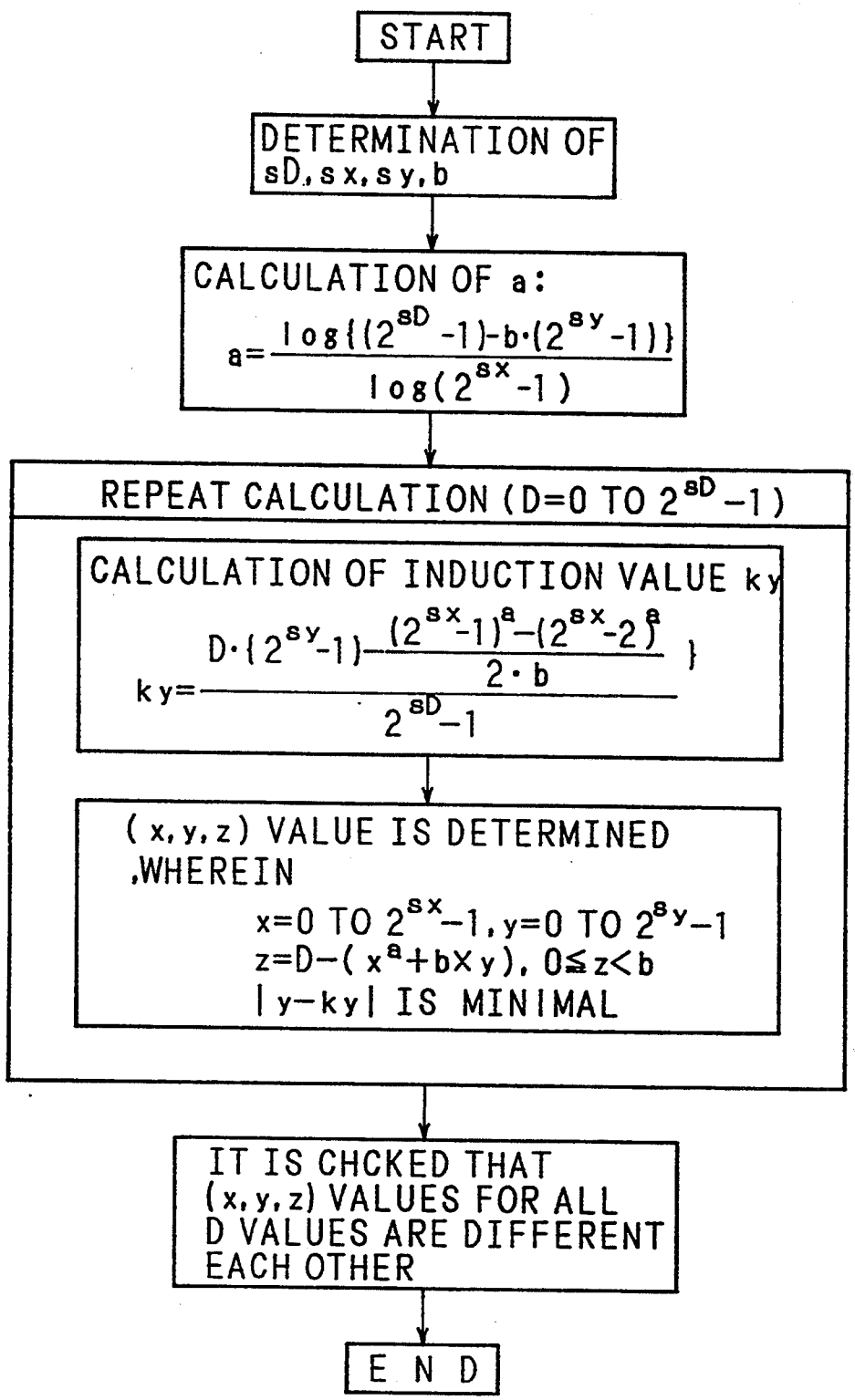
FIG. 48 is a diagram illustrative of the procedure of generating a code table.

Once the coefficients have been determined, values of x, y and z which satisfy the following equation can be obtained by determining the variables x, y and z iteratively for the input data D in the procedure shown in FIG. 48.

$$D = x^a + b \times y + z$$

By the method described above, the expression $$D = x^{1.5465} + 2 \times y + z$$

if D is divided by assuming
sx = sy = 7
sz = 1
sD = 11.

Figure 49:
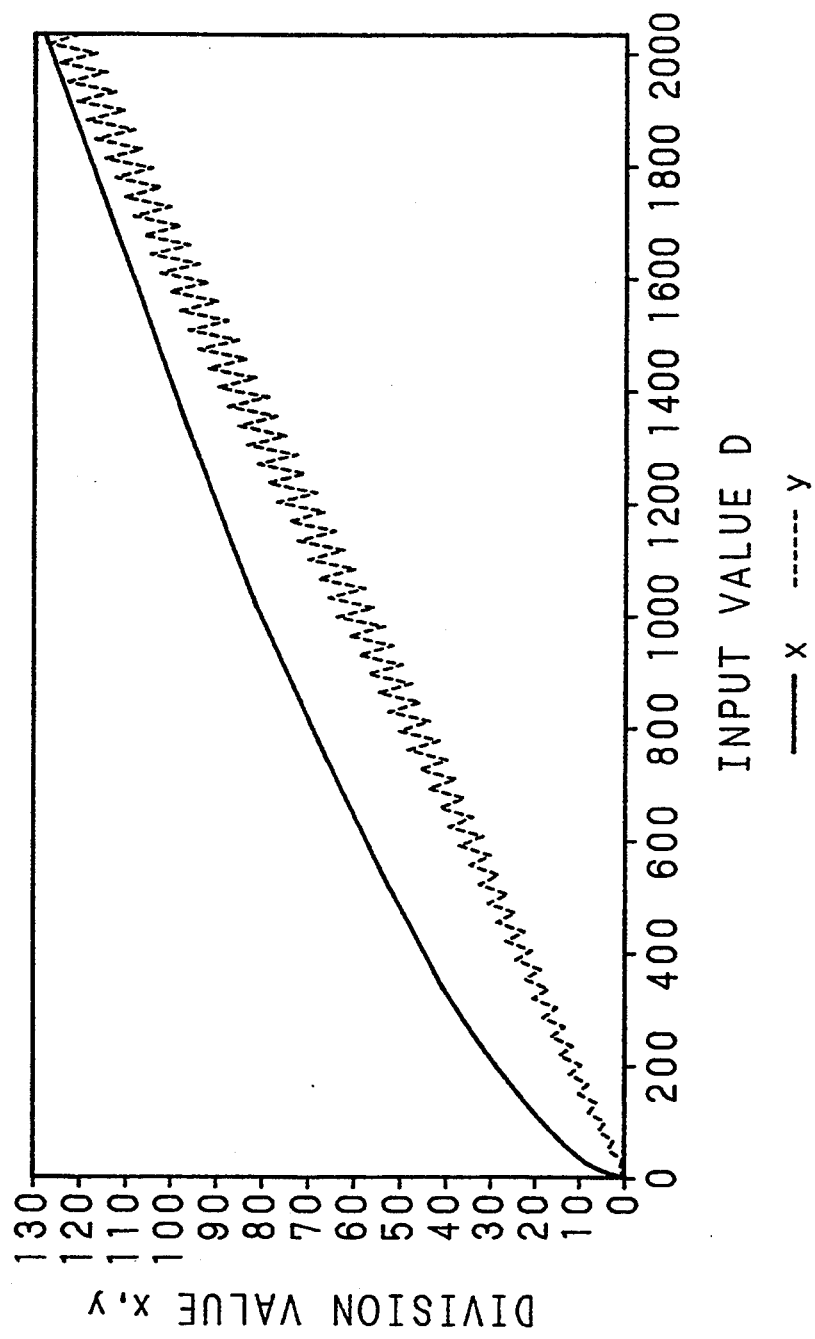
FIG. 49 is a graph illustrative of the dividing characteristic.
Figure 50:
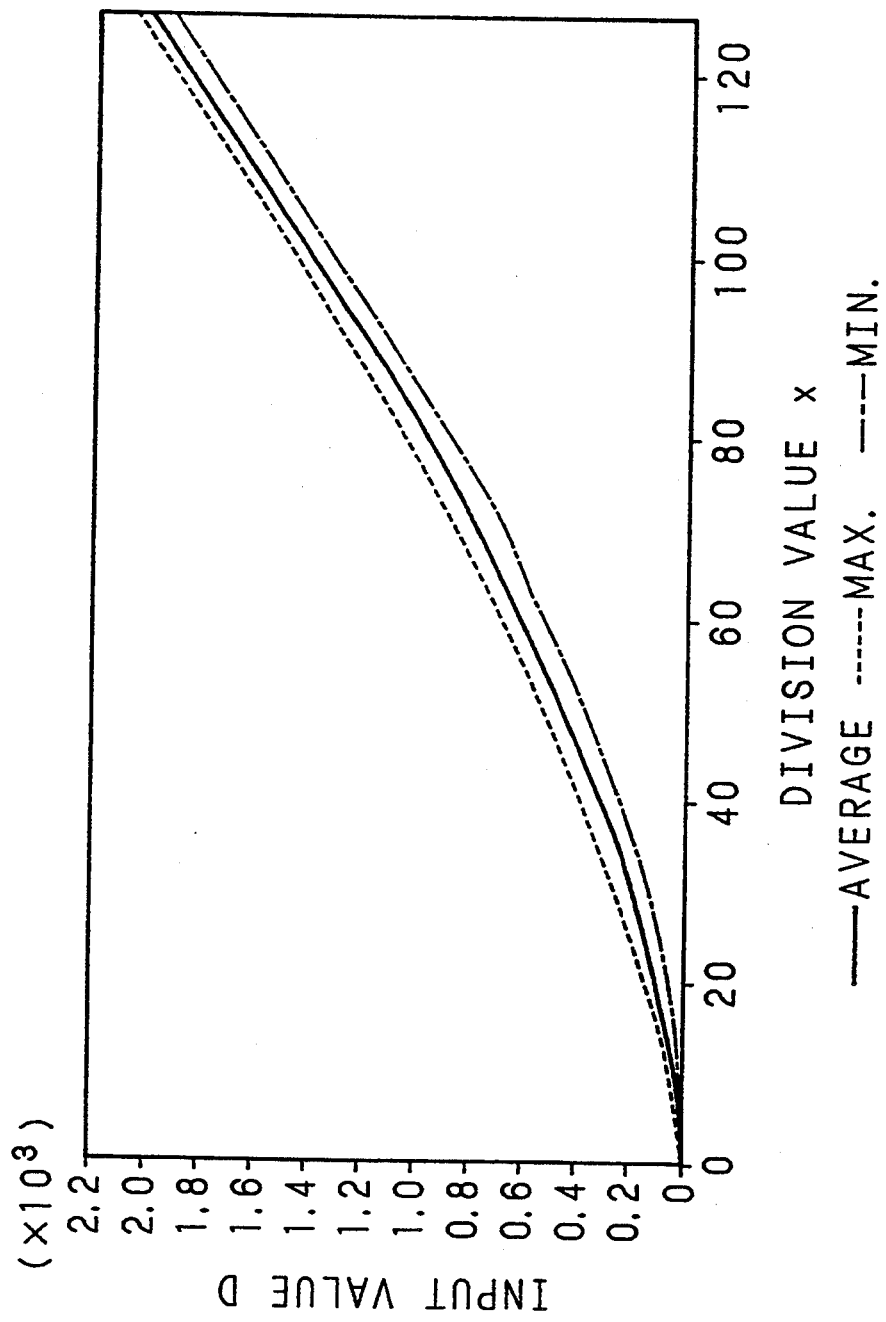
FIG. 50 is a graph illustrative of the inverse conversion characteristic of x value.
Figure 51:
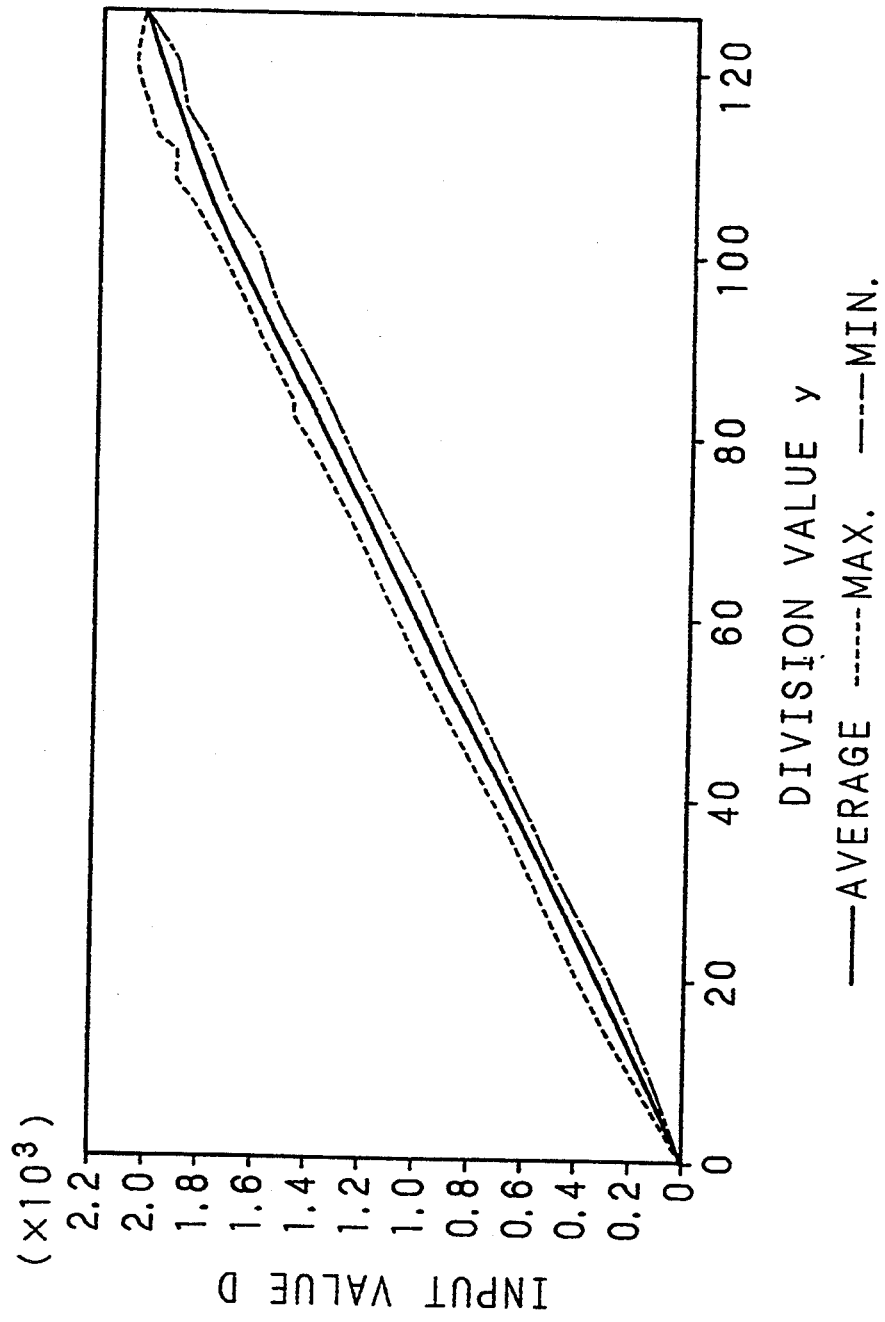
FIG. 51 is a graph illustrative of the inverse conversion characteristic of y value.

The relationship between the input D and the division data x, y in this case is shown in FIGS. 49 through 51, similar to embodiment 19. From these drawings, it will be understood that the error in the estimation of the original data D from y data only is obviously reduced due to the increase of y by one bit over that in embodiment 19, making it possible to make a more correct estimation. When the relation between the input D and the outputs X, Y is expressed as follows, $$D = x^a + b \times y + z$$

$$X = x, Y = 2y + z$$

or $$X = cx + z, Y = y$$

(a, b, c are real constants), similar effect to that in embodiment 19 is obtained.

Also the increase in the amount of data is reduced to a very low level, namely 14/11 = 127% in embodiment 19 and 15/11 = 136% in embodiment 20 in contrast to 200% in the case of duplicate writing.

The procedure is not limited to the derivation of the division formula described above, and similar effect to the embodiment 19 can be obtained with any pattern, if one input code is converted to two output codes with the following relations being satisfied between input D and the two output codes X, Y.

$$X = x, Y = b \times y + z$$

or $$X = c \times x + z, Y = y$$

(a, b, c, are real constants) for $$D = x^a + b \times y + z$$

Embodiment 21

Although a code table is used to obtain output codes X, Y from the input code D in embodiment 19, Y may be obtained by preparing a conversion table which is used to obtain the output code X from the input code D in advance to obtain the output code X using this code table and calculating $Y=(D-X)/B$ to obtain Y from D and X, and the reverse procedure is also effective.

Embodiment 22

Although tracks destroyed in editing operation are detected by checking the size of the reproduced envelope or the number of errors in the embodiment 19, the accuracy of detection is improved by comparing the size of reproduced envelopes of a plurality of tracks which constitute one field and, when the reproduced envelope of only one track is significantly smaller than other tracks, providing a detection signal output.

A similar effect can also be obtained by comparing the number of errors and providing a detection signal output when many errors have occurred in a particular track.

Embodiment 23

In the embodiment 19, input code D is converted to two output codes X, Y with the following relations being satisfied between input D and the two output codes X, Y $$X=x, Y=b\times y+z$$

or $$X=c\times x+z, Y=y$$

(a, b, c are real constants) for $$D=x^a+b\times y+z$$

Besides this procedure, one can replace the divided data X or Y with the input D once again then apply the dividing operation described above again thereby to finally divide the input into three or more parts. In this case, it is easy to record the data divided into multiple parts onto three or more tracks, or to synthesize the data back into 2-part division data X and Y by performing linear addition or similar operation. In either case, a similar effect to that of embodiment 19 can be obtained by preparing a code table and using this code table to convert the input code into a plurality of output codes.

Embodiment 24

Although previous embodiments assume that the division is applied to the entire input data, a dividing operation described above may be applied to only the portion of the input data which has particular influence on the basic picture quality and recording the data on the recording medium at a plurality of locations. In this case, increase of the amount of data due to the dividing operation is 6.8% as shown below, assuming that the dividing procedure of embodiment 19 is employed and only one quarter of the input data is divided and recorded. Thus redundancy can be further reduced by such a partial division, compared to the case where all data is divided.

In the case of digital VTR, because DCT, adaptive quantization and other operations are applied beforehand, the amount of information which contributes to the picture quality is not necessarily uniform and the data can be classified into a part related to the basic picture quality (low-frequency coefficients of DCT), a part related to the fine picture quality (high-frequency coefficients of DOT) and so on, the partial division described above can be easily applied to the part of data which contributes to the basic picture quality. Constitution of the partial division in the embodiment is shown in FIG. 52.

Figure 52:
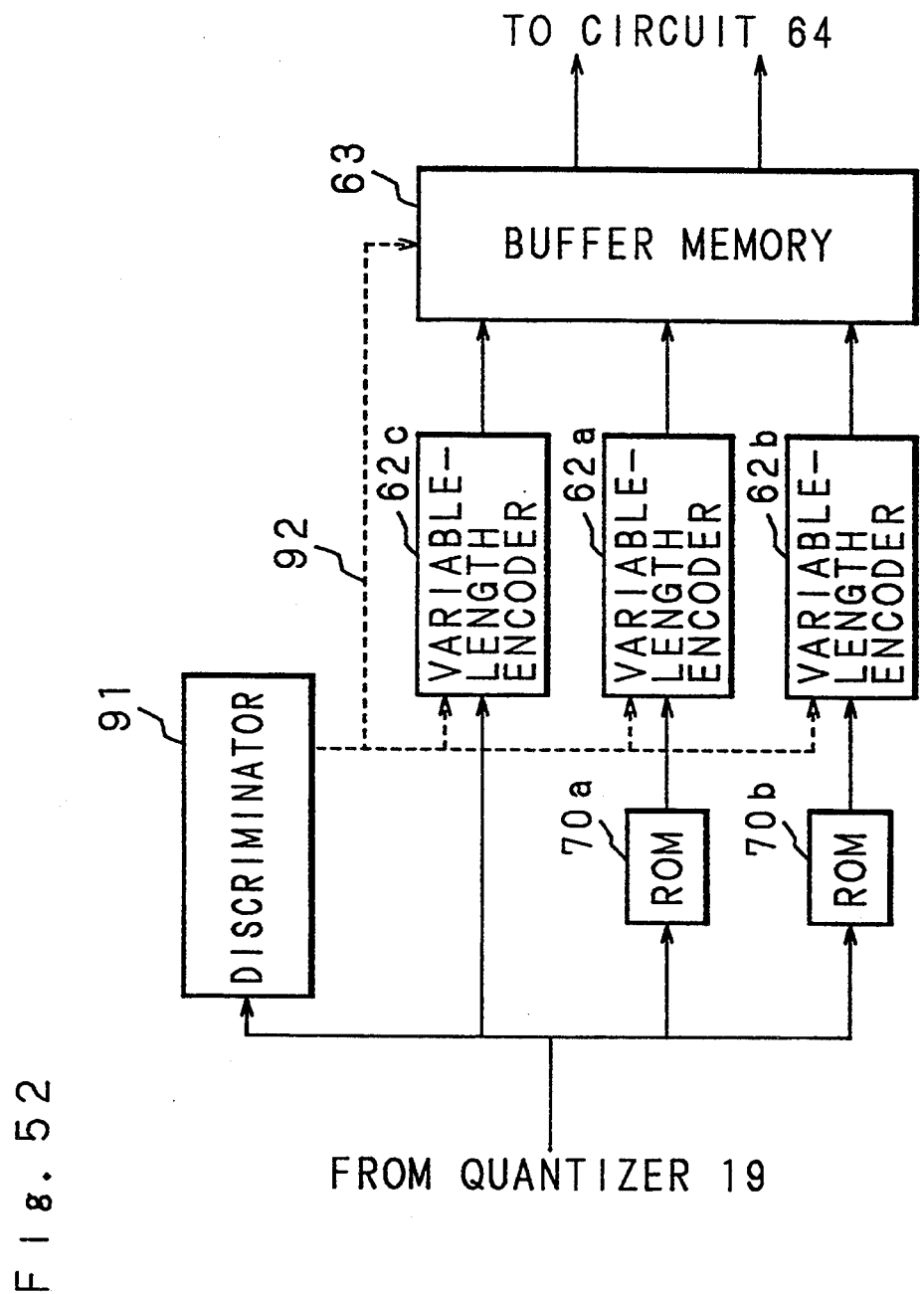
FIG. 52 is a block diagram of further another high-efficiency encoding circuit of the invention.

FIG. 52 shows a part of the high-efficiency encoder 30. What is different from FIG. 18 and FIG. 20 is that a direct output terminal for the input is added and a discriminator 91 is installed to select whether the 2-division data output is to be enabled or the direct output of the input data is to be enabled. Accordingly, a variable-length encoder 62c for direct output and input terminals for the buffer memory 63 are added. A command from the discriminator 91 is sent to the variable-length encoders 62a, 62b, 62c and the buffer memory 63 via the output line 92. The discriminator 92, for example, counts the number of input data and, depending on the order of entering the input data, selects the data which determines the basic picture quality (checks the relation m, n<3 for F(m,n) in the DCT coefficients mentioned previously) or other data, and directs the variable-length encoders, buffer memory, etc. that follow, via the output line 92, as to which of the divided data and the direct data should be processed. Thus it is made possible to divide and record only such data among the input data that determines the basic picture quality.

With this operation, there will not occur such a trouble as a significant portion of the images cannot be obtained even when the data is partially lost due to damage on the recording medium or the like. Because images can be obtained by restoring them from one of the divided basic picture quality data, visually natural restoration of impaired data can be easily achieved with minimum redundancy of information.

Although the discriminator 91 in this embodiment makes a decision by counting the input data, it is obvious that a similar effect can be obtained by providing the DCT circuit 18 or the adaptive quantizer 19 with this function to have the discrimination output directly.

Although DCT is employed for bandwidth compression (high-efficiency encoding) in the above embodiments, the spirit of the invention is not limited to this method and orthogonal transforms (one dimensional or three dimensional) represented by the DCT, predictive encoding, dynamic correction, conversion coefficients such as KL conversion, or a combination of these transforms may be applied to the data which has been subjected to bandwidth compression with similar effect.

Although the above embodiments are described for particular applications to digital VTRs which employ 2-channel recording system, the invention has similar effects when applied to VTRs which employ 1-channel recording system, multi-channel recording system, multi-segment recording system, multi-channel and multi-segment recording system, etc.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An encoder, comprising:
   converting means for dividing input digital data D into n output codes $X_0, X_1, \ldots, X_{n-1} X_{n-1}$ (where n is an integer not less than 2) so that $D = K_0 X_0 + K_1 X_1 + \ldots + K_{n-1}$ (where $K_0, K_1, \ldots K_{n-1}$ are real numbers) and said input digital data D being determined uniquely from said output codes $X_0, X_1, \ldots, X_{n-1}$; and
   data generating means for synthesizing said output codes $X_0, X_1, \ldots, X_{n-1}$ into at least two data channels.

2. The encoder of claim 1, wherein said converting means divides said input digital data D into two output codes X and Y.

3. The encoder of claim 2, wherein said converting means divides said input digital data D into said two output codes X and Y so that $D = 2X + Y$ or $D = 3X + Y$.

4. The encoder of claim 1, wherein said converting means includes a memory corresponding to each of said output codes $X_0, \ldots, X_{n-1}$, each memory storing a look-up table for reading and outputting said corresponding one of said output codes $X_0, \ldots, X_{n-1}$ based on said digital data D.

5. The encoder of claim 1 further comprising:
   combining means for receiving digitized video signals and for generating a combination signal by combining said digitized video signals;
   transforming means for transforming said combination signal to produce said input digital data D; and wherein
   said data generating means includes channel synthesizing means for synthesizing said output codes $X_0, \ldots, X_{n-1}$ into said two data channels and variable length encoding means for variable length encoding said two data channels.

6. The encoder of claim 1, wherein
   said converting means divides said input digital data D which includes basic picture quality information and fine picture quality information; and further comprising,
   a discriminator determining whether said input digital data D includes basic picture quality information or fine picture quality information, and for causing said data generating means to generate said two data channels based on said output codes $X_0, \ldots, X_{n-1}$ when said input digital data D includes said basic picture quality information and to generate said two data channels based on said input digital data D when said input digital data represent fine picture quality information.

7. An encoder, comprising:
   converting means for dividing input digital data D into n output codes $X_0, X_1, \ldots, X_{n-1}$ (where n is an integer not less than 2) so that said input digital data D is divided into a plurality of groups, each group containing not more than t pieces of different input digital data (where t is an integer) so that each piece of digital data in said plurality of groups is uniquely represented by a combination of output codes $X_0$ having $m_0$ different values, output codes $X_1$ having $m_1$ different values, $\ldots$, and output codes $X_{n-1}$ having $m_{n-1}$ different values (where $m_0, m_1, \ldots, m_{n-1}$ are integers and $m_0 \times m_1 \times \ldots \times m_{n-1} \geq n$), and a combination of said output codes $X_0, X_1, \ldots, X_{n-1}$ represents digital data in one of said plurality of groups does not represent digital data in another of said plurality of groups; and
   data generating means for synthesizing said output codes $X_0, X_1, \ldots, X_{n-1}$ into at least two data channels.

8. The encoder of claim 7, wherein
   said converting means divides
   said input digital data D into said plurality of groups, each including not greater than four different input digital data, so that an output code X having two different values and an output code Y having two different values exist, wherein each digital data in each of said plurality of groups is expressed uniquely by a combination of the output codes X and Y, and a combination of said output codes X and Y which represents digital data in said one of said plurality of groups does not represent digital data in said another of said plurality of groups.

9. The encoder of claim 7, wherein said converting means includes a memory corresponding to each of said output codes $X_0, \ldots, X_{n-1}$, each memory storing a look-up table for reading and outputting said corresponding one of said output codes $X_0, \ldots, X_{n-1}$ based on said digital data D.

10. The encoder of claim 7 further comprising:
    combining means for receiving digitized video signals and for generating a combination signal by combining said digitized video signals;
    transforming means for transforming said combination signal to produce said input digital data D; and wherein
    said data generating means includes channel synthesizing means for synthesizing said output codes $X_0, \ldots, X_{n-1}$ into said two data channels and variable length encoding means for variable length encoding said two data channels.

11. The encoder of claim 7, wherein
    said converting means divides said input digital data D which includes basic picture quality information and fine picture quality information; and further comprising,
    a discriminator determining whether said input digital data D includes basic picture quality information or fine picture quality information, and for causing said data generating means to generate said two data channels based on said output codes $X_0, \ldots, X_{n-1}$ when said input digital data D includes said basic picture quality information and to generate said two data channels based on said input digital data D when said input digital data represent fine picture quality information.

12. A data-division encoding circuit, comprising:
    encoding means for performing a specified modular arithmetic on input digital data X to divide said input digital data X into two main codes Y1 and Y2 and a subcode Z; and
    division means for dividing each of said main codes Y1 and Y2 and said subcode Z into at least first and second parts.

13. The circuit of claim 12, wherein said encoding means generates said two main codes Y1 and Y2 and a subcode Z from said input digital signal X, where $Y1 = INT(X/2^n)$ $Y2 = INT(X/2^{n-1}) - INT(X/2^n)$ $$Z = X \bmod 2^{n-1}$$

and where INT generates a quotient, mod generates a remainder, and n is a integer.

14. The circuit of claim 12, wherein said encoding means generates said two main codes Y1 and Y2 and a subcode Z from said input digital signal X, where $$Y1 = Y2 = \text{INT}(X/2^n)$$

$$Z = X \bmod 2^n$$

and where INT generates a quotient, mod generates a remainder, and n is a integer.

15. The circuit of claim 12, wherein said encoding means includes at least one latch and an adder.

16. An encoder, comprising:
combining means for receiving digitized video signals and for generating a combination signal by combining said digitized video signals;
transforming means for transforming said combination signal to produce input digital data X;
data-division means for performing a specified modular arithmetic on input digital data X to divide said input digital data X into two main codes Y1 and Y2 and a subcode Z, and for dividing each of said main codes Y1 and Y2 and said subcode Z into at least first and second parts; and
data generating means for generating a first data channel by mixing said first parts of said main codes Y1 and Y2 and said subcode Z, and for generating a second data channel by mixing said second parts of said main codes Y1 and Y2 and said subcode Z.

17. The apparatus of claim 16, wherein said data generating means comprises:
variable length encoding means for variable length encoding said two main codes Y1 and Y2; and
mixing means for mixing said subcode Z with said output of said variable length encoding means.

18. The encoder of claim 17, wherein said combining means receives a luminance signal and at least two chrominance signals as said video signals.

19. The circuit of claim 16, wherein said encoding means generates said two main codes Y1 and Y2 and said subcode Z from said input digital signal X, where $$Y1 = \text{INT}(X/2^n)$$

$$Y2 = \text{INT}(X/2^{n-1}) - \text{INT}(X/2^n)$$

$$Z = X \bmod 2^{n-1}$$

and where INT generates a quotient, mod generates a remainder, and n is a integer.

20. The circuit of claim 16, wherein said encoding means generates said two main codes Y1 and Y2 and said subcode Z from said input digital signal X, where $$Y1 = Y2 = \text{INT}(X/2^n)$$

$$Z = X \bmod 2^n$$

and where INT generates a quotient, mod generates a remainder, and n is a integer.

21. The apparatus of claim 16, wherein said encoding means includes at least one latch and an adder.

22. An encoder, comprising:
data-division encoding circuit performing a specified modular arithmetic on an input digital data X to generate two main codes Y1 and Y2 and a subcode Z; and
a data generating circuit for generating first and second channel data based on said two main codes Y1 and Y2 and said subcode Z.

23. A recording system, comprising:
analog-to-digital converters converting video signals to produce digitized video signals;
an encoder processing said digitized video signals to produce an input digital signal X, performing a specified modular arithmetic on said input digital data X to generate two main codes Y1 and Y2 and a subcode Z, and dividing said two main codes Y1 and Y2 and subcode Z into first and second data channels; and
output processing means for processing and recording said first and second data channels on a recording medium.

24. The system of claim 23, wherein said encoder generates said two main codes Y1 and Y2 and said subcode Z from said input digital signal X, where $$Y1 = \text{INT}(X/2^n)$$

$$Y2 = \text{INT}(X/2^{n-1}) - \text{INT}(X/2^n)$$

$$Z = X \bmod 2^{n-1}$$

and where INT generates a quotient, mod generates a remainder, and n is a integer.

25. The circuit of claim 23, wherein said encoder generates said two main codes Y1 and Y2 and said subcode Z from said input digital signal X, where $$Y1 = Y2 = \text{INT}(X/2^n)$$

$$Z = X \bmod 2^n$$

and where INT generates a quotient, mod generates a remainder, and n is a integer.

26. A reproducing system, comprising:
input processing means for inputting and processing at least two main codes Y1 and Y2 and a subcode Z;
decoding means for decoding the at least two main codes Y1 and Y2 and the subcode Z into digital data X according to one of the following expressions based on a control signal, $$X = 2n\text{-}1 * (Y1 = Y2) + Z,$$

$$X = 2n * Y1,$$

and $$X = 2n * Y2$$

where n is an integer; and
output processing means for processing said digital data X.

27. The system of claim 26, wherein
said input processing means detects errors in said two main codes and produces a control signal based on a result of said detection; and
said decoding means restores said digital data X according to $$X = 2n * Y2$$

if an error is detected in main code Y1, according to $$X = 2n * Y1$$

if error is detected in main code Y2, and according to $$X = 2n-1 * (Y1 + Y2) + Z$$

if no error is detected in said two main codes Y1 and Y2.

28. The reproducing system of claim 26, wherein said output processing means produces a luminance signal and at least two chrominance signals from said digital data X, and said input processing means retrieves, amplifies, modulates and error corrects said two main codes Y1 and Y2 and said subcode Z.

29. A dividing circuit, comprising:
n memories, each memory corresponding to one of a plurality of output codes $X_0, \ldots, X_{n-1}$, each memory storing a look-up table for addressing said corresponding one of said output codes $X_0, \ldots, X_{n-1}$ based on received input digital data D, where $D = K_0 X_0 + K_1 X_1 + \ldots + K_{n-1} X_{n-1}$ (where $K_0, \ldots, K_{n-1}$ are real numbers), and said input digital data D being determined uniquely from said output codes $X_0, \ldots, X_{n-1}$.

30. A recording system, comprising:
analog-to-digital converters converting video signals to produce digitized video signals;
an encoder processing said digitized video signals to produce an input digital signal D, dividing input digital data D into n output codes $X_0, X_1, \ldots, X_{n-1}$ (where n is an integer not less than 2) so that $D = K_0 X_0 + K_1 X_1 + \ldots + K_n \cdot X_n$ (where $K_0, K_1, \ldots K_{n-1}$ are real numbers), said input digital data D being determined uniquely from said output codes $X_0, X_1, \ldots, X_{n-1}$, and synthesizing said output codes $X_0, X_1, \ldots, X_{n-1}$ into at least two data channels; and
output processing means for processing and recording said two data channels on a recording medium.

31. A reproducing system, comprising:
input processing means for inputting and processing at least two data channels;
channel dividing means for dividing said two data channels into n output codes $X_0, \ldots, X_{n-1}$;
decoding means restoring digital data D where $D = K_0 X_0 + K_1 X_1 + \ldots + K_{n-1} X_{n-1}$ (where $K_0, \ldots, K_{n-1}$ are real numbers); and
output processing means for processing said digital data X.

32. The system of claim 31, wherein
said channel dividing means detects errors in said output codes $X_0, \ldots, X_{n-1}$; and
said decoding means includes a memory, said memory includes a look-up table containing values of said digital data D corresponding to individual values of said output codes $X_0, \ldots, X_{n-1}$, and said decoding means restores said digital data D by reading said digital data D from said memory based on one of said output codes $X_0, \ldots, X_{n-1}$ when said channel dividing means detects an error in another one of said output codes $X_0, \ldots, X_{n-1}$.

33. The reproducing system of claim 31, wherein said output processing means produces a luminance signal and at least two chrominance signals from said digital data D, and said input processing means retrieves, amplifies, modulates and error corrects said two data channels.

34. A recording system, comprising:
analog-to-digital converters converting video signals to produce digitized video signals;
an encoder processing said digitized video signals to produce an input digital signal D, dividing input digital data D into n output codes $X_0, X_1, \ldots, X_{n-1}$ (where n is an integer not less than 2) so that said input digital data D is divided into a plurality of groups, each group containing not more than t pieces of different input digital data (where t is an integer) so that each piece of digital data in said plurality of groups is uniquely represented by a combination of output codes $X_0$ having $m_0$ different values, output codes $X_1$ having $m_1$ different values, $\ldots$, and output codes $X_{n-1}$ having $m_{n-1}$ different values (where $m_0, m_1, \ldots, m_{n-1}$ are integers and $m_0 \times m_1 \times \ldots \times m_{n-1} \geq n$), a combination of said output codes $X_0, X_1, \ldots, X_{n-1}$ represents digital data in one of said plurality of groups does not represent digital data in another of said plurality of groups, and synthesizing said output codes $X_0, X_1, \ldots, X_{n-1}$ into at least two data channels; and
output processing means for processing and recording said two data channels on a recording medium.

35. An encoder, comprising:
encoding means for encoding digital data D into codes X and Y, where $$D = x^a + by + z,$$

$$X = x,$$

and $$Y = by + z$$

where a and b are real constants; and
data generating means for generating two data channels based on said codes X and Y.

36. The encoder of claim 35, wherein said encoding means comprises:
a first memory corresponding to said code X and storing a look-up table, said first memory reading and outputting said code X based on said digital data D; and
a second memory corresponding to said code Y and storing a look-up table, said second memory reading and outputting said code Y based on said digital data D.

37. The encoder of claim 35, further comprising:
combining means for receiving digitized video signals and for generating a combination signal by combining said digitized video signals;
transforming means for transforming said combination signal to produce said digital data D; and wherein
said data generating means includes variable length encoding means for variable length encoding said two data channels.

38. The encoder of claim 35, wherein
said encoding means divides said digital data D which includes basic picture quality information and fine picture quality information; and further comprising,
a discriminator determining whether said digital data D includes basic picture quality information or fine picture quality information, and for causing said data generating means to generate said two data channels based on said output codes $X_0, \ldots, X_{n-1}$ when said digital data D includes said basic picture quality information and to generate said two data channels based on said digital data D when said digital data represent fine picture quality information.

39. A recording system, comprising:

analog-to-digital converters converting video signals to produce digitized video signals;

an encoder processing said digitized video signals to produce a digital signal D, and encoding said digital data D into codes X and Y, where $$D = x^a + by + z,$$

$$X = x,$$

and $$Y = by + z$$

where a and b are real constants;

output processing means for processing said codes x and Y to produce two data channels and for recording said two data channels on a recording medium.

40. An encoder, comprising:

encoding means for encoding digital data D into codes X and Y, where $$D = x^a + by + z,$$

$$X = cx + z,$$

and $$Y = y$$

where a, b and c are real constants; and data generating means for generating two data channels based on said codes X and Y.

41. The encoder of claim 40, wherein said encoding means comprises:

a first memory corresponding to said code X and storing a look-up table, said first memory reading and outputting said code X based on said digital data D; and a second memory corresponding to said code Y and storing a look-up table, said second memory reading and outputting said code Y based on said digital data D.

42. The encoder of claim 40, further comprising:

combining means for receiving digitized video signals and for generating a combination signal by combining said digitized video signals;

transforming means for transforming said combination signal to produce said digital data D; and wherein said data generating means includes variable length encoding means for variable length encoding said two data channels.

43. The encoder of claim 40, wherein said encoding means divides said digital data D which includes basic picture quality information and fine picture quality information; and further comprising, a discriminator determining whether said digital data D includes basic picture quality information or fine picture quality information, and for causing said data generating means to generate said two data channels based on said output codes $X_0, \ldots, X_{n-1}$ when said digital data D includes said basic picture quality information and to generate said two data channels based on said digital D data when said digital data represent fine picture quality information.

44. A recording system, comprising:

analog-to-digital converters converting video signals to produce digitized video signals;

an encoder processing said digitized video signals to produce a digital signal D, and encoding digital data D into codes X and Y, where $$D = x^a + by + z,$$

$$X = cx + z,$$

and $$Y = y$$

where a, b and c are real constants;

output processing means for processing said codes x and Y to produce two data channels and for recording said two data channels on a recording medium.

45. A method of data-division encoding, comprising the steps of:

(a) latching input digital data;

(b) latching a predetermined number of the highest order bits latched in step (a) to generate a first main code Y1;

(c) adding said predetermined number of highest order bits and the next bit of highest order to generate a second main code Y2; and (d) latching bits not latched in step (b) to generate a subcode Z.

46. The method of claim 45, further comprising the step of:

(e) dividing each of said first main code Y1, second main code Y2 and said subcode Z into at least first and second parts.

47. A method of data-division encoding, comprising the steps of:

(a) latching input digital data;

(b) latching a preterned number of highest order bits latched in step (a) to generate two main codes Y1 and Y2; and (c) latching bits not latched in step (b) to generate a subcode Z.

48. The method of claim 47, further comprising the step of:

(d) dividing each of said two main codes Y1 and Y2 and said subcode Z into at least first and second parts.

49. A method of decoding data-division encoded digital data, comprising the steps of:

(a) separately latching a first main code Y1, second main code Y2, and a subcode Z with a first, second, and third latch, respectively;

(b) selecting, with a first selector connected to said first and second latch, one of said first main code Y1 and second main code Y2 based on a control signal;

(d) adding, in and adder connected to said first and second latch, said first main code Y1 and said second main code Y2;

(f) selecting, with a second selector connected to said first selector and said adder, output of one of said steps (c) and (d) based on said control signal;

(g) selecting, with a third selector connected to said third latch, one of said subcode Z and a zero value based on said control signal; and (h) latching, with a fourth latch connected to said second and third selectors, output of said step (f) as the high order bits of said digital signal and output of said step (g) as the low order bits of said digital signal.

50. A method of encoding, comprising the steps of:

(a) dividing input digital data D into n output codes $X_0, X_1, \ldots, X_{n-1}$ (where n is an integer not less than 2) so that $D = K_0 X_0 + K_1 X_1 + \ldots + K_{n-1} X_{n-1}$ (where $K_0, K_1, \ldots K_{n-1}$ are real numbers) and said input digital data D being determined uniquely from said output codes $X_0, X_1, \ldots, X_{n-1}$; and (b) synthesizing said output codes $X_0, X_1, \ldots, X_{n-1}$ into at least two data channels.

51. The method of claim 50, wherein said step (a) divides said input digital data D into said two output codes X and Y so that $D = 2X + Y$ or $D = 3X + Y$.

52. The method of claim 50, wherein said step (a) includes the step of (a1) reading said output codes $X_0, \ldots, X_{n-1}$ from a plurality of memories based on said digital data D, each memory corresponding to one of said output codes $X_0, \ldots, X_{n-1}$ and storing a look-up table for reading and outputting said corresponding one of said output codes $X_0, \ldots, X_{n-1}$ based on said digital data D.

53. The method of claim 50, further comprising the steps of:

(c) receiving digitized video signals;

(d) generating a combination signal by combining said digitized video signals;

(e) transforming said combination signal to produce said input digital data D; and wherein said step (b) includes the steps of (b1) synthesizing said output codes $X_0, \ldots, X_{n-1}$ into said two data channels, and (b2) variable length encoding said two data channels.

54. The method of claim 50, wherein said step (a) divides said input digital data D which includes basic picture quality information and fine picture quality information; and further comprising the step of, (c) determining whether said input digital data D includes basic picture quality information or fine picture quality information, and wherein said step (b) generates said two data channels based on said output codes $X_0, \ldots, X_{n-1}$ when said input digital data D includes said basic picture quality information and generates said two data channels based on said input digital data D when said input digital data represent fine picture quality information.

55. A method of reproducing, comprising the steps of:

(a) inputting and processing at least two data channels;

(b) dividing said two data channels into n output codes $X_0, \ldots, X_{n-1}$;

(c) restoring digital data D where $D = K_0 X_0 + K_1 X_1 + \ldots + K_{n-1} X_{n-1}$ (where $K_0, \ldots, K_{n-1}$ are real numbers); and (d) processing said digital data X.

56. A method of encoding comprising the steps of:

(a) dividing input digital data D into n output codes $X_0, X_1, \ldots, X_{n-1}$ (where n is an integer not less than 2) so that said input digital data D is divided into a plurality of groups, each group containing not more than t pieces of different input digital data (where t is an integer) so that each piece of digital data in said plurality of groups is uniquely represented by a combination of output codes $X_0$ having $m_0$ different values, output codes $X_1$ having $m_1$ different values, ..., and output codes $X_{n-1}$ having $m_{n-1}$ different values (where $m_0, m_1, \ldots, m_{n-1}$ are integers and $m_0 \times m_1 \times \ldots \times m_{n-1} \leq n$), and a combination of said output codes $X_0, X_1, \ldots, X_{n-1}$ represents digital data in one of said plurality of groups does not represent digital data in another of said plurality of groups; and (b) synthesizing said output codes into at $X_0, X_1, \ldots, X_{n-1}$ into at least two data channels.

57. The method of claim 56, wherein said step (a) divides said input digital data D into said plurality of groups, each including not greater than four different input digital data, so that an output code X having two different values and an output code Y having two different values exist, wherein each digital data in each of said plurality of groups is expressed uniquely by a combination of the output codes X and Y, and a combination of said output codes X and Y which represents digital data in said one of said plurality of groups does not represent digital data in said another of said plurality of groups.

58. The method of claim 56, wherein said step (a) includes the step of (a1) reading said output codes $X_0, \ldots, X_{n-1}$ from a plurality of memories based on said digital data D, each memory corresponding to one of said output codes $X_0, \ldots, X_{n-1}$ and storing a look-up table for reading and outputting said corresponding one of said output codes $X_0, \ldots, X_{n-1}$ based on said digital data D.

59. The method of claim 56, further comprising the steps of:

(c) receiving digitized video signals;

(d) generating a combination signal by combining said digitized video signals;

(e) transforming said combination signal to produce said input digital data D; and wherein said step (b) includes the steps of (b1) synthesizing said output codes $X_0, \ldots, X_{n-1}$ into said two data channels, and (b2) variable length encoding said two data channels.

60. The method of claim 56, wherein said step (a) divides said input digital data D which includes basic picture quality information and fine picture quality information; and further comprising the step of, (c) determining whether said input digital data D includes basic picture quality information or fine picture quality information, and wherein said step (b) generates said two data channels based on said output codes $X_0, \ldots, X_{n-1}$ when said input digital data D includes said basic picture quality information and generates said two data channels based on said input digital data D when said input digital data represent fine picture quality information.

61. A method of encoding, comprising the steps of:

(a) encoding digital data D into codes X and Y, where $$D = x^a + by + z,$$

$$X = x,$$

and $$Y = by + z$$

where a and b are real constants; and
  (b) generating two data channels based on said codes X and Y.

62. The method of claim 61, wherein said step (a) comprises the steps of:
  (a1) reading said code X from a first memory corresponding to said code X based on said digital data D, said first memory storing a look-up table and outputting said code X based on said digital data D; and
  (a2) reading said code Y from a second memory corresponding to said code Y based on said digital data D, said second memory storing a look-up table and outputting said code Y based on said digital data D.

63. The method of claim 61, further comprising the steps of:
  (c) receiving digitized video signals;
  (d) generating a combination signal by combining said digitized video signals;
  (e) transforming said combination signal to produce said digital data D; and wherein
  said step (b) includes the step of (b1) variable length encoding said two data channels.

64. The method of claim 61, wherein
  said step (a) divides said digital data D which includes basic picture quality information and fine picture quality information; and further comprising the step of,
  (c) determining whether said digital data D includes basic picture quality information or fine picture quality information; and wherein
  said step (b) generates said two data channels based on said output codes $X_0, \ldots, X_{n-1}$ when said digital data D includes said basic picture quality information and generates said two data channels based on said digital data D when said digital data represent fine picture quality information.

65. A method of encoding, comprising the steps of:
  (a) encoding digital data D into codes X and Y, where $$D = x^a + by + z,$$

$$X = cx + z,$$

and $$Y = y$$

where a, b and c are real constants; and
  (b) generating two data channels based on said codes X and Y.

66. The method of claim 65, wherein said step (a) comprises the steps of:
  (a1) reading said code X from a first memory corresponding to said code X based on said digital data D, said first memory storing a look-up table and outputting said code X based on said digital data D; and
  (a2) reading said code Y from a second memory corresponding to said code Y based on said digital data D, said second memory storing a look-up table and outputting said code Y based on said digital data D.

67. The method of claim 65, further comprising the steps of:
  (c) receiving digitized video signals;
  (d) generating a combination signal by combining said digitized video signals;
  (e) transforming said combination signal to produce said digital data D; and wherein
  said step (b) includes the step of (b1) variable length encoding said two data channels.

68. The method of claim 65, wherein
  said step (a) divides said digital data D which includes basic picture quality information and fine picture quality information; and further comprising the step of,
  (c) determining whether said digital data D includes basic picture quality information or fine picture quality information; and wherein
  said step (b) generates said two data channels based on said output codes $X_0, \ldots, X_{n-1}$ when said digital data D includes said basic picture quality information and generates said two data channels based on said digital data D when said digital data represent fine picture quality information.

* * * * *

UNITED STATES PATENT AND TRADEMARK OFFICE
CERTIFICATE OF CORRECTION

PATENT NO. : 5,384,665
DATED : January 24, 1995
INVENTOR(S) : OHKUMA et al.

It is certified that error appears in the above-indentified patent and that said Letters Patent is hereby corrected as shown below:

Column 33, line 6, Claim 1, change "$X_{n-1}X_{n-1}$" to --$X_{n-1}$--

Column 33, line 8, Claim 1, change "$+K_{n-1}$" to --$+K_{n-1}X_{n-1}$--

Column 37, line 32, Claim 30, change "$+K_{n'}X_{n'}$" to --$+K_{n-1}X_{n-1}$--

Column 41, line 3, Claim 49, change "(c)" to --(b)--

Signed and Sealed this

Twentieth Day of June, 1995

Attest:

BRUCE LEHMAN

Attesting Officer     Commissioner of Patents and Trademarks